(12) United States Patent
Trepetin et al.

(10) Patent No.: US 9,442,980 B1
(45) Date of Patent: Sep. 13, 2016

(54) MATHEMATICAL METHOD FOR PERFORMING HOMOMORPHIC OPERATIONS

(71) Applicants: Stan Trepetin, New York, NY (US); Mark Reston, Hillsborough, NJ (US)

(72) Inventors: Stan Trepetin, New York, NY (US); Mark Reston, Hillsborough, NJ (US)

( * ) Notice: Subject to any disclaimer, the term of this patent is extended or adjusted under 35 U.S.C. 154(b) by 0 days.

(21) Appl. No.: 14/277,056

(22) Filed: May 14, 2014

Related U.S. Application Data

(63) Continuation-in-part of application No. 14/093,499, filed on Dec. 1, 2013, which is a continuation of application No. 13/090,803, filed on Apr. 20, 2011, now Pat. No. 8,626,749.

(60) Provisional application No. 61/326,405, filed on Apr. 21, 2010, provisional application No. 61/823,350, filed on May 14, 2013.

(51) Int. Cl.
*G06F 17/30* (2006.01)
*G06F 21/60* (2013.01)

(52) U.S. Cl.
CPC ....... *G06F 17/30477* (2013.01); *G06F 21/602* (2013.01)

(58) Field of Classification Search
CPC ...................................................... H04K 1/00
USPC ............................................................ 380/28
See application file for complete search history.

(56) References Cited

U.S. PATENT DOCUMENTS

| 8,626,749 B1 * | 1/2014 | Trepetin | H04L 9/002 707/722 |
| 2005/0147246 A1 * | 7/2005 | Agrawal | H04L 9/0662 380/44 |
| 2009/0077378 A1 * | 3/2009 | Hacigumus | G06F 17/30471 713/165 |

* cited by examiner

*Primary Examiner* — Kaveh Abrishamkar
(74) *Attorney, Agent, or Firm* — Henry J. Cittone; Cittone & Chinta LLP

(57) ABSTRACT

The present invention relates generally to a system and method of querying an anonymized database. More particularly, the invention provides a method and system for querying an anonymized database without the need to decrypt queried data while it's processed. Even more specifically, the invention provides a method and system of anonymizing a database such that it may be queried efficiently in near real time while still retaining the ability to not decrypt requested data while it's being processed.

16 Claims, 15 Drawing Sheets

B1 TABLE:

| first_name | last_name | city |
|---|---|---|
| Bob | Jones | Chicago |
| Sally | Smith | Tampa |
| George | Jones | Memphis |
| Sally | Lurie | Dallas |
| Sally | Jackson | Miami |
| Harry | Felix | San Diego |
| Bob | Smith | New York |
| Roger | Lurie | Newark |
| Will | Jones | Boston |

RESULTING E1 TABLE

| Column | Token | Frequency | Rows needed |
|---|---|---|---|
| first_name | Sally | 3 | 0 |
| first_name | Bob | 2 | 1 |
| first_name | George | 1 | 2 |
| first_name | Harry | 1 | 2 |
| first_name | Roger | 1 | 2 |
| first_name | Will | 1 | 0 |
| last_name | Jones | 3 | 0 |
| last_name | Smith | 2 | 1 |
| last_name | Lurie | 2 | 1 |
| last_name | Jackson | 1 | 2 |
| last_name | Felix | 1 | 2 |
| city | Chicago | 1 | 0 |
| city | Tampa | 1 | 0 |
| city | Memphis | 1 | 0 |
| city | Dallas | 1 | 0 |
| city | Miami | 1 | 0 |
| city | San Diego | 1 | 0 |
| city | New York | 1 | 0 |
| city | Newark | 1 | 0 |
| city | Boston | 1 | 0 |

Aggregate rows needed for first_name = 7

Aggregate rows needed for last_name = 6

Aggregate rows needed for city = 0

B1 TABLE:

| first_name | last_name | city |
|---|---|---|
| Bob | Jones | Chicago |
| Sally | Smith | Tampa |
| George | Jones | Memphis |
| Sally | Lurie | Dallas |
| Sally | Jackson | Miami |
| Harry | Felix | San Diego |
| Bob | Smith | New York |
| Roger | Lurie | Newark |
| Will | Jones | Boston |

RESULTING E1 TABLE

| Column | Token | Frequency | Rows needed |
|---|---|---|---|
| first_name | Sally | 3 | 0 |
| first_name | Bob | 2 | 1 |
| first_name | George | 1 | 2 |
| first_name | Harry | 1 | 2 |
| first_name | Roger | 1 | 2 |
| first_name | Will | 1 | 0 |
| last_name | Jones | 3 | 0 |
| last_name | Smith | 2 | 1 |
| last_name | Lurie | 2 | 1 |
| last_name | Jackson | 1 | 2 |
| last_name | Felix | 1 | 2 |
| city | Chicago | 1 | 0 |
| city | Tampa | 1 | 0 |
| city | Memphis | 1 | 0 |
| city | Dallas | 1 | 0 |
| city | Miami | 1 | 0 |
| city | San Diego | 1 | 0 |
| city | New York | 1 | 0 |
| city | Newark | 1 | 0 |
| city | Boston | 1 | 0 |

Aggregate rows needed for first_name = 7

Aggregate rows needed for last_name = 6

Aggregate rows needed for city = 0

FIG. 1

B1 TABLE first_name    last_name    city          GpNum        RecInfo

| Bob | Jones | Chicago | 1 | True |
| Sally | Smith | Tampa | 1 | True |
| George | Jones | Memphis | 1 | True |
| Sally | Lurie | Dallas | 2 | True |
| Sally | Jackson | Miami | 2 | True |
| Harry | Felix | San Diego | 3 | True |
| Bob | Smith | New York | 3 | True |
| Roger | Lurie | Newark | 3 | True |
| Will | Jones | Boston | 3 | True |

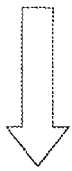

*Step 1: Copy random rows from B1 into C1 equaling in number to the maximum "rows needed" column value from E1, in this case 7.*

*Step 2: Create new groups in C1 (in this case groups 10 and 11 are created), and set the RecInfo values of the copied rows to False.*

RESULTING C1 TABLE first_name    last_name    city          GpNum        RecInfo

| Bob | Jones | Chicago | 10 | False |
| Sally | Smith | Tampa | 10 | False |
| Sally | Lurie | Dallas | 10 | False |
| Sally | Jackson | Miami | 11 | False |
| Bob | Smith | New York | 11 | False |
| Roger | Lurie | Newark | 11 | False |
| Will | Jones | Boston | 11 | False |

FIG. 2

B1 TABLE first_name     other columns

| first_name | other columns |
|---|---|
| Ron | ... |
| Jen | ... |
| Stu | ... |
| Jon | ... |
| Bob | ... |
| Jim | ... |
| Sal | ... |
| Roy | ... |
| Val | ... |

⇩

RESULTING F1 TABLE

| column | char. position | character | frequency | rows needed |
|---|---|---|---|---|
| first_name | 1 | J | 3 | 0 |
| first_name | 1 | R | 2 | 1 |
| first_name | 1 | S | 2 | 1 |
| first_name | 1 | B | 1 | 2 |
| first_name | 1 | V | 1 | 2 |
| first_name | 2 | o | 4 | 0 |
| first_name | 2 | a | 2 | 2 |
| first_name | 2 | e | 1 | 3 |
| first_name | 2 | i | 1 | 3 |
| first_name | 2 | t | 1 | 3 |
| first_name | 2 | e | 1 | 3 |
| first_name | 3 | n | 3 | 0 |
| first_name | 3 | l | 2 | 1 |
| first_name | 3 | y | 1 | 2 |
| first_name | 3 | m | 1 | 2 |
| first_name | 3 | b | 1 | 2 |
| first_name | 3 | u | 1 | 0 |

Aggregate rows needed for position 1 = 6

Aggregate rows needed for position 2 = 14

Aggregate rows needed for position 3 = 7

FIG. 3

B1 TABLE

| first_name | other columns | GpNum | RecInfo |
|---|---|---|---|
| Ron | ... | 1 | True |
| Jen | ... | 1 | True |
| Stu | ... | 2 | True |
| Jon | ... | 2 | True |
| Bob | ... | 2 | True |
| Jim | ... | 2 | True |
| Sal | ... | 3 | True |
| Roy | ... | 3 | True |
| Val | ... | 3 | True |

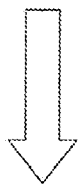

*Step 1: Copy random rows from B1 into D1 equaling in number to the maximum "rows needed" column value, in this case 14.*

*Step 2: Create new groups in D1 (in this case, groups 10-14 are created), and set the RecInfo values for those rows to False.*

RESULTING D1 TABLE

| first_name | other columns | GpNum | RecInfo |
|---|---|---|---|
| Ron | ... | 10 | False |
| Jen | ... | 10 | False |
| Stu | ... | 10 | False |
| Jon | ... | 11 | False |
| Bob | ... | 11 | False |
| Jim | ... | 11 | False |
| Sal | ... | 12 | False |
| Roy | ... | 12 | False |
| Val | ... | 12 | False |
| Ron | ... | 13 | False |
| Jen | ... | 13 | False |
| Jon | ... | 13 | False |
| Bob | ... | 14 | False |
| Sal | ... | 14 | False |

FIG. 4

E1 TABLE

| Column | Token | Frequency | Rows needed |
|---|---|---|---|
| last_name | Jones | 3 | 0 |
| last_name | Smith | 2 | 1 |
| last_name | Lurie | 2 | 1 |
| last_name | Jackson | 1 | 2 |
| last_name | Felix | 1 | 2 |

C1 TABLE

| first_name | last_name | city | GpNum | RecInfo |
|---|---|---|---|---|
| Bob | Jones | Chicago | 10 | False |
| Sally | Smith | Tampa | 10 | False |
| Sally | Lurie | Dallas | 10 | False |
| Sally | Jackson | Miami | 11 | False |
| Bob | Smith | New York | 11 | False |
| Roger | Lurie | Newark | 11 | False |
| Will | Jones | Boston | 11 | False |

FIG. 5

TRANSFORMED C1 TABLE

| first_name | last_name | city | GpNum | RecInfo |
|---|---|---|---|---|
| Bob | Smith | Chicago | 10 | False |
| Sally | Lurie | Tampa | 10 | False |
| Sally | Jackson | Dallas | 10 | False |
| Sally | Jackson | Miami | 11 | False |
| Bob | Felix | New York | 11 | False |
| Roger | Felix | Newark | 11 | False |
| Will | Jones | Boston | 11 | False |

FIG. 6

F1 TABLE

| column | char. position | character | frequency | rows needed |
|---|---|---|---|---|
| first_name | 1 | J | 3 | 0 |
| first_name | 1 | R | 2 | 1 |
| first_name | 1 | S | 2 | 1 |
| first_name | 1 | B | 1 | 2 |
| first_name | 1 | V | 1 | 2 |

D1 TABLE

| first_name | other columns | GpNum | RecInfo |
|---|---|---|---|
| Ron | ... | 10 | False |
| Jen | ... | 10 | False |
| Stu | ... | 10 | False |
| Jon | ... | 11 | False |
| Bob | ... | 11 | False |
| Jim | ... | 11 | False |
| Sal | ... | 12 | False |
| Roy | ... | 12 | False |
| Val | ... | 12 | False |
| Ron | ... | 13 | False |
| Jen | ... | 13 | False |
| Jon | ... | 13 | False |
| Bob | ... | 14 | False |
| Sal | ... | 14 | False |

FIG. 7

TRANSFORMED D1 TABLE

| first_name | other columns | GpNum | RecInfo |
|---|---|---|---|
| Ron | ... | 10 | False |
| Sen | ... | 10 | False |
| Btu | ... | 10 | False |
| Bon | ... | 11 | False |
| Vob | ... | 11 | False |
| Vim | ... | 11 | False |
| Jal | ... | 12 | False |
| Roy | ... | 12 | False |
| Sal | ... | 12 | False |
| Bon | ... | 13 | False |
| Ven | ... | 13 | False |
| Jon | ... | 13 | False |
| Rob | ... | 14 | False |
| Sal | ... | 14 | False |

FIG. 8

RESULT SET RECEIVED FROM SERVER

| l_name | salary | age | GpNum | RecInfo | RowNum |
|---|---|---|---|---|---|
| r7dd | [(30000-25)*578892]+1232114 | [(17-45)*578892]+872123 | 23 | d | 7831 |
| w$kZ | [(18000-96)*866311]+799001 | [(55-118)*1107932]+605532 | 72 | H | 10995 |

*Step 1: Discard all rows which belong to false groups using the Private Key file in memory showing which GpNums are false and which are true.*

| GpNum | Validity |
|---|---|
| 23 | False |
| 72 | True |
| <Other group numbers> | <Other True or False indicators> |

| l_name | salary | age | GpNum | RecInfo | RowNum |
|---|---|---|---|---|---|
| w$kZ | [(18000-96)*866311]+799001 | [(55-118)*1107932]+605532 | 72 | H | 10995 |

*Step 2: Decode the length of all string columns using the Private Key file (the encoding file) showing how each string column length in each group, represented by a character in the ODB domain, is permuted into a different character in the ODB domain. Trim the string values as required by the lengths. (In this Figure, imagine the domain includes the alphabetized lower-case letters, alphabetized capital letters, and the digits 0-9, in that specific order within V1. The encoding "H" is a permutation of the character "c" as seen in the table immediately below. The character "c", in turn, means that the string has a length of 3 characters because "c" is the $3^{rd}$ character in the list of all characters in the ordered V1. The encoded l_name must therefore be trimmed to a length of 3).*

| column | length representation | permuted length representation | GpNum |
|---|---|---|---|
| l_name | c | H | 72 |
| <Other columns> | <Other lengths representations> | <Other permuted length representations> | <Other group numbers> |

| l_name | salary | age | GpNum | RecInfo | RowNum |
|---|---|---|---|---|---|
| w$k | [(18000-96)*866311]+799001 | [(55-118)*1107932]+605532 | 72 | H | 10995 |

FIG. 11A (REPRODUCED ROW)

| l_name | salary | age | GpNum | RecInfo | RowNum |
|---|---|---|---|---|---|
| w$k | [(18000-96)*86311]+799001 | [(55-118)*1107932]+605532 | 72 | H | 10995 |

> Step 3: Decode all the string columns by decoding one character position at a time using the Private Key file (the encoding file) in memory showing how each position in each column and group was originally permuted.

| Original char. | Permuted char. | Column | Position | GpNum |
|---|---|---|---|---|
| L | w | last_name | 1 | 72 |
| e | $ | last_name | 2 | 72 |
| e | k | last_name | 3 | 72 |
| <Other characters> | <Other permutations> | <Other string columns> | <Other character positions> | <Other group numbers> |

| l_name | salary | age | GpNum | RecInfo | RowNum |
|---|---|---|---|---|---|
| Lee | [(18000-96)*86311]+799001 | [(55-118)*1107932]+605532 | 72 | H | 10995 |

> Step 4: Begin numeric decoding by re-instating the outliers. Check the RowNums returned in the result set. If any match the outlier RowNums in the Private Key file in memory, extract the original outlier value(s) and exchange it with the outlier value in the result set. (Note, in our implementation of the Private Key file, we placed all the outliers across different columns connected to a single RowNum in one row. It's also possible to have multiple rows for each RowNum rather than a single row in the Private Key file. Each such row would deal with a different column and its particular outlier value).

| RowNum | column | original_value | <more cols.> | <more orig. vals.> |
|---|---|---|---|---|
| 10995 | salary | 89000 | <more columns for this row> | <more original values for this row> |
| <Other row numbers> | <Other columns> | <Other original outlier values> | <more columns for other rows> | <more original values for other rows> |

| l_name | salary | age | GpNum | RecInfo | RowNum |
|---|---|---|---|---|---|
| Lee | 89000 | [(55-118)*1107932]+605532 | 72 | H | 10995 |

FIG. 11B (REPRODUCED ROW)

| name | salary | age | GpNum | RecInfo | RowNum |
|---|---|---|---|---|---|
| Lee | 89000 | [(55-118)*1107932]+605532 | 72 | H | 10995 |

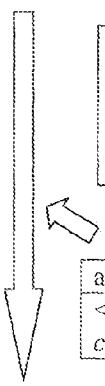

Step 5: Finish numeric decoding. Compute the original values of all the numeric columns (the formula is: original value = ([encoded_value – random addend] / random multiplier) + average)) using the Private Key file in memory showing the average, random addend, and random multiplier for each numeric column for each group.

| column | average_val | random_multiplier | random_addend | GpNum |
|---|---|---|---|---|
| age | 118 | 1107932 | 605532 | 72 |
| <Other numeric columns> | <Other averages> | <Other random multipliers> | <Other random addends> | <Other group numbers> |

| name | salary | age | GpNum | RecInfo | RowNum |
|---|---|---|---|---|---|
| Lee | 89000 | 55 | 72 | H | 10995 |

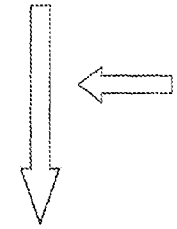

Step 6: Present the decoded result set to the application. (Remove the GpNum, RecInfo, and RowNum columns).

| name | salary | age |
|---|---|---|
| Lee | 89000 | 55 |

FIG. 11C

INTAKE TABLE         EXPANDED X1           DISCHARGE TABLE
                     TABLE l_name  more col.  GpNum      l_name   GpNum        l_name  more col.  GpNum

| l_name  | more col. | GpNum |
|---------|-----------|-------|
| *hf8$kL* | ...      | *1*   |
| *TubD'p* | ...      | *1*   |
| s4gQwn  | ...       | 2     |
| s0ifGz  | ...       | 2     |
| *Wd.bwx* | ...      | *3*   |
| pe62dd  | ...       | 3     |
| *xrtQu7* | ...      | *4*   |
| hoy,r3  | ...       | 4     |
| *xrtQu7* | ...      | *4*   |

| l_name   | GpNum |
|----------|-------|
| *lj9drr* | *1*   |
| *Cc3f7a* | *1*   |
| *TubD'p* | *1*   |
| hf8$kL   | 1     |
| BdB5sw   | 2     |
| Dt6ac9   | 2     |
| *hIr7dw* | *2*   |
| gvT7ui   | 2     |
| *Wd.bwx* | *3*   |
| fy5mhi   | 3     |
| X4ets2   | 3     |
| *4J.det* | *3*   |
| d43hit   | 4     |
| 3qD'c.   | 4     |
| ujwW2a   | 4     |
| *xrtQu7* | *4*   |

| l_name   | more col. | GpNum |
|----------|-----------|-------|
| *lj9drr* | ...       | *1*   |
| *Cc3f7a* | ...       | *1*   |
| *hIr7dw* | ...       | *2*   |
| *hIr7dw* | ...       | *2*   |
| *4J.det* | ...       | *3*   |

Step 1: JOIN intake table to X1 on l_name and place results into J1. (This is the first component of J1).

Step 2: JOIN X1 to discharge table on l_name GROUPing BY frequency and place results into J1. (This is the second component of J1).

RESULTING J1 TABLE (SENT TO CLIENT)

| l_name | more col. | GpNum | l_name | GpNum | frequency |
|--------|-----------|-------|--------|-------|-----------|
| hf8$kL | ...       | 1     | NULL   | NULL  | NULL      |
| TubD'p | ...       | 1     | NULL   | NULL  | NULL      |
| Wd.bwx | ...       | 3     | NULL   | NULL  | NULL      |
| xrtQu7 | ...       | 4     | NULL   | NULL  | NULL      |
| xrtQu7 | ...       | 4     | NULL   | NULL  | NULL      |
| NULL   | NULL      | NULL  | lj9drr | 1     | 1         |
| NULL   | NULL      | NULL  | Cc3f7a | 1     | 1         |
| NULL   | NULL      | NULL  | hlr7dw | 2     | 2         |
| NULL   | NULL      | NULL  | 4J.det | 3     | 1         |

} J1's 1st component (first 5 rows)
} J1's 2nd component (last 4 rows)

FIG. 12A (REPRODUCED J1 TABLE)

l_name    more col.    GpNum    l_name    GpNum    frequency

| l_name | more col. | GpNum | l_name | GpNum | frequency |
|---|---|---|---|---|---|
| hf8$kL | ... | 1 | NULL | NULL | NULL |
| TubD'p | ... | 1 | NULL | NULL | NULL |
| Wd.bwx | ... | 3 | NULL | NULL | NULL |
| xrtQu7 | ... | 4 | NULL | NULL | NULL |
| xrtQu7 | ... | 4 | NULL | NULL | NULL |
| NULL | NULL | NULL | lj9drr | 1 | 1 |
| NULL | NULL | NULL | Cc3f7a | 1 | 1 |
| NULL | NULL | NULL | hIr7dw | 2 | 2 |
| NULL | NULL | NULL | 4J.dei | 3 | 1 |

J1's 1st component (rows 1–5)
J1's 2nd component (rows 6–9)

*Step 3: Remove the encoding from the needed column (in this case, l_name) in both J1 components.*

DECODED J1 TABLE

| l_name | more col. | GpNum | l_name | GpNum | frequency |
|---|---|---|---|---|---|
| SmithS | ... | 1 | NULL | NULL | NULL |
| KellyK | ... | 1 | NULL | NULL | NULL |
| Russel | ... | 3 | NULL | NULL | NULL |
| SmithS | ... | 4 | NULL | NULL | NULL |
| SmithS | ... | 4 | NULL | NULL | NULL |
| NULL | NULL | NULL | Russel | 1 | 1 |
| NULL | NULL | NULL | JohnJo | 1 | 1 |
| NULL | NULL | NULL | KellyK | 2 | 2 |
| NULL | NULL | NULL | SmithS | 3 | 1 |

J1's 1st component (rows 1–5)
J1's 2nd component (rows 6–9)

*Step 4. Loop over the J1 table on the client. For each row P in the second component of J1, find every matching row Q in the first component of J1. Repeat Q in the result set presented to user as many times as specified by the frequency count of P. (In this Figure, "SmithS" is repeated 3 times in the result set because it has a single occurrence in J1's second component and is found 3 times in J1's first component. "KellyK" is repeated twice in the result set because it's found with a frequency of 2 in J1's second component and has a single matching row in J1's first component. (The rest of the information in the result set comes from J1's first component because we are interested A1's rows of the INNER JOIN).*

RESULT SET

| l_name | more col. | GpNum |
|---|---|---|
| Russel | ... | 3 |
| KellyK | ... | 1 |
| KellyK | ... | 1 |
| SmithS | ... | 1 |
| SmithS | ... | 4 |
| SmithS | ... | 4 |

FIG. 12B

MATHEMATICAL METHOD FOR PERFORMING HOMOMORPHIC OPERATIONS

CROSS-REFERENCE TO RELATED APPLICATIONS

This application is a continuation-in-part of U.S. patent application Ser. No. 14/093,499, filed Dec. 1, 2013, which is a continuation of U.S. patent application Ser. No. 13/090,803, filed Apr. 20, 2011 which claims the benefit of U.S. Provisional Patent Application 61/326,405, filed Apr. 21, 2010, the disclosures of which are hereby incorporated by reference in their entirety. This application also claims benefit to U.S. Provisional Patent Application 61/823,350, filed May 14, 2014, the disclosure of which is hereby incorporated by reference in its entirety.

FIELD OF THE INVENTION

The present invention relates generally to a system and method of querying an anonymized database. More particularly, the invention provides a method and system for querying an anonymized database without the need to decrypt queried data. Even more specifically, the invention provides a method and system of anonymizing a database such that it may be queried efficiently while still retaining the ability to not decrypt requested data.

BACKGROUND

As the amount of digital data created and processed by organizations continues to increase, the need to query and secure those data also grow. Data is thus often encrypted to secure it from improper access. A problem arises when the data is required for use by the proprietor or other legitimate users of the database. In order to perform an operation on encrypted data, it is typically requested from the database, decrypted, and only then can the operation be run, after which the results must be encrypted and returned to the database. The decryption and encryption steps consume vast amounts of processing resources, resulting in significant delays when working with encrypted data.

Typical architectures are network-based (e.g., client-server) database architectures. Multiple users, each with their own workstation, are trying to retrieve records from a central database. Typically, because the database is encrypted, the database private key, used for data encryption and decryption purposes, is kept on a network drive shared among the client machines. The client machines load the key from the shared network drive.

Some existing methods attempt to address data decryption issues by performing operations on encrypted data directly. However these prior methods suffer from the inability to offer virtually the same performance as users are accustomed to today when running against unencrypted data. In addition, these prior methods do not offer robust analytical capabilities over encrypted data.

Thus what is needed is a new encryption system and method capable of querying anonymized electronic databases and obtaining the same results as if performing the queries against the original, unencrypted data all while being done with little actual impact to query speed. As described, our approach considerably differs from typical database operations over encrypted data today. In most of the current schemes, data must be typically decrypted before queries can be run against them. We break with this limitation by permitting queries and analysis over encrypted data.

SUMMARY OF THE INVENTION

According to an exemplary embodiment of the present invention, a method and system which allows the querying of anonymized electronic databases while obtaining the same results as if performing the queries against the original, unencrypted data with little actual impact to query speed is provided.

According to another exemplary embodiment of the present invention, a method and system is provided which provides anonymization of data, methods to analyze the anonymized data, and a retrieval mechanism that returns the correct (unciphered) response to a user's query.

BRIEF DESCRIPTION OF THE DRAWINGS

FIG. 1 is a depiction of a system and method of identifying 5-element groups and as well as the number of tokens needed to "equalize" each token's frequency to that of its 5-element group's leader.

FIG. 2 is a depiction of a system and method of creating false rows based on the maximum number of "rows needed" across all the 5-element groupings created across all the string columns.

FIG. 3 is a depiction of a system and method of identifying 5-element groupings of individual character positions within strings and as well as the number of characters needed to "equalize" each position's frequency to that of its 5-element group's leader.

FIG. 4 is a depiction of a system and method of creating false rows based on the maximum number of "rows needed" across all the 5-element groupings of character positions in strings created across all the character positions within a given string column.

FIG. 5 is a depiction of a system and method of beginning to properly create false tokens based on substitution, as required in 5-element groupings for a specific column.

FIG. 6 is a depiction of a system and method of the resulting substitutions after tokens have been "equalized" within their 5-element groupings (e.g. the culmination of FIG. 5).

FIG. 7 is a depiction of a system and method of beginning to properly create false characters based on substitution, as required in 5-element groupings of character positions for a specific column.

FIG. 8 is a depiction of a system and method of the resulting substitutions after character positions have been "equalized" within their 5-element groupings (e.g. the culmination of FIG. 7).

FIGS. 11A-C are a depiction of a system and method of decoding a small result set on a client machine.

FIGS. 12A-B are a depiction of a system and method of showing how an INNER JOIN can be performed between two anonymized tables involving the X1 table (shown in FIG. 11).

DETAILED DESCRIPTION

Figure 9:
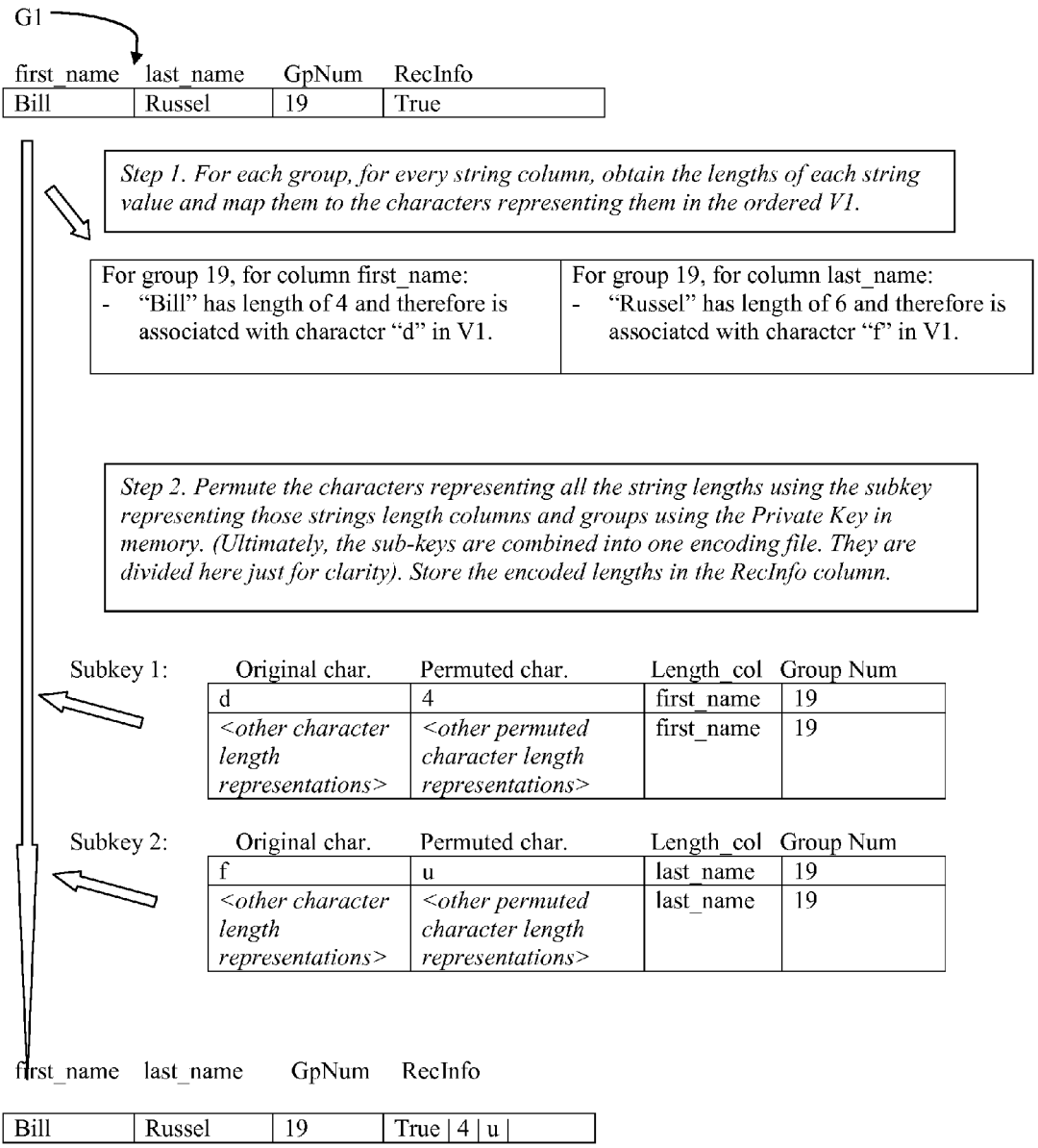
FIG. 9 is a depiction of a system and method of encoding the string lengths of a single "true" row.

In order to provide near real-time querying of encrypted databases, modules are provided to perform the necessary hardware and software functions to allow querying of encrypted databases without first decrypting the data. The modules are preferably implemented by software means, but may also be implemented by firmware or a combination of firmware and software. When the database is anonymized in accordance with embodiments of the present invention, it does not require they be decrypted prior to conducting analysis. To the contrary, SELECTs, UPDATEs, and various mathematical computations, can be done on the encrypted data and correct results returned to users, after which they can be decrypted. Thus, encrypted queries can be performed in near real-time. To accomplish near real time queries, queries are anonymized before being submitted to the server and anonymized results are then decrypted before being presented back to the user.

Certain preferred embodiments of the present invention are now described. As a first step, the database must be anonymized. For string values, this method securely anonymizes data at the level of individual characters yet allows for general queries and pattern matching to take place over the anonymized strings. For numbers, this method mathematically transforms values into obfuscated numeric values which will still allow some numerical computations to be done on the server while the rest of the calculations can be completed on the client. Maintaining almost the same speed of query performance is accomplished through the use of indexes. The encoding of strings and numbers involves normal textual and mathematical manipulations, allowing the full use of indexing as on normal, unencrypted databases.

The anonymization process works on a single database table at a time. It anonymizes all columns, not just those with "sensitive" fields such as Social Security Number or Last Name. Anonymizing all columns prevents the table from being subject to re-identification attacks which focus just on non-sensitive fields. String columns are handled differently from numeric columns.

Now described is the anonymization of strings in accordance with embodiments of the present invention. Every value in a string column is separated into its individual characters. The method deterministically encrypts each character—i.e., transforms the same character into the same encoded character every time—but in a special way. Simply deterministically anonymizing such characters without any special treatment would immediately subject the anonymized data to a frequency analysis attack.

Now described are embodiments of the present invention presented by way of examples, including the worst-case scenario example of an intruder who has access to an unencrypted static copy of the original database. However, the embodiments of the present invention are not limited to protecting data from such an intruder and are able to afford similar or greater protection from other forms of intrusion, including insider threats, and outside threats who lack a copy of the original database. Thus, if an intruder obtained a copy of the original database, she could compute the frequency of any character in it. The frequency of the enciphered character will be the same due to the deterministic nature of the anonymization (transforming the same character into the same encoding every time), leading to fairly straightforward re-identification of characters. This re-identification is obviated by combining a deterministic process with the generation of a significant number of database records which contain appropriately created fake strings. The intruder will be significantly less able to carry out a frequency analysis attack because the randomly created characters will hide the frequencies of the original characters. A further layer of security is added by breaking the anonymized table into many independent "groups" and coding each character position within each column and each group independently. Such encoding also disrupts the intruder's ability to carry out a frequency analysis attack because across groups and across different character positions, the same characters will have different encodings. Finally, the fake records will also prevent re-identification of original string values when the intruder is observing the number of rows being returned after various queries complete processing. That is, one wants to prevent an intruder from learning identifiers by seeing result set sizes. In result sets of embodiments of the present invention, fake records will be returned intermixed with real records. Thus, simply looking at the number of rows returned will not facilitate re-identification because result set sizes will not reflect accurate row counts related to the original queries.

Numeric values are protected by placing their records into the newly created groups, too. A mathematical function with different anonymization parameters for each numeric column and each group will be used to encode each numeric value. The randomization of the numeric values into groups, the fake rows which will also hide the frequency of the numeric values, and the randomness of the parameters used when computing the mathematical function will make it very difficult for an attacker to re-identify any of the numeric values he may see as well.

Preferably, anonymization is carried out in a series of steps in accordance with a preferred embodiment of the present invention described herein:

Anonymization Step 0 involves identifying the original database ("ODB" also referring to the original database possessed by the hypothetical intruder) and tables. The ODB typically consists of one or more tables, O1 . . . Op. The ODB is transformed into the anonymized database ADB which will consist of the anonymized tables A1 . . . Ap. The anonymization process works on each table using various temporary tables for the transformation. The transformation of an exemplary table O1 is now described which is converted into an exemplary anonymized table A1.

Anonymization Step 1 involves identifying all the alphanumeric symbols that make up the original database. The alphanumeric symbols will be used to anonymize the original database to preserve the data schema so as to not interfere with the operations of database applications. This step in the anonymization process involves asking asking the ODB owner, or scanning the tables O1 . . . Op directly, to identify the symbol sets that make up the various columns in the ODB tables. This set, comprised of, for example, the letters a-z, the letters A-Z, basic punctuation marks, and digits 0-9, is stored in table V1. V1 is used to construct the data encoding/decoding keys and for several other purposes as will be described below. The same alphanumeric symbols are used during the anonymization process as the original plaintext symbols so as to not interfere with the current database applications.

Anonymization Step 2 sets the number of groups into which the anonymized table will be divided. The more groups the stronger the security as each group gets its own encoding/decoding key. Preferably, the number of initial groups is set to five. The number of groups is preferably automatically expanded to about 30 groups in subsequent Anonymization Steps. That is, the next step in the anonymization process, Anonymization Step 2, sets the number of groups into which O1 will be divided. The more groups created the stronger the anonymization is because the rows in each group will get their own encoding key. (The more groups that are created, in fact, the closer the scheme approaches to that of a random pad). In this embodiment of the present invention, it is recommended to set the number of groups to 5 for any table to be anonymized because additional groups, e.g., more security, will automatically be created in subsequent Anonymization Steps. Based on later Anonymization Steps, 5 groups will be doubled to 10 groups as new "true" groups (i.e. those containing the original data from the ODB) are formed to prevent frequency analysis attacks on strings and characters within groups, as will be shown in Anonymization Steps 5 and 6. The group count of 10 will then be increased to a group count of about 30 as about 20 "false" groups (i.e. those containing the fake rows the anonymization process introduces) will be added to the table, too. These false groups make it very difficult to carry out a frequency analysis attack on strings and characters on the whole table, as will be shown in Anonymization Steps 7 through 9.

In embodiments of the present invention it is also possible to set the initial group number even higher, this generates an even higher final total group count, hence making A1 even more secure with minimal loss of performance. Increasing the number of groups in our own testing has, so far, only shown small performance differences.

In Anonymization Step 3 anonymizing the first database table by copying it into a temporary table is performed. Besides the original table's columns, the temporary table introduces special columns so that client workstations can properly query the anonymized data after anonymization. Separate the temporary table into the initial number of groups as configured in Anonymization Step 2. That is, in Anonymization Step 3, O1 is copied into temporary table B1. Special columns are introduced in B1 to allow for client machines to subsequently query the anonymized data. The first column added, GpNum, holds the number of the group to which a given row belongs. Among other things, this column is used to discard rows from result sets that belong to false groups and retain rows that belong to true groups. The second column added, RecInfo, contains the lengths of each string value in that row, encoded as a character within V1. This column is used to trim string values in result sets so that the string values with proper original lengths can be shown to the user after they are returned to the client from the server. The third column added, RowNum, is a counter representing the row number for the row. Among other things, it is used to determine if a numeric value in a result set row was originally an outlier so that its proper outlier value may be restored before it's shown to the user.

Next, B1 is divided into the initial number of groups (for example, 5) as set in Anonymization Step 2. Substantially the same number of rows in each group in the anonymized table is maintained so that differing group row counts do not assist an intruder in any of his or her re-identification efforts. Hence, the GpNums of B1's rows are updated to roughly evenly divide them among all possible initial true groups.

Table R1 is also created in this Anonymization Step. This table is used to process the DELETE command in the scheme. R1 will hold the RowNums for those rows that are scheduled for deletion, and any rows in R1 will not be incorporated into any application query against the anonymized database because the rows will ultimately be erased.

Anonymization Step 4 creates uniform length strings within every string column so that anonymized values can't be guessed due to their lengths. Preferably, a uniform relative length is created for all the values in every string column. Thus, an intruder would not be able to compare his O1 copy to A1 and identify records in A1 due to equal string lengths. To create uniform lengths in each column, the length of its longest string is computed. Then every string value in the column is padded with itself, character by character, in order, wrapping back to the beginning after the end of the string is reached, until the total length equals the identified maximum length. Finally, the RecInfo column for each row in B1 is set to indicate it's a "true" row as these rows are copies of the original O1 values.

Anonymization Step 5: to make a frequency analysis attack on characters or strings within groups more difficult, rows having the most popular leading characters in a strategically chosen string column are exchanged with rows from randomly chosen groups. Preferably, this involves a potential "re-grouping" of the rows in B1 to prevent a character or string frequency analysis attack within groups. A column having the most popular values within B1 is chosen and used as the basis for identifying popular strings that can be moved to other groups. Such a column is used as the basis for segregation because in a frequency analysis attack its values can be more easily recognized. An intruder could try to map its unique values to the same unique values in his O1 copy. However, moving the popular and therefore more identifiable values of this column to other groups better hides those values. If no uniquely-valued column exists in B1 and the distribution of values in all string columns is equivalent, a random column for segregation purposes is chosen. Within each group, when examining the most uniquely-valued column, rows containing characters in the first position that are significantly more frequent than characters in the first position of other rows are identified. The larger sets of these popular rows are broken into smaller sets and each such smaller set is moved to randomly selected groups. Rows from the random receiving groups are moved into the group currently analyzed. The reason for breaking up sets of rows before moving them is to prevent the popularity of the leading characters in the uniquely-valued column from arising within new groups. At the same time, we keep the number of rows in all groups relatively equal to prevent the insider from guessing which rows have more popular characters based on different group row counts.

The following is an exemplary illustration of this Anonymization Step 5. Imagine B1 has 200 rows and is comprised of 20 groups, each having 10 rows. The column last_name is the most uniquely identifying column and we are working with group 12. A histogram of the first position of the last_name column of group 12's rows shows that there are 3 T's, 3 H's, 2 R's, 1 W, and 1 F in that character position (representing 10 rows). In this illustration the anonymization process utilizes the median to identify popular characters. In this case, the T's and H's are "popular" because their frequencies are above the median. The set of 3 rows associated with the T's are broken into random smaller sets, say one having 2 rows and another having 1 row. We pick one random group in 20 into which to move the 2-row set into; say we pick group 17. The GpNum values of the 2-row set are changed to 17. At the same time, the GpNum value of 2 random rows from group 17 is changed to 12, to preserve row counts in groups. Likewise, we randomly pick a group to move the 1-row set into; say group 2. The GpNum value of this row is changed to 2. Also the GpNum value of 1 random row from group 2 is changed to 12. The same random separation and exchange happens with the rows having the leading H's in their last_name column as well.

Anonymization Step 6: to make re-identifying characters or strings more difficult within groups, three strategically chosen columns are selected. All the rows found by identifying the most popular leading characters of the three columns are moved to newly created groups to dilute the popularity of string values. This step in the anonymization process is to create new groups for rows having popular string values across several uniquely-valued columns. Like in Anonymization Step 5, an intruder could also identify popular string values by combining several of the most uniquely identifying columns and mapping the implicated identifiers to his O1 copy, thereby facilitating the re-identification of the unique anonymized values. Thus, this step identifies columns which contain the most unique values to separate the popular rows from the unpopular ones. The popular rows are then moved out into new groups. As an example, three columns are picked that, when combined, will produce the most unique possible values in B1. Note, if no uniquely-valued columns exist in B1 and the distribution of values in all string columns is equivalent, three random columns for segregation purposes are chosen. (In testing, the Last Name, First Name, and Diagnosis columns contained the most such unique values). A combined histogram of the first and second character of each of the three string values across the three columns is built. From every set of high-frequency rows within the groupings, the number of rows equal to the median frequency of the histogram, or the first frequency found above the median, is moved to newly created groups. By removing a substantial chunk of popular rows from a group, we further disable the intruder's ability to identify the frequencies of unique string values within groups because those frequencies have been substantially undercut. At the same time, the newly-created groups contain rows with identical frequency counts of the character groupings just described. They become also essentially indistinguishable from a re-identification perspective because within the receiving groups the frequencies of their key string values are the same.

The following is an illustration of this Anonymization Step. Imagine B1 has 200 rows and is comprised of 20 groups, having 10 rows in each group. The columns last_name, first_name, and diagnosis are the most uniquely-identifying columns in B1. Suppose we are working with group 8. Table 1 below shows a combined histogram of the 1st and 2nd position of column last_name, the 1st and 2nd position of column first_name, and the 1st and 2nd position of column diagnosis:

TABLE 1

| $1^{st}$ pos. last_name | $2^{nd}$ pos. last_name | $1^{st}$ pos. first_name | $2^{nd}$ pos. first_name | $1^{st}$ pos. diagnosis | $2^{nd}$ pos. diagnosis | freq. | GpNum |
|---|---|---|---|---|---|---|---|
| s | m | j | o | c | a | 3 | 8 |
| s | m | m | a | d | i | 2 | 8 |
| j | o | m | i | d | i | 2 | 8 |
| h | o | s | t | h | i | 1 | 8 |
| p | o | l | i | c | a | 1 | 8 |
| f | r | r | o | c | o | 1 | 8 |

The median in the frequency column is 1.5 and the first frequency greater than this number is 2. We create a new group to transfer the popular rows to. For example, we create group 24. Therefore, 2 of the 3 rows from group 8 matching the first grouping in the table 1 above have their GpNum values changed to 24 in table 2 below. Similarly, both rows from group 8 matching the second grouping in the table above have their GpNum values changed to 24. Finally, both rows from group 8 matching the third grouping in the table above have their GpNum values changed to 24. Table 2 below shows the histogram of the results after this transformation:

TABLE 2

| $1^{st}$ pos. last_name | $2^{nd}$ pos. last_name | $1^{st}$ pos. first_name | $2^{nd}$ pos. first_name | $1^{st}$ pos. diagnosis | $2^{nd}$ pos. diagnosis | freq. | GpNum |
|---|---|---|---|---|---|---|---|
| s | m | j | o | c | a | 1 | 8 |
| s | m | j | o | c | a | 2 | 24 |
| s | m | m | a | d | i | 2 | 24 |
| j | o | m | i | d | i | 2 | 24 |
| h | o | s | t | h | i | 1 | 8 |
| p | o | l | i | c | a | 1 | 8 |

Group 8 has become smaller but because we are doing this for all 20 groups in B1, they also shrink, making their sizes not helpful to an intruder from a re-identification perspective. Group 24, in the meantime, now has 6 rows. Within this group, the combined frequencies of the leading characters of the most uniquely-identifying columns in its rows equal, i.e. they are 2. Therefore, re-identifying the string values in this group also becomes very difficult for an intruder.

Anonymization Step 7 begins to make frequencies of string values indistinguishable in the temporary table. Start to create false rows which when combined with true rows will make frequencies of different string values indistinguishable within result sets derived from this table. Anonymization Step 7 creates equal frequencies of different full-length string values to further make differentiating full-length string values via a frequency analysis attack very difficult. Referring now to FIG. 1, for each string column in B1, a histogram of full-length string values—called tokens from now on—is recorded in table E1 in order of descending frequency. Grouping tokens into sets of 5, the number of rows needed to be added to each token to make it equal the most frequent token in its 5-group set is also recorded in E1. If there are less than 5 tokens in a token's "5-group" set (e.g. it's the last grouping in the histogram), then we record just for those tokens how many rows compared to their leader are needed to make their frequencies equal. Next, the "rows needed" column is aggregated for each column in B1—meaning, it is totaled for each column across all of the column's rows in E1. The largest such aggregated "rows needed" value is found. FIG. 1 below shows an example of a small 3-column B1 (without the padding of string values for clarity), the associated E1 table, and how one identifies the largest aggregated "rows needed" value.

Referring again to FIG. 1, the first_name column has the highest aggregated "rows needed" value—a total of 7 rows needed. Random rows are copied from B1 into temporary table C1 equaling this value (e.g., 7, in this case). The rows will become some of the "false" rows of A1. Thus preventing the intruder from surmising which tokens are requested or returned based on result set size. Tokens will be replaced in the columns in C1 based on the "rows needed" parameter to ensure that when tokens in any 5-group set from E1 are requested, result sets will return true and false rows whose total number approximately equals, thus interfering with any re-identification attempts. New groups are created in C1 so that the row count in each false group is equal roughly to the row count in the original B1 groups. We want to maintain group row counts to prevent the intruder from understanding which are the false or true groups due to an unequal number of group rows. The RecInfo values of all the rows added to C1 are labeled as "false" because these will become false rows in A1. FIG. 2 continues the example of FIG. 1. (It shows how the 7 random rows are copied from B1 into C1. We assume that B1 has approximately 3 rows per group, therefore, C1 must maintain such row counts in its newly-created false groups, too).

Anonymization Step 8: To undermine frequency analysis attacks on individual characters, begin to make frequencies of characters within strings indistinguishable in the temporary table. Begin to create false rows so that when combined with the number of true rows, frequencies of different characters in the same positions become indistinguishable within result sets derived from the anonymized table.

In each string column, the same technique as for tokens is applied to individual characters. For each string column, a histogram of frequencies of individual character positions within that column in order of descending frequency is built and stored in table F1. Grouping these positions into disjoint sets of 5, the number of rows needed to be added to each position to make it equal the most frequent position in its group is also recorded in F1. If there are less than 5 positions in the grouping (e.g. the last group in the histogram), the number of rows needed when compared to their leader is computed just for those positions. The values from the "rows needed" column are aggregated for each position and the maximum aggregated "rows needed" count is found. FIG. 3 illustrates the tasks of this Step. It shows the column first_name taken from a B1 table (unpadded for clarity and different from the B1 used in FIGS. 1 and 2); the resulting F1 table; and how to identify the aggregate maximum number of "rows needed" value.

Still referring to FIG. 3, the highest aggregated "rows needed" value comes from the second position, i.e., 14 rows are needed. Random rows are copied from B1 into temporary table D1 equaling the most such rows needed (e.g., 14 here). These rows will become additional "false" rows in A1. The intent is to considerably undermine re-identification of characters based on result set sizes by making character frequencies within result sets indistinguishable from those of their peers in their 5-group sets. New groups are created in D1 so that the row count in each is equal roughly to the row count in the original B1 groups to preserve group row counts. The RecInfo values of all the rows added to D1 are labeled as "false". FIG. 4 below continues illustrating the example of FIG. 3. (It shows how 14 random rows are copied from B1 into D1. Note that because B1 only has 9 rows, some rows must be (randomly) sampled twice to produce the 14 rows. We assume that B1 has approximately 3 rows per group, therefore, D1 must maintain such row counts in its newly-created false groups, too).

Note, although in this embodiment we focus on creating 5-elements sets to undermine frequency analysis attacks on tokens and character positions, this is a configurable parameter in the embodiments of the present invention. For example, one could create 10-element, 4-element, etc. sets depending on how much security is needed in the ADB.

Anonymization Step 9: "Equalize" the string and character values set up in Anonymization Steps 7 and 8. Among the false rows generated in those two Steps, substitute the needed string and character values to make string and character values almost equal in frequency within their respective 5-element groupings.

That is, Anonymization step 9 is the process of "equalizing" the tokens and positions set up in Anonymization Steps 7 and 8. Using E1 and F1, the tokens and positions specified therein will replace other tokens and positions in C1 and D1, respectively, guided by the former tables' "needed rows" columns.

In the case of tokens and E1, replacement starts using the top (e.g., most popular) token in E1. As substitutions continue, if all E1 tokens are exhausted, yet there are rows in C1 that have not yet received substitutions, substitution continues in a round-robin fashion. That is, tokens are equally distributed among the remaining false rows in C1. Every token in E1 for the column, starting from the top and moving down one token at a time, is used once. If the bottom of E1 is reached once again before C1 is exhausted, the process wraps back to the top of E1 and begins with the top token again.

As an illustration, imagine C1 contains 7 rows, based on the example in FIGS. 1 and 2. In the example there, the first_name column had the highest "rows needed" parameter, resulting in 7 rows in C1. After we create the 7 rows, suppose that, as part of creating false tokens across all of C1, we have now reached the point of processing string column last_name. It only requires 6 rows to be replaced. FIG. 5 shows the subset of E1 dealing with last_name and the C1 table produced from B1. Both tables are the same as in FIG. 1, reproduced here just for convenience.

The substitution process starts with the first row in C1. Moving down E1 and C1, the last_name column in C1 is systematically replaced by 0 Jones's, 1 Smith, 1 Lurie, 2 Jackson's, and 2 Felix's. Because the total number of token replacements via E1 is only 6, for C1's row 7 we go back to the beginning of E1. Row 7 in C1 is replaced with 1 Jones. At this point replacement is stopped because we have substituted for all 7 rows in C1. FIG. 6 shows the transformed C1.

The same substitution approach is taken for character positions. As an illustration, and continuing with the example from FIGS. 3 and 4, imagine D1 has 14 rows, based on the maximum "rows needed" column of position 2 from that example. We have created the 14 rows, and now, as part of creating the fake positions across all of in D1, we have reached the point of working with the 1st position of column first_name in F1. It has a smaller aggregated "rows needed" value compared to its position 2. FIG. 7 shows a subset of F1 with the details of position 1 and the associated D1 table. Both are the same as in FIGS. 3 and 4, reproduced here just for convenience.

Starting at the top of D1 and the top of F1, we systematically replace the first position of the first_name column in D1 with the characters in F1. We substitute in 0 J's, 1 R, 1 S, 2 B's, and 2 V's. Because we have only substituted 6 rows, we return to the top of F1 and now begin substituting in a round-robin fashion. We substitute in 1 J, 1 R, 1 S, 1 B, and 1 V. Our current total, 11, is still 3 short of the needed 14 rows. We start at the top of E1 once more and substitute in 1 J, 1 R, and 1 S, as which point we stop replacement. We have now substituted for all of D1's rows. FIG. 8 shows the transformed D1. Finally, after all the tokens and positions have been substituted in the ways described above, C1 and D1 are appended to B1.

Anonymization Step 10: randomly shuffle the existing groups in the table to further obscure any potential group order. Also create a temporary table which will identify which groups contain false and true rows. That is, this Step randomly shuffles the groups created in B1 to further scramble any potential previously-created group ordering. A new table, G1, is created with new group numbers representing the true and false groups (of course, the true rows are maintained in the true groups while the false groups are maintained in the false groups). Also, a temporary table, Y1, is created to just list which group numbers contain true rows and which contain false rows. This table becomes part of the A1 table private key, part of the database private key, and is used to discard false rows when result sets involving A1 are returned to the client from the server.

Anonymization Step 11: begin anonymizing the numeric columns. Each number is converted to a different number through the use of a consistent mathematical function but with specially-chosen randomized parameters. That is, this Step (11) handles O1's numeric columns. Numeric values are transformed into other numbers using a special monotonic mathematical function. Every numeric column in G1 is processed. For every group, three values are obtained: the average of the numeric values for that group, a random number—called a random multiplier from now on, and another random number—called a random addend from now on. (In our testing for this scheme, we generated a random multiplier in the range of 500,000 to 1,500,000). To encode a numeric value within a group, the average of values in that group is subtracted from the number, the result multiplied by the random multiplier, and to this result the random addend is added. As we will see, such an encoding allows for a various computations like SUM, AVG, subtraction, etc. to be handled to a considerable degree by the server, although requiring some final computations on the client. At the same time, the security of numeric values is maintained because every group will have a random collection of rows. The average of values, a key contributor to the encoding, becomes a pseudo-random number, different from group to group, undermining a frequency analysis attack on the numbers. In addition, the random multiplier and random addend differ from group to group so that the anonymized values have little relationship to each other. One value could have been bigger or smaller than the other in O1, a relationship which the random multiplier and random addend especially help break in G1. The average, random multiplier, and random addend are different for each numeric column as well. All this randomization makes an intruder's ability to re-identify any particular column value, when he sees A1, very difficult. Further, as discussed previously, the number of groups into which O1 is divided can always be increased, creating even more challenges to numeric re-identification. The random multiplier, random addend, and average for each group and column are stored in a table which will become part of the private key. It will be used to "decrypt" the numeric values, or computations involving them, on the client when result sets are returned to the client by the server.

Anonymization Step 12: handle the numeric outliers by transforming them into values within the normal range of their groups. The original values are recorded so they can be later restored within results sets on the clients. That is, this anonymization step (12) involves properly managing numeric outliers. Despite the availability of groups and the mathematical function, certain numeric values may be so different from average that even placing them into groups and encoding them via the average, random multiplier, and random addend will still not hide their value. They look extremely different from the groups they are in, if not the entire A1 table. To prevent the re-identification of such values, in G1, outliers are transformed to numbers which are within the range of the rest of their respective groups. The original values are recorded in a file to be part of the A1 table private key for subsequent restoration within result sets on the client. Before the mathematical function is applied to any numeric value, the number is compared to a number three standard deviations below and three standard deviations above the average of all of the numbers in its group. If the value is at least three standard deviations below or above the average in its group it's considered an outlier and its complete row is recorded in temporary table H1. Its value in G1 is transformed into a value randomly selected from the three sigma range within its group. The point of keeping the outlier values in G1 rather than removing their rows altogether is to preserve the statistics that the other columns within these rows may support. The columns can support the movement of rows to other groups based on character frequencies, etc., as explained in earlier Anonymization Steps. It also becomes more difficult to identify the next outlier values after the most extreme outlier values are transformed if the transformed outliers could randomly take on those next-largest outlier values. The intruder does not know if the "outlier" value he sees is the next-largest outlier or the largest outlier made to look like the next-largest outlier. H1, containing the original outlier values and the values that replaced them, becomes part of the A1 table private key to be used on the client. Note that after an outlier value is modified it is then encoded in the same way as any other number as described in Anonymization Step 11: the group average is subtracted from it, the result multiplied by the random multiplier for its column and group, and the random addend is added to this result based on the column and group.

Anonymization Step 13: create the random encoding/decoding key for the table and use it to permute each character within each string value in the table. This Step involves the construction of the encoding/decoding key for A1 that will be used to obfuscate every character in every string column in A1. A sub-key will be constructed for each group and character position in G1. The combination of all the sub-keys is the complete key that becomes part of the A1 table private key files that is made available to the client machines. For each string column, for each position, for each group in G1, we randomly select how all characters in that position will be permuted into other characters. That is, we don't just permute actual characters that exist in G1 but we create a random permutation of all possible characters, relying on V1, constructed earlier, to supply both the allowed domain and range for the permutation. This is done to make encoding and decoding easier on the client because the A1 table private key has more structure and hence more efficient indexing properties. Table 3 below illustrates small portions of two sub-keys, representing how characters "a" through "e" for column last_name in position 2 in groups 27 and 45 are permuted in a fictitious G1:

TABLE 3

| Original char. | Permuted char. | Column | Position | Group Num |
|---|---|---|---|---|
| a | h | last_name | 2 | 27 |
| b | A | last_name | 2 | 27 |
| c | 4 | last_name | 2 | 27 |
| d | w | last_name | 2 | 27 |
| e | $ | last_name | 2 | 27 |
| a | u | last_name | 2 | 45 |
| b | D | last_name | 2 | 45 |
| c | h | last_name | 2 | 45 |
| d | 3 | last_name | 2 | 45 |
| e | P | last_name | 2 | 45 |

We also create a separate group, i.e., a separate sub-key, for rows which are INSERTed after G1, in the final form of A1, is placed into production. To prevent the intruder's guessing of encodings within existing groups by the introduction of new statistics that might somehow assist in re-identification, we place a new row and its associated statistics into a new group. We also create a random "average" value, a random multiplier, and a random addend for each numeric column and a new sub-key for each string length column to be stored in the RecInfo column for the new INSERT group. (The encoding of string lengths is discussed below in Anonymization Step 15). Note that isolating newly INSERTed rows in their own group certainly tells the intruder that that group number contains true rows. He can focus his re-identification efforts there. However, the intruder cannot know column values of newly INSERTed rows per our threat model. As mentioned in the very beginning, the intruder can only copy the ODB before the anonymization takes place, not afterwards. His copy of the ODB will not have the newly INSERTed rows and he cannot compare anonymized values of these rows with any original plaintext values. He can try to use published statistics—from the Census Bureau, etc.—to mount a frequency analysis attack on tokens or character positions. But given the difficulty in re-identifying the ADB when he has a copy of the ODB, as has been (and will continue to be) shown in this note, breaking the security of the anonymized rows without having the original plaintext values makes re-identification even more difficult.

Still, it also is possible to re-anonymize the database, i.e. create a new ADB, whenever the database owner wishes. The new ADB re-distributes the rows from the INSERTed group into regular groups so that the intruder will not know which groups contain the new rows or what their anonymized content even is. The frequency of re-anonymization can be tied to how many rows are INSERTed into the ADB within some fixed period. If the number of new INSERTs, say, per month, is high, re-anonymization can be more frequent, for example, possibly every few weeks. If the number of new INSERTs is low, re-anonymization can be less frequent, happening, say, once per quarter. (Please see our Implementation Performance Results discussion at the bottom of this note describing when to re-anonymize the ADB).

Next, using the sub-key mappings, each character in G1's string values is permuted into its encoded form. Finally, all the sub-key mappings are combined into one encoding file to be placed into the A1 table private key.

Anonymization Step 14: encode the string lengths of every string value by permuting them into a character in the domain of the ODB and store the encodings in the temporary table. In other words, in this Step, we finish string column processing. The length of each string value is recorded in the RecInfo column of its row. Because the lengths are numeric one could encode them just like numbers more generally. However, this would preserve the order of the encodings within a group because the mathematical function is monotonic. Preserving the order could give an intruder more information about which strings belong to which group. He could compare A1 with the ordered string lengths he has in his O1 copy which could facilitate some of his re-identification efforts. Therefore, more preferably, because one never needs to know the ordering of string lengths during anonymization, the encoding mechanism is the permutation of string lengths into characters in the ODB which are stored in the RecInfo column. Each string column length obtains its own permutation based on the group it's in and the string column it's associated with. Preferably, V1 is relied on. A given string length is mapped to the ordered symbol set in V1 to first identify the character associated with the length of the string. Then we map this character into V1 again to encode the length. As an example, imagine V1 is comprised of 62 characters: the lower case characters, the upper case characters, and the digits 0-9, ordered in this specific way within V1. To encode a string length of 4, we find the character the length is associated with: in this case, it's the lower case "d", the fourth character from the start of V1. Then we permute "d" into another character in V1, for example, "R". Such permutations, sub-keys just like the regular encoding of characters described in Anonymization Step 13, are combined and stored in the encoding file of A1's private key. Because strings lengths should, in general, be small, a typical string length should "fit" within the symbol set of a typical V1. If some string lengths don't "fit" within V1, we could arbitrarily increase the size of our encoding space to any representation. For example, if we need string lengths of up to 10,000 we could create a permutation matrix mapping each length 1-10000 to a 3-position lower-case character value, for example, "dgq". Because we could arbitrarily represent $26^3$, or 17,576 values, using such a representation, using this construction would cover the needed 10,000 character lengths using the symbols in V1. This permutation matrix becomes part of the A1 table private key.

For each group, for each string column, each string length value is permuted as described above. These encoded lengths are concatenated, separated by specially marked delimiters, and placed as one long string into the RecInfo column. That is, they are appended to the flag indicating whether the row is true or false that is already present in that column. FIG. 9 illustrates how a small part of a 2-column G1 having a single "true" row in one group is transformed to contain encoded string lengths. (In the example, we assume the size of V1 is 62 characters. V1 contains the lower case characters, the upper case characters, and the digits 0-9, ordered in this particular way. The sub-key files are separate just for clarity. Ultimately they are combined into one encoding file). Finally, a new table, A1, which ultimately becomes the anonymized representation of O1, is created which contains everything from G1 except for the true/false row indicator in the RecInfo column.

Anonymization Step 15: create indices within the anonymized table to improve query performance. The next anonymization Step, 15, is to create indices on the anonymized table to improve query performance. Because simple textual and numeric manipulations are used to encode the plaintext data in A1, many of the indexing functions of the underlying database engine work on the anonymized data. This embodiment creates a non-clustered index on each string column in A1 to speed the processing of queries. In addition, because groups play a key role in extracting data, on numeric columns, a multi-column, non-clustered index is constructed with the GpNum column being the leading column in each such index. A single clustered index comprised of, in order, the GpNum, RowNum, and Last Name columns, is also constructed to further enhance query performance. Indices are not created on the RowNum or RecInfo columns. When we tested with indices on these two columns, they appeared to slow down rather than speed up queries. We also create a special index on the R1 table. We want to ensure that only unique RowNums are inserted into it. We create a UNIQUE index on R1 and also specify that this table should ignore any duplicate RowNums insert attempts, the motivation for which will be explained when we discuss the DELETE command later on. (In the Microsoft SQL Server 2008 environment, which is our testing environment, ignoring duplicate rows means that the index is created with the IGNORE_DUP_KEY=ON parameter). At this point, we are finished with O1 and it can be detached and stored for later reference. Table A1 is ready to be used by the database application(s).

Anonymization Step 16: anonymize the other tables of the original database, following the steps similar to Anonymization Steps 1 through 15. To handle the other tables of the ODB, O2 . . . Op, a similar process to the one described in Anonymization Steps 1 through 15 is undertaken. If these tables do not need to be JOINed on any columns to each other or to O1, the anonymization process for these tables becomes a two step process. To speed table anonymization and the loading of the database private key into memory on client computers, some of the encodings used for A1 may be used to encode columns in the other A1. The appropriate number of groups is chosen for tables Oi independently of O1 and the anonymization of Oi is done using Oi's data. However, when it comes to choosing the average, random multipliers, and random addends for Oi's numeric columns and the sub-keys for Oi's string columns, the database script checks table A1's and table Ai's columns. Every Ai column that has an analogous column in A1 can use the average, random multipliers, random addends or character encoding for that A1 column. Anonymization steps 1 through 15 have already equalized the frequency of tokens and character positions of Ai strings. The shuffling of the values in numeric columns into random groups and the creation of false numeric values—when false records were created during string and character "equalization"—masks the numeric values as well. Hence, the average, random multipliers, random addends, and sub-keys—the final overlays over the true anonymization performed earlier—, can be re-used. If the number of groups in some Ai is greater than the number of groups in A1 then new numeric and string encodings will have to be created for those groups. Also, for those Ai columns that have no equivalent in A1, the average, random multipliers, random addends, and sub-keys are chosen independently as described in Anonymization Steps 11 and 13, respectively. Each position and numeric value in each group is encoded either using A1's private key or Ai's private key. Each table Ai also gets its own Ri table to assist with managing DELETE commands. Indices are also created on the Ai as for A1. If some of Ai's columns use the same encodings as analogous A1 columns, the private key files associated with those encodings do not need to be stored on the shared network drive. Clients will rely on A1's private key files to encode and decode those Ai columns. Otherwise, all the Ai private key files used to encode queries and decode the results targeting the Ai are installed on the shared network drive to be accessed by client machines.

If a table Oj must be JOINed on one more or more columns with Oi, which has already been anonymized earlier, a somewhat different procedure is undertaken. Imagine we know which columns will be used for the JOIN prior to anonymizing Oj. The columns used for JOINing Oj must be anonymized in the same way as the corresponding columns in Oi because strings must match when compared. Although our JOIN process can handle multi-column and multi-table JOINs, we'll use the following simpler example to illustrate how JOINs are handled.

Now, suppose one wanted to JOIN O2 to O1 and only one column will be used for JOINing. O2 is copied into temporary table B2 which will similarly have the new RecInfo, GpNum, and RowNum columns created. The same strings in B2 must be padded as they were padded in B1 because we may be doing full-length string comparisons during the JOIN. Because the padding mechanism is deterministic—i.e., appends the same value over and over, character by character, until the maximum length of the string value is reached—tokens that are identical between B2's and B1's JOIN columns will be therefore padded the same way.

Figure 10:
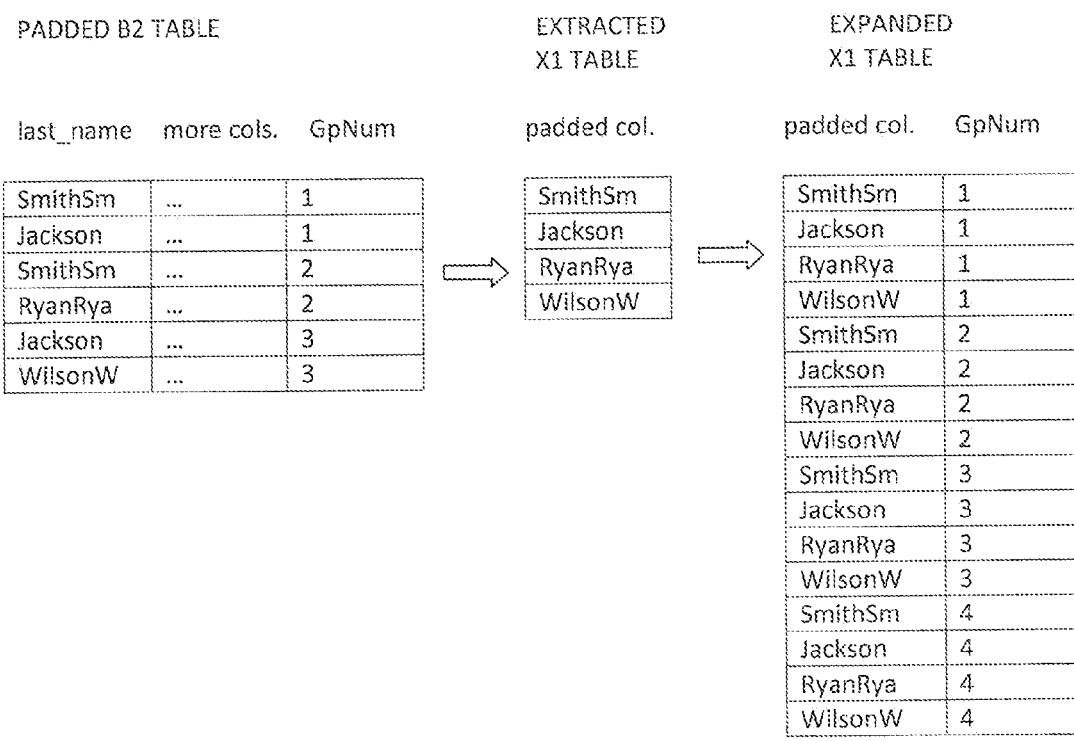
FIG. 10 is a depiction of a system and method of constructing a sample X1 table, used for JOINing two anonymized tables.

Next the unique plaintext padded values from the JOIN column in B2 are recorded in a separate table, X1. Unique X1 values are reproduced within X1 as many times as there are groups in A1. Such a construction of X1 will allow the extraction all potential rows from A1 and A2 when they are JOINed across their different group encodings in any JOIN query. Obtaining such rows will, in turn, allow one to rebuild the JOIN result set on the client. This is discussed in more depth later on but, essentially, X1 acts as a bridge, allowing one to return to the client all relevant rows from A1 and all relevant rows from A2. Using these data, the driver then finalizes the presentation of the JOIN result set on the client. FIG. 10 illustrates the construction of X1. (It shows how the X1 is extracted from a small 3-group padded B2 and then how it's expanded based on the associated (and not shown) 4-group A1).

How the X1 table is used to handle JOINs is discussed later on.

Note, if the JOIN column(s) are not known ahead of time and are only later determined, the anonymization steps related to O2 can be done when the columns for the JOIN are determined. A re-anonymization of O2 will have to be done as follows: O2 can be retrieved from archived storage. Alternatively, after O2 is constructed it can be decoded and the re-anonymization done on the resulting plaintext table.

Next, the same steps as for O1 are followed for O2. The same number of groups as for A1 is selected to construct A2. The group number must be preserved because we want to preserve the encodings for the column on which the tables are JOINed. All other steps—with regard to moving rows to new groups based on character frequencies; grouping string values and individual characters into 5-element groups; etc.—are done as before based on O2's data. The final groups of B2 are compared to Y1, the table created earlier indicating which are the true and false groups in A1. The true and false group numbers of B2 are converted to, respectively, the true and false group numbers of A1 so that the group-based encodings for JOIN purposes can be maintained. Note, even if O2 is very small or very large and generates less or more groups compared to O1, respectively, this is acceptable because our driver can still construct a JOIN query to return appropriate rows of the two tables implicated in the JOIN to finalize the presentation of the result set on the client. Once again, for faster processing any other numeric and string columns in O2 analogous to those in O1 can use the same average, random values (multiplier and addend) and encodings as for each group in O1. For any different columns, the numeric and string columns must be transformed with independently generated average and random values (multiplier and addend) and encodings. In either case, the X1 table used for JOINs is encoded using the same encodings as that of its counterpart column in A1. Indices are ultimately created on A2 as for A1. Table A2 is now ready to be placed into production.

If tables O3 . . . Op are also candidates for JOIN, their anonymization follows the same steps as just described for O2.

Tables A2 . . . Ap are now created and can be placed into production.

Placement into Production

To place this scheme into production, in accordance with embodiments of the present invention, the ADB is made accessible to all the users that need it. A driver is installed on each appropriate client workstation. The application(s) that access the ODB are re-configured to point to our driver instead of the ODBC driver they currently use.

The database private key is made available to all clients. The database private key is composed of the Ai table private key files and general database files. The following are the private key files for each specific Ai in the ADB:

1. The Y1 table, indicating whether a particular group is true or false.
2. The encoding file describing how each character position is encoded for each group in each string column. This file also describes the encoding for each string length "column" in each group.
3. The file describing the average, random multiplier, and random addend for each numeric column in each group.
4. The H1 table, describing the original and modified numeric outlier values in certain rows.
5. The file containing the maximum lengths of each padded string column.
6. The file describing how many rows there are in the entire table.
7. The file describing how many groups there are in the table.

The following are the general database files:

1. The V1 table, containing the domain of the characters in O1 . . . Op.
2. The file describing how many rows the database server can handle within an anonymized subquery whose components are linked by OR statements. (This is further explained in the "Constructing Anonymous Queries" section).

These nine files must be placed on the shared network drive that all clients access, as discussed in the beginning of this document, from which all clients can obtain them.

Encrypted Operations

Query Re-Write by the Driver

Now described is how the driver constructs the queries for the scheme. The scheme fully operates over encrypted data given the breadth of SQL commands and does not require decryption. Therefore, the driver translates plaintext queries from the database applications into encrypted queries so they can work with the ADB. Now described is how the driver handles such query re-writing and management in general and then how it handles issues specific to specific kinds of SQL queries. As for the almost real-time performance feature of queries through the use of indexing, this is discussed in more detail in the Implementation Performance Results section. The driver loads the private key into memory for faster data encoding and decoding. The driver intercepts and parses each query going from the client application(s) to the server. The driver identifies all the columns where constants are specified (for example, in SET clauses of UPDATE statements, WHERE clauses in SELECT statements, etc). The driver encodes these constants for each group of the table(s) targeted by the query using the table's (or tables') private key; it constructs a large multi-part query. To illustrate, query construction for a single table A1 is demonstrated as an example. However it is readily apparent that the driver can readily work with multiple tables. For each A1 group, the driver creates a sub-query containing the column(s) which are implicated in the query and it properly encodes the relevant constant(s) for that group. All the sub-queries are appended together using OR statements into larger tuples.

Constructing Anonymous Queries

Based on our test results, it has been found that the server efficiently processes queries when each of these larger tuples manages a specific number of rows across all of its sub-queries. In our testing, an MS SQL 2008 Server worked efficiently when there were about 260,000 rows processed by each of these larger tuples. The 260,000-row capacity may be server specific. Therefore, it is a configurable parameter, i.e. a file, in the database private key. The driver computes how many sub-queries to place within a larger tuple so that the server efficiently handles anonymized queries. The driver knows the number of rows and the number of groups in A1; they are part of the database private key. Therefore, the driver uses the following formula to compute the optimum number of sub-queries to place into the larger tuples:

$$\text{round}([260000*\text{number of groups in table}]/\text{number of rows in table})$$

Once the larger tuples are formed, they are combined with UNION statements to produce a large multi-part query. In certain cases, to more easily manage queries, one may preferably invoke a stored procedure on the server. In this example, it is passed as a list of the encoded constants. The stored procedure parses our list and dynamically creates and executes the necessary SQL statements. Note that when string columns are implicated by the application's query, the driver automatically supplies the correct padding to identify the correct strings. As discussed in Anonymization Step 3, every string value is padded by repeatedly appending it to itself, one character one at a time, wrapping back to the beginning of the value until the maximum length of the column is reached. After the padding, the driver is ready to encode the constant(s).

Anonymous LIKE Statement Processing

If the WHERE clause of a user's query contains a LIKE statement, the proper construction of the encoded LIKE statement depends upon the construction of the plaintext LIKE constant in the query. If the wildchar '%' is the final character of the plaintext LIKE constant, then the encoding of the constant in the encoded WHERE clause encodes the prefix before the wildchar for each group in A1. But if the plaintext LIKE constant contains wildchars prior to the final character of the constant, then the driver will have to create a multi-component query. Each component will encode a full query to find the rows where the encoded LIKE constant is located at a specific position in the string. The query components will be ORed together to produce the multi-component query that finds all the needed rows satisfying the user's request. In particular, each component query focuses on encoding a LIKE constant that locates the needed constant within different string positions using a moving index across the implicated string column. The first component query, starting at the index of 1, encodes the query so that the LIKE constant is found in the first position of the implicated string column. Continually moving the index to the right by one, each subsequent component query encodes the query so that LIKE constants are found at each successive character position in the implicated string column. Component queries are created until the maximum length of the implicated string column, available from the targeted table's private key, in memory, minus the length of the plaintext LIKE constant, has been reached. The "placeholder" SQL character "_" will be used to fill all the positions in the encoded LIKE constant before the index currently being examined. This will force the encoded constant to be found at that particular index position of the encoded string and nowhere else in the implicated string column.

Anonymous LIKE Statement Example

The following example illustrates the construction of a multi-component query for a non-trivial plaintext LIKE constant. Imagine the driver receives a SELECT statement which includes the WHERE clause " . . . WHERE last_name LIKE '% ack %'". Assume the column last_name has a padded length of 8 characters. The driver will produce a 6-component query. The first component will encode "ack" for all A1 groups for last_name character positions 1, 2, and 3. The encoded LIKE constant will have zero "_"s preceding it because the constant for this component query tries to find strings where it is present specifically in the beginning of the string, in position 1. For example, if "tr2" are the encodings of the characters "ack" for positions 1, 2, and 3, respectively, the LIKE clause for this component query would be " . . . LIKE 'tr2%'". The second component query encodes "ack" for all A1 groups for last_name character positions 2, 3, and 4. The encoded constant has one "_" preceding it because this encoded LIKE constant aims to find strings where it is specifically found in position 2 in the string of the implicated string column. For example, if "f5P" is the encoding for the characters "ack" for positions 2, 3, and 4, respectively, the anonymized LIKE clause for this component query would become " . . . LIKE '_f5P %'". And so on, until the encoding of the sixth query component. That component will encode "ack" for all A1 groups for last_name character positions 6, 7, and 8. The encoded constant has five "_"s preceding it because that anonymized LIKE constant tries to find strings where it is found starting at exactly position 6 of the string. For example, if "J9a" is the encoding for the characters "ack" for positions 6, 7, and 8, respectively, the anonymized LIKE clause for this component becomes " . . . LIKE '_J9a'". (There are five underscores between the apostrophes in the constant). These six components are ORed together to produce the large multi-part query. Note that the encoded LIKE constants, especially those in the last few component queries, may implicate rows where the constant is found in the encoded padding as opposed to the actual encoded string value. These rows will be discarded on the client. As part of the cleaning of the result set on the client, the driver checks whether the constant found in the string is within the permitted length of the string. The string length is obtained from the RecInfo column. If it's not within the length of the string the row is discarded.

Presenting Results to User

The large encoded query (or encoded list for the stored procedure) is sent to the server and encoded results, if any, are returned to the client. If any results are returned, the driver first discards any fake rows. It compares their GpNum values with its file in memory describing which groups are false and which are true. In the remaining rows, all the string values are trimmed based on their original lengths as encoded in their RecInfo columns. Next, the encoded strings and numerical values are decoded. As each numerical value is converted to its original value, first, its associated RowNum is compared to the outlier RowNums, also in the database private key in memory. If the RowNum matches the RowNum flagged as having one or more numerical outlier values, the original outlier value(s) is reinstated before the result set is returned to the user. Similarly, towards the end of any result set processing, every outlier value is examined to ensure that if no row was returned containing that outlier value, but the value should have been in the result set, an outlier row is created with its original strings and numeric values in the result set. A similar process is undertaken when an arithmetic query implicates an outlier value. Any arithmetic computation (e.g., SUM, AVG, etc.) result returned by the server is additionally (re)processed on the client to include any outlier value(s) involved in the computation. All the plaintext rows in the result set can finally be returned to the user. It's important to note that the result set comes back to the client as one set of rows which are processed and then returned to the user. The driver does not wait in a loop interacting with the server, obtaining partial result sets and building up the final result set. Our driver could be implemented for such interaction, but currently works with a single query and a single response. FIGS. 11A-C show how a small result set from a SELECT query targeting a simple table is decoded based on the database private key in memory. (Bold characters are used to illustrate the changes happening to implicated row values after each step).

Now described are the handling of specific queries:

Select

A SELECT statement is handled like the general query case described above. However, as will be further described when discussing the DELETE command, only rows which are not in the R1 table, which are rows being scheduled for deletion, can be involved in any query. When constructing the SELECT query, the driver therefore appends to it a clause to do an OUTER JOIN with the R1 table. From the table resulting from this OUTER JOIN, the query selects only those rows whose RowNums are not in R1. These rows are then returned to the client as the result set.

Count

A COUNT statement is implemented relatively directly. As in the SELECT statement discussed above, the result set must only include those rows which are not scheduled for deletion. Again, the clause to do an OUTER JOIN with R1 is appended to the encoded COUNT query to count only the non-R1 rows. Sub-counts of rows for each group, based on the associated SELECT statement with the COUNT clause, are returned along with the group numbers for each sub-count. The client discards the sub-counts of false groups, adds the remaining sub-counts, and presents the final COUNT result to the user.

Update

An UPDATE statement is handled partly like the general query case. Because the rows implicated by an UPDATE command may cross groups, we use a different "SET <variables>" clause for each group to UPDATE the variables in that group using its proper encoding. Consequently, each group gets its own UPDATE command. For each UPDATE command, the client encodes the constant(s) the user is searching for (e.g., specified in his WHERE clause), and the constant(s) we want to set the column(s') values to.

To preserve the padded length of the constants to be inserted, before they are encoded, they are padded with the original string value repeatedly. As explained before, this is done character by character until we've reached the maximum length of the column. Further, because the new constants may have a different length than the string values they replace, we update the RecInfo column for all the affected rows with the new lengths. The driver encrypts the new length of each constant by permuting it into a character in the ODB domain, using the sub-key in the overall encoding file, available in memory, for the associated string length "column" and group. The client sends to the server a list of UPDATE commands separated by blanks. The server treats each UPDATE command independently. Each UPDATE command updates the implicated rows in a specific group with the new constant(s) and sets the proper RecInfo locations of those rows to the constants' new lengths.

An important point to make is that whenever UPDATEs are issued, if rows with outlier values are implicated, this should become known to all client machines. Otherwise, they will continue to rebuild result sets with outdated outlier values. The client issuing the UPDATE to the outlier(s) will update his database private key in memory with the new outlier value(s). Its driver will then copy the outlier file (the H1 file, as per Anonymization Step 12) into the shared network drive for all the other clients to access. Thus, before it issues any query, the driver on any client checks the shared network drive to see if the date or time of the outlier file are different compared to the file it has in memory. If date or time is different, the driver uploads the new file into memory before making a query to the ADB.

Insert

An INSERT statement is handled by working with the last group in A1. For each new row to be INSERTed, all the string values of the row are padded by repeating their values until the maximum lengths of their columns are reached. The padded values are then encoded using the sub-key, within the overall encoding file, for A1's last group. The numeric values of the row will be converted using the random "average" value, random multiplier, and random addend for the last group. The true lengths of each string value are mapped into random characters in V1 using the sub-key for each string length "column" for that group. The lengths are also recorded in the RecInfo column. The next sequential RowNum for the row is also created for the row. (In our case, this is done automatically by the server because the RecInfo column is designated as an IDENTITY column in A1 in our test database. When a new row is INSERTed, the server automatically assigns the next numeric value to the RowNum value of that row). Because during UPDATE and SELECT commands we UPDATE and SELECT from A1's last group, the new row is now retrievable from A1 if it's implicated by a query.

Delete

DELETE commands are handled in a special manner. Because we found, during our testing, that straightforward DELETE commands to the ADB were taking 3-4 times longer than one reference standard we compared our performance to—the Microsoft JDBC driver, as we will discuss in our Performance section below—, we came up with a different solution for row DELETEs. We created the R1 table. (Please see Anonymization step 2 for a description of R1). The DELETE command is constructed similar to a generic query. But rather than deleting rows, it constructs INSERT commands for each group, INSERTing the RowNums of the rows to be DELETEd into R1. A scheduler is set up on the server to invoke a stored procedure to actually DELETE the rows in R1. We found when testing, that when the stored procedure tried to delete a large number of rows, other client queries were forced to wait until the command completed (apparently due to table or row lock-outs). We had to break our scheduled DELETE tasks into smaller chunks. Rather than scheduling a DELETE for all rows in R1, our stored procedure was configured to only DELETE 100 rows at a time. The stored procedure was scheduled to run every minute of every day. With such a configuration, actual row erasures had negligible impact on the client's other queries. (See the Performance section for additional information on DELETE command performance). Of course with our scheme, a given customer can schedule more deletions per run, or, conversely, less frequent runs, knowing the performance capabilities of its hardware and software.

Note that whenever DELETEs are issued, if rows with outlier values are implicated, this should become known to all client machines. Otherwise, just like for the UPDATE command, clients will continue to build result sets with outdated outlier values. The client issuing the DELETEs to the outlier(s) will remove the value(s) from his database private key. Then he will copy this file (i.e. the H1 file) into the shared network drive with the other database private key files for all other client machines to access. Before any query, each client driver checks to see if the outlier file on the shared network drive is more recent compared to the file it has in memory. If so, the driver uploads the new outlier file before making new queries to the ADB.

Join

Various JOINs can be started on the server and completed on the client. This uses the Xi tables created in Anonymization Step 16. When JOINing Ai to Aj, Ai is first JOINed with the Xi table and then the Xi table is JOINed with Aj. The results of both JOINs, modified to extract only those set of columns requested by the user, are sent to the client. The client will then restore the proper JOIN result set and present it to the application. For illustration, we focus on retrieving the rows of A1 when it's INNER JOINed with A2 over a single column. But other kinds of JOINs (e.g. LEFT, SELF, etc), including multi-column and multi-table JOINs can be similarly done using such a scheme. Suppose the column name is I_name and we want to merge the tables intake and discharge. The JOIN we discuss is: "SELECT a.*FROM intake AS a JOIN discharge AS b ON a.I_name=b.I_name". We first describe the mechanics how our driver implements the JOIN and then show an example to clarify the points. We obviously cannot do a JOIN of the two implicated tables directly on the server due to different group encodings in the ADB. Imagine I_name "Jones" is in group 5 of A1 and in group 7 of A2 but does not exist in group 5 of A2. A JOIN involving equality comparisons between A1 and A2 would fail to produce results for "Jones" because, due to different encodings, its versions in A1 group 5 and A2 group 7 could not be directly equated. Currently our driver implements JOINs via a stored procedure on the server but this can also be ported to the JAVA (programming language) code in our driver. Upon getting a JOIN request from the application, the driver sends the tables and column implicated to the stored procedure. The stored procedure combines the results of two special types of queries in one table, J1, which it returns to the client. The driver will restore the correct JOIN result set for the user on the client via J1. The first component of J1 is the selection of rows from A1 when it is JOINed (i.e., based on equality or other comparison as specified in the user's query) to the encoded X1. Because X1 encodes all values of A2 encoded as for every group in A1, all possible A1 rows that can link to A2 rows on that column are selected, regardless of encoding. The second component of J1 will select the rows from X1 which are JOINed to the rows of A2 (again based on the comparison as specified by the user's query), GROUPed BY the frequency with which they occur in X1. Because X1 encodes all values of A2, we are basically merging A2 with itself. The intent is, for each group, to identify for each A2 token how many times it is implicated in the JOIN. This frequency is used to reproduce the correct number of times the rows from the first part of J1 are found in the result set, as will be shown below. Both J1 components are returned the client in one combined result set.

The driver handles the returned J1 via a loop. First, all the rows in both components of J1 are stripped of false rows. Next, the column implicated in the JOIN is fully decoded in both the first and second components of J1 so we can compare strings without the interfering group encodings. Next, for each row of the second part of J1 (i.e., the A2-implicated rows of the JOIN), every row in the first part in J1 (i.e., the A1-implicated rows) is checked. When there is a match of rows based on the requested comparison, each row in J1's first part is reproduced in the result set as many times as the frequency count for the row from the second part specifies. The effect of this step is to reproduce every row in A1 exactly as many times necessary as if we did the INNER JOIN directly on the server for the implicated column. And when done for all rows from both components in J1, the result is the one requested by the user: we pick just the rows of A1 when it forms a cross-product with A2 on the implicated column. FIGS. 12A and 12B illustrate the INNER JOIN process over tables intake, discharge, and X1. (In the example shown in FIGS. 12A and 12B, we do not show how the values in the I_name column were originally encoded but that once decoded they can be readily JOINed. Also, the padded string length for I_name is 6 alphanumeric characters. Further, only the true rows are shown in the intake and discharge tables for a simpler presentation. Finally, for easier visualization, the bold italicized rows shown in the intake, discharge, and X1 tables are the ones implicated in the JOIN with X1 in either J1's first or second component). The result table obtained can now be fully decoded and returned to the application.

Mathematical Functions

With regard to mathematical calculations, some calculations can be performed on the server with intermediate results transferred to the client for additional computations and final presentation to the user. For other mathematical computations, complete rows, or at least the numeric values of the implicated columns, must be returned to the client and the full calculation be performed on the client. In all cases, the R1 table is used to avoid computing with rows that are scheduled for deletion. The sections below explain how different computations are managed.

Comparison Functions

Comparisons such as '>', '<=', etc. involving numbers can be done on the server. Because the encoded numbers are ordered within each group, we can select from each group exactly which rows satisfy the comparison. By specifying a different comparison constant for each group, the same procedure to create the multi-part query as for the general query case is done here, with each query component seeking the rows which satisfy the comparison in its group. The single large query therefore obtains all the rows satisfying the comparison function in the table.

Aggregate Functions

MIN and MAX functions can be partially performed on the server and completed on the client. Just like the Comparison Functions above, due to the monotonicity of the mathematical function, the server can find the MIN or MAX value(s) within each group, returning them to the client. The driver can decode the sub-group MIN/MAX values and return the overall MIN or MAX across all the groups to the user.

The SUM computation can be started on the server and completed on the client. As an illustration, consider doing a SUM for just one group, to understand the general case. Imagine that the user wants to compute a SUM of a column, and a total of 3 rows from the same group are implicated. The original implicated numeric values are A, B, C; the user needs A+B+C. We add the encoded values for A, B, and C on the server and remove the average and random multiplier factors on the client. Suppose A, B, and C are in group 12 and are encoded as follows:

$((A-\Delta 12)*RM12)+RA12$
$((B-\Delta 12)*RM12)+RA12$
$((C-\Delta 12)*RM12)+RA12$ Here $\Delta 12$ is the average of the implicated column for group 12 while RM12 and RA12 are, respectively, the random multipliers and random addends for the implicated column for group 12. If we add these encodings on the server, we get:

$((A-\Delta 12)*RM12)+RA12+((B-\Delta 12)*RM12)+RA12+$
$\quad ((C-\Delta 12)*RM12)+RA12=$
$[(A-\Delta 12)+(B-\Delta 12)+(C-\Delta 12)]*RM12+3*RA12=$
$[(A+B+C)-3*\Delta 12]*RM12+3*RA12$ We return this value to the client. We also need to return the number of rows implicated to the client, in this case 3. The driver subtracts from the returned result <number of rows implicated>*[random addend for group] (i.e. 3*RA12, in this example). The random addend it has in its database private key in memory. This result is divided by RM12, which it also has in memory. To this result the driver adds <number of rows implicated>*[avg of column for group] (i.e. 3*$\Delta 12$, in this example. Note, the driver has $\Delta 12$ for the implicated column in memory as well). The end result is the required SUM. For a more general multi-group SUM, the group-specific SUMs along with their row counts are returned to the client just as in the example above, decoded, and added together to provide the requested multi-group SUM to the application.

The computation for AVG can be done similarly to SUM. We compute the SUM for each group as above, combine each of the partial results on the client to produce a total sum, and divide this value by the total number of rows selected, which should be returned for each group. This is the desired average.

Other Functions

Although other mathematical functions can be partially performed on the server they mostly have to be done on the client. For trigonometric functions (SIN, COSINE, etc), the rows implicated need to be returned so that the trigonometric functions can be computed on the client. Logarithmic functions have to be computed on the client as well. Exponential functions can be partially computed on the server, but administratively it's easier to do the full computation on the client. Since the random addend for the group, now exponentiated, was added to the original numeric value, it will have to be removed by dividing the exponentiated value from the server by the exponentiated random addend. The random multiplier, a multiplier, would have to be removed on the client by dividing this result by the exponentiated random multiplier. Because the average for the group, now exponentiated, was subtracted from the original numeric value, it will also have to be removed by multiplying the previous result (which removed the exponentiated random multiplier) by the exponentiated average. Given these complex corrections, it's easier to perform the entire calculation on the client. Various other functions (e.g., STDEV (Standard Deviation), POWER, etc.) must be computed on the client as well.

Ordering Functions

GROUP BY and ORDER BY Statements

The GROUP BY and ORDER BY functions can be initially done on the server but mostly will be handled on the client. The GROUP BY function can aggregate data within a group. If only a single group's rows are implicated, the client can simply decode and return the GROUP BY results collected by the server to the user. If the aggregation of variables is done across groups, the server must return the results GROUPed BY within individual groups because of different encodings across groups. The client will decode the data, synthesize values across groups, and present the aggregate results to the user. A similar approach is used for the ORDER BY function. If numeric values must be ORDERed BY and they are just contained within one group, sorting them can be readily done on the server just as described in the Comparison Functions section above. If numeric values must be ORDERed BY and multiple groups are implicated, then all the affected rows will have to be returned to the client, decoded, and ordered in DESCENDING, etc. order and presented to the user. Numeric order is not preserved across groups. Finally, all affected rows will also have to be returned to the client when doing ORDER BY involving string comparisons. Because lexical order is not preserved after original plaintext characters are randomly permuted into other characters, all the implicated rows will have to be returned to the client. The driver will decode the rows, alphabetize the strings as requested, and present the ordered rows to the user.

Performing Secure String Comparisons

However, outside of the ORDER BY clause, doing direct string comparisons—e.g., when explicitly requested by the user in his WHERE clause—, is possible on the server. The driver constructs SQL requests to extract the necessary strings plus false SQL requests to extract strings which are purposefully NOT "greater than", NOT "less than", etc. compared to the user's comparison string. The former SQL requests provide the needed result set rows while the latter SQL requests undermine the intruder's re-identification efforts. Although lexical order is not preserved on strings, the driver does know which strings are ">", "<", etc. compared to the user's comparison constant(s). Our anonymized query is constructed to specifically ask for those strings. Due to the sheer volume, the driver doesn't itemize all possible strings meeting the user's criteria. Instead, the driver only specifies the individual characters in the first character position of the string that satisfies the user's request. The driver constructs a LIKE statement containing all the needed first position characters which, collectively, locates a superset of all strings that are in the user's requested range. From this result set the driver selects the specific rows needed by the user. For example, if the user asks for all rows " . . . WHERE last_name>'williams'", the first letter in the comparison string is "w". The range is the lower case letters; therefore, on the server we must find those rows where last_name starts with individual letters from "w" though "z". Each of these letters in the range enters a LIKE clause so that the correct rows can be located in the targeted anonymized table. The driver also adds to the LIKE clause several false characters, opposite of what the user asked for, to retrieve fake, unnecessary rows as well. Given the WHERE clause just mentioned, the driver will ask for last_names that begin with, say, "d", "e" and "k" to be returned, too.

From a security perspective, the intruder, who sees how many parts comprise our LIKE statement, will not be able to tell which string the user originally asked for. First, we are asking for character positions, not strings, so the most the intruder can surmise is that we are looking for ">='w'" rather than ">'williams'". Second, the mere fact that we send a particular number of characters in our encoded LIKE statement does not tell the intruder if the encoded query represents a simple comparison such as ">='w'" or a more complex one such as ">='c' AND <='f'". In both cases, in the domain of lower-case characters, both requests will produce an equivalent 4-component query (not including the fake character requests). Hence, the intruder cannot say what the user really asked for from the database. Third, the intruder also cannot guess which characters we are looking for because of the addition of false characters. The total number of characters in our LIKE statement will probably be larger than the total number of characters arising just from the range of first characters that we are specifying in the LIKE clause. The intruder can count the characters in the LIKE clause and find the letter that is this many positions from the end of the range or the letter that is this many positions from the beginning of the range. But he will be unable to discern the first letter in the user's original comparison constant because he cannot compute the right offset to be used due the inclusion of the fake characters in the LIKE clause. Finally, the intruder will also not be able to surmise which characters we seek because he will be unable to tell the range we are working with, further weakening re-identification efforts. Lower case and upper case characters are both encoded through random permutations in V1. Simply looking at an encoding does not reveal the case of the original plaintext character. Seeing an "h" as an encoding of a plaintext character does not reveal to the intruder whether the encoded query represents ">='s'" or ">='S'".

String Comparison Example

The following example is an illustration of how a string comparison query is constructed. Consider the request "SELECT * from patient WHERE last_name >'smith'". We focus on the first character of the constant "smith", the letter "s". For each group in "patient" (i.e., now it's in the form of the anonymized table A1), we construct a LIKE statement to find strings beginning with "s". The driver appends one character at a time to the clause until it reaches the end of the range of the domain. The range in this case is "s" through "z". To understand the construction of the entire query, let's just focus on encoding one group, say group 23. In group 23, these 8 characters are encoded as, respectively, a, 6, d, w, U, p, Q, s. They enter our anonymized LIKE statement. We also find 0-10 "fake" characters preceding "s", say, a total 4 characters. Imagine these characters are q, e, g, b, and they are encoded as, respectively, y, 3, 9, L in group 23. These characters are also added to our LIKE clause. The encoded subquery for group 23 in A1 becomes: "SELECT * from patient WHERE last_name LIKE '[a6dwUpQsy39L]%'. A similar encoded subquery will have to be constructed for all the other groups in A1. All the subqueries are combined into one large query as in the general query case described above and sent to the server. Upon return, in addition to deleting all the false rows, all the unasked-for rows are deleted by the client, too. In the case of group 23, these would relate to the encoded characters y, 3, 9, L. The client would have to delete the unasked-for rows from the other groups using their encodings as well. Lastly, the last_name values in all the remaining rows are decoded. They are compared to the original comparison string "smith" to find just the last_name values which are ">'smith'". These rows are then fully decoded and returned to the user.

Performance of String Comparison

Because we return more rows to the client than necessary, this method appears a bit slower than if we could issue string comparisons more directly. However, the majority of these rows will have to be returned anyway because they are implicated in the user's query. Any slower performance of this approach therefore mostly arises due the additional rows being retrieved from the fake character requests in the LIKE clause. However, as our Implementation Performance Results section below shows, the overall performance of our scheme on various commands (e.g. SELECT, UPDATE, DELETE, etc.) is good and that includes the use of LIKE constants in WHERE clauses. Therefore, delays to retrieve the fake rows for this approach should be manageable as well.

Programming Constructs

In addition to general queries, programming constructs such as STORED PROCEDUREs, VIEWs, and similar functions on the server called by clients' database application(s) can be "anonymized" on the server as well so that they can also work with the anonymized data. Whether the database script of the construct has to be changed on the server, however, depends on its complexity. A simple construct performing very basic queries may require no changes and our driver can call it directly. A simple construct expecting arguments also may require no changes. For example, if the construct takes arguments and targets a single table, our driver can simply create a long query containing as many subqueries as there are groups in the resulting anonymized table. Each subquery will call the construct once using encrypted constant(s) for a particular group in the anonymized table. These subqueries can be linked together via UNION statements so that the client ultimately receives the full set of result rows. Certainly complex constructs may require changes to the database script so that various queries can properly deal with the anonymized data.

In embodiments of the present invention, the anonymization process is a relatively infrequently-run process, perhaps happening quarterly or semi-annually. It must be done once to create the ADB. If no new rows are subsequently INSERTed, the owner of the ODB may wish to re-anonymize the ODB several times a year, much as if changing an application or network password. Although statistics are secure and are not changing, good security practice dictates that periodically changing the secret preserves its secrecy. Malicious observers are noticing information about queries and encodings in the ADB, which improves their attempts at re-identification of these essentially static data over time. If rows are INSERTed regularly, the ODB owner may want to re-anonymize the data perhaps once per month or more frequently to create more secure statistics. The ODB must be available for the re-anonymization; alternatively, the ADB can be decrypted and the resulting plaintext database re-anonymized. After every re-anonymization, the new database private key must be placed on the shared network drive. Other clients will access this database private key so that they can properly work with the newly-anonymized tables.

In the foregoing exemplary embodiments, we have described various computations over strings as requiring the decryption of results on the client machine before further analysis and aggregation can be completed on the client so that final results can be presented to the user. In fact, should it ever become necessary to analyze encrypted string data on the client, this can also readily be done due to the structure of our table private key for any Ai. Our key (the encoding file) is built on the database in Anonymization Step 13 wherein every character position in V1 is permuted into some other position in V1. This permutation is stored in a consistent, ordered fashion in the Ai table private key. For example, for every permutation of lower case characters, we store in our table private key, in alphabetical order, first how the letter "a" is permuted, then how the letter "b" is permuted, and so on, until how the letter "z" is permuted. Furthermore, because each representation of the next character position in a column in a given group is merely appended to the bottom of the table private key as the key is being constructed, and the size of V1 obviously does not change during each position permutation, the driver knows at any given time the offset in the Ai table private key where the permutation for a given character position for a given column for a given group begins. This unique structure of the Ai table private key allows the driver to quickly examine the encoded characters of strings returned in result sets and determine their equality or lexical order despite the fact that their character permutations are completely random and regardless of whether the strings are actually in the same or different groups. Therefore, GROUP BY, ORDER BY, and JOIN—rather than decrypting data on the client to complete analysis and aggregation, as they are described to at least partly do in the foregoing embodiments—these statements can readily be coded within the driver to examine encrypted data on the client. They could be readily re-programmed to work as follows: first, they properly construct the result set to be presented to the user from the result set sent by the server while it's still in encrypted form. Then they decrypt the restructured result set and then they immediately present the decrypted result set to the user. There is no need for these commands to do further work on the result set after it's decrypted because all cleanup (post processing) is done on the encrypted result set sent from the server. Our testing in our "Implementation Performance Results" section below was not done when such commands were coded to work with encrypted data but rather when they are coded to decrypt results as soon as possible on the client.

Also, we can readily encrypt our queries and result sets by encrypting the channel between clients (or some intermediary gateway) and the database server. A scheme such as SSL, IPSEC, etc. can be implemented to protect against known-plaintext attacks and similar kinds of attacks in the literature, if needed.

Now described are various working examples of embodiments of the present invention:

Example 1

Anonymization Process

First, the anonymization technique takes some time to convert the ODB to the ABD. Converting a single table, O1, consisting of a hundred or a thousand rows into an anonymized table A1 made up of, respectively, approximately 300 or 3000 rows (i.e., two thirds of the rows are added false rows) and comprised of 30 groups (10 true groups and 20 false groups) takes about several minutes. If we start with an O1 containing 1,000,000 rows and wish to create a 30-group anonymized A1 table, A1 will have close to 3,000,000 rows and the anonymization can take about 5.5 hours to complete.

If we wish to convert a 1,000,000-row O1 into a 120-group A1 table (still having about 3,000,000 rows but being a more secure table), the process takes about 7 hours to complete. Much of the time is spent by the database server running the database scripts. Much of this work can be ported to a JAVA (programming language) program to considerably improve performance. Moving the character encoding process, for example, from a database script to a JAVA (programming language) program changed the time required for this step from 3+ hours to 10 minutes.

Example 2

Query Performance

The performance of various important queries in our scheme was good. We first examined in more depth our driver's performance compared to one standard, the Microsoft JDBC driver (MS driver from now on). We then compared the performance of our driver operating on two analogous A1 tables, with one being more secure than the other because it was divided into more groups. With the exception of a couple of references in this paragraph to the MS driver and the R10 table—both related to our comparison with the MS driver—the text herein describes our testing environment for both the MS driver comparison and the more-secure table comparison. Our testing was done on the MS SQL 2008 Server. The performance times pertaining to our driver below include the discarding of any false rows and the decoding, and string value trimming, of the result set by the driver to only present the proper plaintext values to the user. Note, as part of the creation of the ADB for our testing purposes, we did not employ the random addend for each numeric column as per Anonymization Step 11. We only used the average and random multiplier to encode a numeric column as described in that Step, and our statistics below reflect the usage of this pair only. However, because the random addend is only added to a number to encode it, it's incorporation to produce anonymous queries, as will be described below, and decode the result sets coming back should have minimal if any impact on the statistics below. The CPU of any computer should almost instantly handle the appropriate computations to incorporate the addend. For the purposes of our comparison with the MS driver, we compared retrieval times of the MS driver on an O1 table with 1,000,000 rows to that of our driver on the resulting A1 table of about 3,000,000 rows divided into 120 groups. Although we have recommended using a total of 30 groups for anonymization purposes earlier we wanted to examine the performance of an even more secure table to gauge any performance impact. Because in a real production environment at any given time a small portion of rows from the ODB is always deleted, we wanted to engage our DELETE mechanism so we could mirror and thus test our scheme's performance in an "equivalent" environment. Our DELETE mechanism is implemented by storing the RowNums to be DELETEd in R1. A number of our queries are implemented to also check the R1 table before retrieving or computing over the implicated rows to avoid processing any DELETEd rows. For most of the queries below, we purposefully DELETEd about 50,000 rows from the O1 table and an equivalent amount from the A1 table. (That is, for the A1 table we INSERTed the RowNums of the rows to be DELETEd into R1). For the purposes of our comparison with the MS driver, we used an equivalent R1, called R10 from now on, for the O1 tables to hold the row numbers to be DELETEd for these tables. We similarly checked against R10 when performing various queries against the O1 tables to avoid processing any DELETEd rows.

Our driver's performance results compared to the MS driver are summarized in Tables 4 and 5 below, the latter illustrating our performance comparison results for the JOIN command. The illustrations are followed by a discussion.

TABLE 4

| | Our Driver | | | | Microsoft Driver | |
| | Table: about 3,000,000 rows | Num of Groups: about 120 | | | Table: 1,000,000 rows | |
| Command | Anonymized Result Set (total true and false rows returned) | True Result Set (total true rows extracted) | Speed | | True Result Set | Speed |
|---|---|---|---|---|---|---|
| SELECT (large request) | ~51,500 | ~47,500 | ~1 min., 50 sec. | ⇔ | ~47,500 | 3+ min. |
| SELECT (small request) | ~780 | 2 | 2-3 sec. | ⇔ | 2 | 2-3 sec. |
| numeric ">" comparison (larger request) | ~1,840 | ~930 | ~5 sec. | ⇔ | ~930 | ~5 sec. |
| numeric ">" comparison (small request) | ~5 | 3 | 2-3 sec. | ⇔ | ~3 | 2-3 sec. |
| DELETE (large request) | ~101,800 | ~95,400 | ~8 sec. | ⇔ | ~95,400 | ~7 sec. |

TABLE 4-continued

| | Our Driver | | | | Microsoft Driver | |
| --- | --- | --- | --- | --- | --- | --- |
| | Table: about 3,000,000 rows | Num of Groups: about 120 | | | Table: 1,000,000 rows | |
| Command | Anonymized Result Set (total true and false rows returned) | True Result Set (total true rows extracted) | Speed | | True Result Set | Speed |
| DELETE (small request) | ~780 | 2 | 2-3 sec. | ⇔ | 2 | 2-3 sec. |
| COUNT (large request) | ~107,200 | ~94,800 | 4-5 sec. | ⇔ | ~94,800 | ~4 sec. |
| COUNT (small request) | ~780 | 2 | 2-3 sec. | ⇔ | 2 | ~2 sec. |
| UPDATE (large request) | ~107,200 | ~95,000 | ~39 sec. | ⇔ | ~95,000 | ~15 sec. |
| UPDATE (small request) | ~1,530 | 2 | ~5 sec. | ⇔ | 2 | ~2 sec. |

For the JOIN discussion below—part of our comparison with the MS driver—, our O1 was only 100,000 rows not 1,000,000 rows as above for the main MS driver comparison testing. For the JOIN comparison we only DELETEd about 5,000 rows from the O1 table and an equivalent amount from the A1 table. As we will see in the JOIN discussion below we tested JOINing O1 to O2 with JOINing A1 to A2. O2 had a size of 20 rows while A2 had a size of about 60 rows. Our performance results for the JOIN command are summarized in Table 5:

TABLE 5

| | Our Driver | | | | Microsoft Driver | |
| --- | --- | --- | --- | --- | --- | --- |
| | Table A1: about 300,000 rows Table A2: about 60 rows | Num. of Groups: about 120 | | | Table O1: 100,000 rows | |
| | Anonymized Result | Num. of Groups: about 30 | | | Table O2: 20 rows | |
| Command | Set (true + false rows and row frequency counts returned) | True Result Set (total true rows extracted) | Speed | | True Result Set | Speed |
| JOIN | ~52,600 | ~76,000 | <2.5 min. | ⇔ | ~76,000 | almost 5 min. |

We now elaborate on results shown in Tables 4 and 5s.
SELECT Statement
With regard to completing SELECT commands, our driver was equally fast compared to the MS driver when result sets were small. It was considerably faster than the MS driver when result sets were large. When retrieving a small result set from O1 (2 individual rows via a SELECT statement), the MS driver took 2-3 seconds. Retrieving an identical small result set (which contained 2 true rows and about 780 true and false rows in total) from A1 using our driver also took 2-3 seconds. When retrieving a large result set with tens of thousands of rows or more, the MS driver took about a third or more time compared to our driver. Retrieving a result set with about 47,500 rows took the MS driver a little over three minutes to finish. An equivalent result set containing 51,500 true and false rows (and the same about 47,500 true rows) took our driver about a minute and fifty seconds to complete. We suppose that the printing of the results to the screen—in which the MS driver preserves the full length of each column and therefore winds up printing many blanks before the field separator, while we only print the true length of each field followed by its separator—, may be one reason why our driver performed faster than the MS driver. It may also be the way the MS driver extracts rows from the database (e.g. apparently using a cursor to fetch rows in a specific way from the database before returning for additional rows). The MS driver source code was not available to us so we could not confirm the reason for its slower performance.

JOIN Statement
Our driver executed the JOIN command considerably faster than the MS driver as well. This was not only due to the possible printing and database query management issues discussed above. We also send less information to the client from the server and therefore optimize communication performance. Because we GROUP frequencies of, for example, the A2 table rows rather than sending back each row which is implicated, we reduce the overhead of the communications. For example, imagine we are JOINing A1 to A2 on field last_name and want to only select A1's rows. Table A2 has 10 rows with the same last name in group 32 which will be implicated in the JOIN. For group 32, we send back one row with that last_name value along with a frequency count of 10; we don't return the other 9 rows, as discussed under JOIN command processing earlier. Because this is done across many tokens in A2, we potentially considerably reduce the amount of data we return (of course, this depends on the size of the JOIN result set). To assess JOIN performance, we tried JOINing an O1 table with 100,000 rows with an O2 table of 20 rows on a single column and just SELECTing the rows from O1. The MS driver took almost 5 minutes to complete, and a total of about 76,000 rows were involved. We tried JOINing the associated A1 table of about 300,000 rows broken into 120 groups with the associated A2 table of about 60 rows, again SELECTing just the A1 rows. Our driver took a little under 2.5 minutes to finish. (A total of about 52,600 true and false rows, including the frequencies with which certain rows must be reproduced were involved).

Comparison Statement (">")

The performance of the ">" comparison was the same between our driver and the MS driver. A retrieval of a small result set—3 rows—using the ">" comparison on a numeric column took both the MS driver and our driver about 2-3 seconds to finish. (Our driver retrieved the same 3 rows and about 5 true and false records in total). A retrieval of a larger result set—about 930 records—using the ">" comparison took both the MS driver and our driver about 5 seconds to complete. (Our driver extracted the same approximately 930 records from within a result set of approximately 1,840 true and false records).

DELETE Statement

Our DELETE performance was quite close compared to the MS driver. Because we DELETE by INSERTing RowNums into R1, to make a meaningful comparison, we compared our ability to INSERT rows into R1 with the MS driver's ability to INSERT rows into the R1O table. Our DELETE statistics measure the time to INSERT the implicated rows into R1, or R1O, as opposed to actually erasing those records from their respective tables. A DELETE for a small number of rows, 2 rows, took 2-3 seconds using the MS driver as well as our driver. (Two rows and about 780 true and false rows in total were DELETEd by our driver). A DELETE command to erase about 95,400 rows from O1 took the MS driver about 7 seconds to finish. Our equivalent DELETE command on the A1 table (about 95,400 true rows and about 101,800 true and false rows in total were involved) took about 8 seconds to finish.

COUNT Statement

When issuing COUNT commands, our driver's performance was also quite close to the MS driver. When the number of rows implicated was few (2 rows), the MS driver retrieved a COUNT result in 2 seconds. Our performance on small result sets (e.g., the same 2 rows and a total of about 780 true and false rows were involved) was 2-3 seconds. When the number of rows implicated was large, about 94,800, the MS driver retrieved a COUNT result in 4 seconds, whereas we finished an equivalent retrieval in 4-5 seconds. Our driver worked with a total of about 107,200 true and false rows to retrieve the approximately 94,800 true rows.

UPDATE Statement

The performance of our driver on the UPDATE command was about two and a half times slower compared to the MS driver. An UPDATE command to alter a single column value implicating a small number of rows (2 rows) took about 2 seconds via the MS driver while it took about 5 seconds via our driver. (Our driver processed about 1,530 true and false rows to UPDATE the 2 true rows). When working with large result sets, an UPDATE command to alter a single column value implicating approximately 95,000 rows took, on average, 15 seconds with the MS driver. With our driver it took, on average, about 39 seconds to finish. Our driver processed about 107,200 true and false rows to UPDATE the approximately 95,000 true rows.

In general, when we are slower than the MS driver, we suspect that our poorer performance is due to our need to involve more rows and more columns in our queries. Our queries implicate more sometimes many more (false) rows which the MS driver does not have to deal with. In the case of the UPDATE command, we also have to update the length field in the RecInfo column in addition to updating the implicated column value. The extra update takes approximately half of the time compared to the overall UPDATE elapsed time.

Example 3

Query Performance Over More Secure Tables

With regard to query performance when the security of tables is increased, in our testing, increasing the number of groups into which an anonymized table is divided did not affect by much the time for queries to complete. We tested an O1 containing 1,000,000 rows and the resulting A1 containing about 3,000,000 rows divided into 30 groups (10 groups were true and 20 groups were false) as we normally recommend. We then improved security further by dividing an A1 generated from a very similar O1 (and also having roughly 3,000,000 rows) into 120 groups (40 groups were true and 80 groups were false). We tested the performance of SELECT, COUNT, DELETE, UPDATE, and mathematical comparison functions of the two A1's. Our testing process was described in the section above, "Query Performance". The 120-group A1 was, on average, slower by a couple of seconds, if that much, on various queries compared to the 30-group A1. FIG. 20 below highlights the performance comparison between the two A1's:

TABLE 6

| | A1 Table (30 groups) Size: about 3,000,000 rows | | | | A1 Table (120 groups) Size: about 3,000,000 rows | | |
|---|---|---|---|---|---|---|---|
| Command | Anonymized Result Set (total true and false rows returned) | True Result Set (total true rows extracted) | Speed | | Anonymized Result Set (total true and false rows returned) | Total Result Set (total true rows extracted) | Speed |
| SELECT (large result set) | ~54,100 | ~47,500 | ~1 min., 44 sec. | ⇔ | ~51,500 | ~47,500 | ~1 min., 50 sec. |
| SELECT (small result set) | ~5,500 | 1 | 1-2 sec. | ⇔ | ~780 | 2 | 2-3 sec. |
| numeric ">" comparison (larger result set) | ~2,100 | ~930 | ~4 sec. | ⇔ | ~1,840 | ~930 | ~5 sec. |
| numeric ">" comparison (small result set) | ~5 | 3 | ~2 sec. | ⇔ | ~5 | 3 | 2-3 sec. |
| DELETE (large result set) | ~114,800 | ~94,800 | ~8 sec. | ⇔ | ~101,800 | ~95,400 | ~8 sec. |
| DELETE (small result set) | ~5,470 | 1 | ~2 sec. | ⇔ | ~780 | 2 | 2-3 sec. |
| COUNT (large result set) | ~115,300 | ~95,500 | 3-4 sec. | ⇔ | ~107,200 | ~94,800 | 4-5 sec. |
| COUNT (small result set) | ~5,470 | 1 | 1-2 sec. | ⇔ | ~780 | 2 | 2-3 sec. |
| UPDATE (large result set) | ~114,800 | ~94,800 | ~30 sec. | ⇔ | ~107,200 | ~95,000 | ~39 sec. |
| UPDATE (small result set) | ~5,470 | 1 | 2-3 sec. | ⇔ | ~1,530 | 2 | ~5 sec. |

Example 4

Database Private Key Issues

One potential drawback of our scheme is the loading of the database private key into memory. When we tested with an A1 of 3,000,000 rows and 120 groups, the loading of the various components of the private key could take 7 seconds. However, this delay only happens during the establishment of the session between the application and the database. The establishment of the session happens infrequently; therefore, the 7-second delay should also be infrequently experienced by the user. Our code to load the private key is placed in the initialization routines of the driver because we need the private key early in our processing. These routines are invoked when the session between the application and the database is created. (For example, this may happen when the user opens his application by double clicking on it in his Windows Desktop). The application will not close the session until the application is closed. Otherwise it has to pay the penalty of going through its own initialization routines again to open a new session with the database. Until the session is closed, therefore, the user will not experience the 7-second delay from the loading of the database private key into memory. The delay may be considered part of application initialization and we believe it should not significantly affect the user's experience. There will probably be other initialization delays which the user will have to bear as his application loads, and our 7-second delay may, in fact, be considered one such delay. However, if this becomes problematic, a separate daemon can be built which will start when the user boots his machine, or the first time that the user starts the application. The daemon will load and manage the database private key, communicate with our driver when it requests the key (e.g. for data encoding and decoding), and not close until a truly terminal event, e.g., a machine shut down. Under such a scenario, the 7-second delay is suffered by the user infrequently or, probably, rarely because the daemon should, practically speaking, rarely be closed.

A related issue when loading the database private key is memory capacity. In earlier designs of our scheme, we experimented with loading millions of records representing our database private key into memory from disk as we tried to keep track of more metadata related to our anonymized table(s). Because there were so many rows to load, occasionally the driver on our test machine, a laptop with 2 GB or RAM, would hang with error messages such as "out of heap space". It is possible that if there are many private key files for many tables to load—i.e., one, two, or more million rows placed into memory—, the driver may similarly hang on client machines. There are three possible solutions to this problem. One is to purchase more memory for the hanging client workstations. Two is to allocate more overall memory to our driver on the hanging machines. When we increased our internal JAVA (programming language) heap size on our test machine, through a re-configuration of the JAVA (programming language) Virtual Machine, we alleviated the problem. The third solution is to again create a daemon which will manage the database private key for all client workstations. This daemon can be placed on a separate machine which has a large memory. It will communicate with all the clients, or just those that hang, if that is better, when they need access to the database private key.

Example 5

This Example analyzes why an initial group count of 5 is chosen in Anonymization Step 3. A final total group count of about 30, produced from an initial group count of 5, as explained in Anonymization Step 3, makes it exceedingly difficult to break the string encodings that will be contained in A1. To understand why, we must first understand how the intruder attempts to break our scheme. Let's recall that we anonymize numeric columns by using a monotonic function which preserves the ordering of numbers within every group across all numeric columns. The intruder can use his O1 copy, chose a numeric column M0 he likes, sort it in descending order, and extract the highest values from the column. Then he locates the corresponding column M1 in A1, and launches a matching process to relate his highest values in M0 with the highest values in M1. As M1 is broken into groups, the intruder uses a loop operation to examine every group he sees in M1. O1's highest values had to have been distributed within A1 somehow, and this matching process attempts to locate them.

As he links the two ordered sets of M0 and a particular group within M1, the intruder extends the hypothetical links of numbers into links of strings. What we mean is: suppose the intruder has identified a row in M1 that he thinks matches one of his highest numeric values in M0. He now makes a hypothetical assumption that the decryption of the field s1 from some string column S1 from A1 (restricted to the row of matching numbers) has value s0 which is a field in the corresponding column S0 from O1 (restricted to the row of matching numbers). He propagates s0 as a decoding key onto all characters within the group that match by position and value to the characters of s1. If he is able to completely replace all of A1's character strings in that group without conflicts (i.e. no interference with decoding attempts based on prior numerical matches), the intruder has found a potential way to decode the group. By going through the matching process and bringing in more decoding rules (i.e. more s0's), the intruder either completes the decoding of the entire group, or must revisit his previous assumptions and make new matching assumptions for steps he previously completed. If his initial selection of the set of highest numbers in M0 and group in M1 are large enough he will likely succeed, though it will cost him an enormous amount of time as we calculate below. The remaining highest numeric values from O1 can be used to try and decode another group in A1, until all groups in the table are so decoded. Given this approach, we suggest the following heuristic approach to find the number of groups into which A1 should be divided. The output of these calculations is an estimate of the maximum time it takes for the intruder to successfully decode one group.

Upper bound, in seconds, on time to "break" one group=

[(1% of total # of rows in $O1$)*(total # of groups in $A1$)*

(1% of total # of rows in $A1$ group)$^3$*(total # of rows per group in $A1$)*

(total # of characters to be decoded per row in $A1$ group expressed as # of general operations to be carried out on a computer)*

(total # of assembly statements required to handle one general operation on a computer)]/

[(total # of assembly statements performed by intruder's computer per second)*(# of computers employed by intruder)]

The intuition for these terms stems from our description of the intruder's approach above:

The factor (1% of total # of rows in O1) arises because the intruder wants to focus on the top (e.g., 1%) of the numeric values in O1's numeric column. These are the "extreme" values which allow her to match the most "extreme" (i.e., highest) values in A1's numeric column, leading to more certainty in the matching of values.

The factor (total # of groups in A1) arises because, in the worst case, the intruder may need to decode every possible group in A1 until he reaches the last group where decoding finally succeeds.

The factor (1% of total # of rows in A1)$^3$ arises because the intruder has to, in the worst case, complete a nested-loop three levels deep as he tries to decode A1's string column. First, the intruder has to loop through all possible numbers, call them Ps, in the highest numerical values of A1's group. He is trying to match them with the highest numbers in O1's group. Given an initial "seed", i.e. a possibly matching P, the intruder tries every other number in his list, we can call them Qs, one by one. He tries to decode the remaining strings in A1's group using the associated strings from O1 which match the Qs. Imagine he gets closer to the end of the list of Qs and fails. That is, he finds he cannot impose a decoding scheme on A1's group using the O1 string matched to the current Q record due to decoding conflicts (e.g., the characters he's trying to decode have already been decoded via a match with a previous Q record). He has to back up one position, to (n−1), and try the n-th decoding (the decoding for the current Q record), as the (n−1)-th decoding. He has achieved success until now, therefore, he can remove the decoding of the previous O1 string and attempt to decode using the current O1 string. In the worst case, he will have to go down to almost the end of the list of Qs, then be forced to retrace his steps back to the beginning of the list, and attempt to traverse the (almost) complete list again, trying to find a proper decoding for A1's string column in the group.

The factor (total # of rows per group in A1) arises because for every numerical match, the intruder will have to decode at most the entire string column within A1's group using the value from O1's string column. As explained before, during anonymization, we try to maintain the same number of rows per group in every Ai table.

The factor (total # of characters to be decoded per row in A1 group expressed as # of general operations to be carried out on a computer) arises because for each string replacement attempt, the CPU has to replace, e.g. using SUBSTRING or other pattern matching operations, a specific number of characters in the string. For example, it could be the maximum string length for the column.

The factor (total # of assembly statements required to handle one general operation on a computer) arises because a general operation to replace one character within some higher level language (in which the intruder's program presumably would be written) would take more assembly instructions to actually carry out on a computer.

The factor (total # of assembly statements performed by intruder's computer per second) arises because we need to incorporate how long it will take the intruder's computer to replace one character during the decoding attempt.

The factor (# of computers employed by intruder) arises because the intruder can use more than one CPU and have them work in parallel trying to decrypt the group. The main loop in our "algorithm" above (and alluded to in step 1 above), can be broken up so that different computers are trying to successfully replace strings in their own range of the highest numeric values in O1.

As an illustration of a possible computation of the upper bound, imagine the following values exist for a given installation of our scheme at a customer site:

(1% of total # of rows in $O1$)=10,000 (i.e., assume an $O1$ of 1,000,000 rows)

(total # of groups in $A1$)=30 (i.e., imagine the resulting $A1$ is divided into 30 groups)

(total # of rows per group in $A1$)=100,000 (i.e., assume an $A1$ of approximately 3,000,000 and a group count of 30)

(1% of total # of rows in $A1$)$^3$=(1000)$^3$ (i.e., assume an $A1$ of approximately 3,000,000 rows and a group count of 30. Therefore, the row count per group is 100,000, and 1% of this is 1000)

(total # of characters to be decoded per row in $A1$ group)=10 (i.e., assume we are working with column Last Name which has a maximum length of 10 characters.

In the worst case, all of these characters would have to be decoded when decoding a row)

(total # of assembly statements required to handle one general operation on a computer)=10

(total # of assembly statements performed by intruder's computer per second)=3,000,000,000 (i.e., a CPU operating at 3.0 GHz)

(# of computers employed by intruder)=1

Therefore, upper bound on the time to break one group, in seconds, is:

$[(10000)*(30)*(1000)^3*(100000)*(10)*(10)]/$ $[(3000000000)*(1)]=$ 1,000,000,000,000 seconds~31,700 years Although this is a very high number, it's important to point out that this upper bound estimates the effort to decode one group. The intruder will have to apply similar logic, using his remaining highest values in his 10,000 original O1 values, to decode the other groups. Only then has he successfully decoded the full table. The upper bound to decode the entire table would therefore be significantly higher than the estimate above. But even decoding the complete table does not mean that the intruder has decoded the original table. Since we add false rows to A1 as part of anonymization, the intruder may obtain a successful decoding on the false groups. Some or many false groups would be decoded via the approach above because false groups are made to mimic true rows and true groups. The intruder cannot definitively say he's decoded the original values because he may have decoded fake values. That is why the final group count of about 30, and an initial group count of 5, is useful for near any table. The upper bound on the time to break the entire table is extremely high. And even if he achieves "success," the intruder still can't be sure he's decoded the true rows.

The following sections describe two more embodiments of the invention. Both deal with the representation and the computation of numbers in an encrypted fashion. To this end, both schemes would work within the invention within a group. That is, the descriptions below describe homomorphic representations and computations as would exist within a group. If there is a need to perform computations across groups, computations within every group would be done on the server with the encrypted data. Subsequently, the homomorphic results would be returned for each group to the client. On the client the results for all groups would be decrypted and combined to produce a single result which would be returned to the user.

Note that the term "PDL" in these two embodiments mean the server hosting the encrypted data. This server may be in the cloud or data center or another hosted location. The term "DCL" in these two embodiments means the client where the user's database application resides and which has the keys to decrypt the data sent from the PDL.

This embodiment elaborates encryption and decryption operations over rational numbers. Even though the same encryption applies against real numbers, we have no practical usage on the computer for the true real numbers unless they are rational. Therefore, elsewhere in this paper, it is assumed that numeric data we use consists of the rational numbers only. The invented family of the encryption algorithms—called as RLE (Ratio Less Encryption)—is described in this paper by the system of linear algebraic equations, and decryption is made possible by solving this system of equations. This family provides cloud and data centers computing with a new way of database operations, data hosting, transmission and computational analysis using ciphered data.

During RLE development, two areas—the computer calculations reliability and data hacking—were specifically scrutinized. Since the loss of significance digits in computations due rounding, truncation and inadequate binary data presentation would significantly affect the quality of RLE symmetrical encryption, therefore, the first few chapters of this paper is dedicated to the analysis of these losses and foundation of the reliable RLE symmetrical encryption. Upon conclusion with reliability issues, we introduce RLE encryption transformations and elaborate algorithms to perform general numerical and statistical calculations using RLE encrypted data. Associated with these calculations is one of the main results of this paper stated as follows:

Without compromising the security and privacy, the basic arithmetic operations (addition, subtractions, multiplication and division), individually or in tandem (i.e., as part of the complex calculations), can be derived over encrypted data until the final result, still encrypted, reaches the end user, where it can be decrypted and displayed on user's screen, or archived for further needs.

To demonstrate the RLE applicability in performing meaningful calculations, we derived rudimentary statistics—the variance and covariance of the true data—by using the encrypted data only. In spite of the size of the samples ($3E10^5$ and $10^6$ entries), the results were obtained with up to 15 digits accuracy for double precision data and 32 digits accuracy for BigDecimal data with initial precision of 38 digits (including the whole numbers).

Alongside with RLE based numerical calculations, this paper demonstrates that randomization and partial privatization of the encrypted data deliver a strong encryption, preventing intruder's malicious attacks—like open data attack or brute force attacks. (In the rest of this paper an open data attack is an attack in which, the intruder has a partial knowledge about correspondence between a few encrypted and true items).

To aim in understanding of the RLE methodology and to raise the confidence in using it, a series of examples with an accelerated level of complexity were built throughout the text.

1.0 Introduction

In order to prove the main result (stated in abstract) we implement the RLE randomized encryption methodology which makes RLE encrypted data completely scrambled and unrecognizable by no one without knowledge of private keys. Since RLE decryption goes through a series of algebraic calculations to reverse the encrypted code, therefore, deciphering might result in loss of significant digits. Later could invalidate the decrypted results as we may not get the deciphered data exactly the same as we began with. Thus, knowledge of the private keys and reverse algorithms, in case of RLE, does not guaranty the reliable deciphering, yet. This makes RLE very different from the whole number encryptions (such as Rivest algorithms [1] [2], AES [6], etc.) where the knowledge of the private key and knowledge of the reverse procedures guarantees the reliable deciphering.

Thus, in case of RLE deciphering, not only we need the knowledge of the private keys and reversing procedures but also we must make sure that our decryption operations will not result in the significant (beyond reliable level) loss of significant digits.

Thus being said, as a prerequisite for RLE foundation, this paper invested a significant effort to analyze inaccuracies associated with data conversions into internal computer format. Likewise, calculation problems due rounding, truncation and unreliable algorithms were thoroughly investigated. Subsequently, some rudimentary measures for calculation of error estimates were proposed to aim in performing reliable encryption and decryption operations. In doing arithmetic, RLE strongly adhere to IEEE 754 standards in an attempt to avoid calculations resulting in none numerical symbols like NaN, ±0, ±∞. The obtained conclusions had been put forward to build sustainable RLE algorithms for symmetrical encryption.

In conclusion of this short introduction, and in addition to what had been said about RLE reliable encrypting, we submit that elaboration of RLE security (due randomization and randomized operations) and proof of the main results (related to secure numeric operations over RLE encrypted data), shows that RLE technology not only can be used for encryption of databases and operations but also for performing numerical analysis in the public networking domains.

1.1 RLE Domain and Targets

Let's agree here and to the end of this paper to use symbol ■ for designating the end of proof or end of discussions with respect to a particular statement or topic.

We begin introducing RLE by specifying the target of our work so as to explain why we need the new encryption tools instead of using existing encryption methodologies. The encryption target in this paper is the rational numerical data. As far as textual data is concerned, we assume that this data must be converted to numeric form, so then the RLE encryption rules could apply. One might argue that textual data is also numeric given how computer understands and interprets it. However, nobody had ever spoken about precision of textual data, where for us this topic is one of the major points for concern. Thus, numerization of textual data enables us to adjourn from its internal presentation (which may be different on different computers) and enables to treat every entry in database or flat files as a numeric entity. Another consideration why we need RLE encryption algorithms is because they are especially effective for structured data (such as databases, XML files, etc.) where data is naturally pre-partitioned. For unstructured data (such as large flat files, or large blobs, etc.), we shall pre-partitioning them first so as to benefit from RLE usage. Since pre-partitioning of nonstructural data is kind of a work of art, therefore, this topic shall be examined separately.

Thus, in this paper, we will assume that we are dealing with a Relational Database Management System (RDBMS). But our approach works with other structured and even unstructured data. As result, our examples for large statistical calculations are produced by using RDBMS data, where illustrations of arithmetic operations were based on the hand made collections of data.

Let's look at some numerical columns which we want to encrypt. According to RDBMS logical design, each database is a combination of some kind of columns of homogeneous entities. By this we mean that the number of stars in Andromeda Galactic and the price of the one piece of soap cannot belong to one and same column of RDB data. The reasoning for forming a column is due to some functional properties natural for this column. We, thus, have columns of salaries, columns of people ages, or columns of stock prices (industrial, commercial, etc.). Correspondingly, we look at each column as a statistical sample and apply statistical sampling technique to study, sort, get rid of outliers or do other manipulations over our data. This aims the fact that all entries within a column are related to each other. The following example illustrates our concept.

Example 1.1

Let's consider a Salary column from Employee table describing employee information of a large hospital. The salaries are ranging from 5 figure (15-30K of dollars) to 7 figures (1-2 million dollars). Hardly ever a full time worker in a hospital would earn less than 15K with minimum wage $7.5 per hour. Likewise, it is almost improbable that the highest salary of a hospital Executive will exceed 3-5 million dollars. Thus, the natural range of the salaries in the Salary column is between 15K and 5000K. As, on the lower end, the precision of the salary is typically measured in cents, therefore, the "chunk of salaries" for the hospital employees is some range of rational numbers from 15K to 5000K measured with two decimal digits after the decimal point. ■

1.2

RLE Data realm: Let's R be a set of the rational numbers. Since R is used in this paper for computer applications and because arithmetic or binary operations over numbers in R could potentially produce either too small or too large numbers or unrecognizable combination of bits, therefore, based on IEEE-754 standards, five symbols (NaN, ±∞, and ±0) are added to the set R. This combination of set R and five symbols, for the future references, will be called as realm $\mathcal{R}$.

In addition, we assume that the maximum and minimum ranges of the rational numbers that ever be used for RLE applications are laying inside of the interval $(-10^{150}, 10^{150})$ and the precision of these numbers can't be higher than E-100. These limitations, though, are set exclusively due to computer limitations as RLE scheme posses no such restrictions.■

2.0

Data transition from external to internal formats: As every rational number R is a ratio of two whole numbers, p and q, therefore, without loss of generosity, for the future references, we will assume that p and q are mutually exclusive, i.e., their greatest common divider is equal to one. With respect to rational numbers and their different format presentations (inside and outside of computer), the following four topics will be discussed and illustrated in the subsequent sections 2.1-4.1.2:

numeric representation of data before (NRB) it enters the computer conversion of NRB data to decimal format (NDB) before it enters computer conversion of NDB data into computer internal format (NIF)

precision of NRB, NDB and NIF data types

2.1. Numeric Representation of NRB Data

For commonality purposes, we will use the virtual scientific notation for numeric data which is defined as follows:

$$R = a_0(a_1 \ldots a_k)_b * \text{pow}_c(d_0(d_1 \ldots d_l)_c) \quad (2.1.1)$$

where:

$(a_1 \ldots a_k)_b$ is mantissa over base b $a_0$ is the sign of number R $\text{pow}_c(\ldots)$ is the power function, i.e., $\text{pow}_c(x) = c^x$ $(d_1 \ldots d_l)_c$ is a degree mantissa over base c for the power function $\text{pow}_c(\ldots)$ $d_0$ is sign of the degree The expression (2.1.1) is the most generic form of NRB, though, for our purposes, we will identify bases b and c as one and the same number by setting b=c. To convert any rational number R (given in form (2.1.1) to decimal value, we first convert numbers $a_0*(a_1*b^0 + a_2*b^1 + \ldots + a_k*b^{k-1})$ and $\text{pow}_b[d_0*(d_1*b^0 + d_2*b^1 + \ldots + d_l*b^{l-1})]$ into two decimal values p and q, and then divide p into q as usual. Without loss of generosity we further assume that p and q are decimal numbers (i.e., b=c=10), and the issue remains as to what range and precision of the decimal ratio p/q we would like to maintain. These two items—range and precision—will be our next topic.

2.2. Range and Precision of NRB

Before we proceed with our elaboration, let's assume that rational numbers in this and subsequent sections belong to one and the same chunk of data. For simplicity, we could think of a chunk as a column in a database table, though, for an unstructured data organization, we could associate with a chunk a sample of preselected numbers from this organization. Thus, when we talk about range and precision of a particular number we gather that same assumptions and conclusions are true for all the numbers in a chunk.

First of all, there are natural limits for the maximum and minimum numbers for every chunk as long as we speak about a real life application. Thus, fiction applications, as well as, infinite chunks are excluded from our discussion. Secondly, there is a natural limitation posed by computer as to how many significant digits it can maintain in one numeric word (or data type). The spread of significant digits between the highest significant digit of the maximum number in a chunk to the lowest significant digit for the same chunk we call as the range of the chunk, and the precision of the lowest significant digit we call as the chunk's precision. Depending on the software and the data type we chose for our calculations, there may be a problem to fit a given data type into a particular range. For example, for a double type in Java, computer allocates 64-bits for one word. From it, 52 bits are used for mantissa, 11 for exponent and one bit for sign. This construction allows only 16 decimal digits to fit in one word, and, thus, such accommodation may not be sufficient for some chunks to perform multiplication and division (or else) without loss of precision. Therefore, let's make

2.2.1. Precision Assumption in view of the modern computer technologies, we will assume that, for all the practical purposes,—no matter how large the initial range of the data is,—we could always find a data type, or, if needed, a series of data types, to accommodate our data with some small and insignificant rounding error depending on the chunk's precision.

What kind of small and insignificant rounding error we are talking about is the quintessence of our preparatory work for introducing the RLE encryption. We will revisit this issue as our scheme for converting data to computer format will progress.

Let's conclude this paragraph by bringing Example 2.3. A set of 99063 numbers was generated using random number generator. This simulation produced a normal distribution with mean 100, standard deviation 0.05 and range from $10^2$ to $10^{-13}$ (maximum 16 digits per number). The entire operation was performed on a computer using Java code. The average for the sample had been calculated with a precision of $10^{-28}$. Then, each number from this sample was divided by the obtained average, and all such ratios were summed. The result of this sum was found to be $99063 + 2.16*10^{-26}$. Since the expected result is 99063, the calculation error, in this calculation, thus, was $2.16*10^{-26}$. This is a small number considering that the initial precision for the chunk was $10^{-13}$.

The complete and final result of this run is presented in Table 2.3.1 below.

TABLE 2.3.1.

| | |
|---|---|
| Clock time Before insert randnum to T,able | =2011-02-17 16:59:36.453 |
| Insertion into Trable completed | = 2011-02-17 16:59:45.812    (9 sec) |
| Aft Summation total Big | = 9904085.3512087928039000000000000000 |
| BigAverage as total Big/99063 | = 99.9776440367119187173818681041 |
| Insert {X − Avg}into Table p1 | = 2011-02-17 16:59:46.125    (0.3 sec) |
| ValidateAvg = Avg * $N_{samp}$ | = 9904085.3512087928038999999999996458 |
| Error Validation | = 3.542E-24 |
| writing ratios X/Avg to $T_1$able | = 2011-02-17 16:59:46.203 |

TABLE 2.3.1.-continued

| | | |
|---|---|---|
| Insert $T_1$able completed | = 2011-02-17 16:59:55.265 | (9 sec) |
| Ratio Data back from $T_1$able + summation Σ (X/Avg) | = 99063.0000000000000000000000000216 | |
| Read $T_A$able after summation | = 2011-02-17 16:59:55.515 | (0.3 sec) |
| Validation derivatives Σ (X − Avg) | = 3.5417E-24(Whole test 19 sec) | |

3.0. Conversion NRB into Numeric Decimal NDB

This paragraph gets into details regarding range and precision of NRB and NDB data. Let's notice that when original (raw) data is decimal, both NRB and NDB are the same. When NRB is not decimal, then it is a pure fractional number p/q, with or without the whole part. If p>q, then ratio a=p/q has a whole part supplemented with some fraction. Let's make the following assumptions regarding these fractions:

(A) a none periodic decimal fraction
(B) a periodic fraction
(C) a combination of the none periodic and periodic decimal fraction Indeed, if q is a product of $2^m$ and $5^n$ for some m,n=0, 1, . . . , then (A) is taken place. If, to the contrary, q does not contains factors of 2 and 5, then (B) is hold. Finally, if q contains mixed factors: either 2 or 5, or both, and other than 2 and 5 factor, then (C) is true.

Since the precision of the whole number is defined by the lowest digits, therefore, without loss of generosity, we assume that p/q consists of the fractional part only.

Note: The non periodic fraction size depends on $2^m$ and $5^n$ denominator's components. The size of periodic part (if any) depends on the q factors other than 2 or 5. If Z is one such factor—other than 2 or 5, and $Z>10^{16}$, than to display just one period of the fraction p/q we need data types allowing more than 16 digits (which, for example, excludes a double data type in Java).

Regardless on p, q, m, n and Z, the conversion of NRB into NDB is a deterministic process which can always be completed in a finite number of steps. This process will be described next.

3.1. Conversion of NRB into NDB Process

Let's X=p/r is the rational number to be converted to decimal form, p<q, $q=2^m 5^n Z_1^* \ldots {}^*Z_k$, and $Z_1, \ldots, Z_k \neq 2$, 5. Let's $X_0, X_1, \ldots, X_a$ (a is some positive whole number) are all the iterations of X obtained during a process of converting X to NDB form. All iterations $X_i$, i=1, . . . , a, are described by the following stepwise process Ⓓ..

Step 1. Select factor $Z_0=2^m \cdot 5^n$ containing the maximum number of 2 and 5 dividers in q and assign $X_0=p/(2^m \cdot 5^n)$ as a first iteration of NDB. If q does not contain the nontrivial factors then assign $X_0=p$.

Step 2. Let's assume that for every j≤i an iteration $X_j$ had been built, so:

$$X_j = X_{jr} + \Delta X_j \quad (3.1.2)$$

where $X_{jr}$ is the rounded value of $X_j$, and $\Delta X_j$ is an estimated rounding error.

Let's, now, build the next iteration $X_{jr}$ for j=i+1, and find an estimated rounding error $\Delta X_j$. Let's s is the number of significant digits in previous iteration $X_i$, and $x_0$ and $x_{s-1}$ are the lowest and highest precision digits in $X_i$.

Step 3. Let's calculate the rounded decimal periodic representation for $Y_j=1/Z_j$, j=i+1, as well as an estimated rounded error $\Delta Y_j$ for $Y_j$. Let's t is the significant range of $Y_{jr}$ (where $Y_{jr}=Y_j-\Delta Y_j$), and $y_0$ and $y_{r-1}$ are the highest and lowest precision digits in $Y_{jr}$.

Step 4. Let's multiply the previous iteration $X_i$ by the rounded $1/Z_j$, j=i+1, fraction. We get $$X_{jr} + \Delta X_j = X_i{}^* Y_j = X_{ir}{}^* Y_{jr} + X_{ir}{}^* \Delta Y_j + Y_{jr}{}^* \Delta X_i + \Delta X_i{}^* \Delta Y_j \quad (3.1.4)$$

We have $|\Delta X_i| \leq 5*10^{-s}$, $|\Delta Y_j| \leq 5*10^{-t}$ based on assumptions for $|\Delta X_i|$ and $|\Delta Y_j|$.

If range for the product $X_{ir}{}^* Y_{jr}$ in (3.1.4) is too large to fit into a predefined data type then the sum (3.1.4) must be truncated and rounded. Subsequently, in this case, the errors product, $\Delta X_i{}^* \Delta Y_j$, must be dropped because its precision too high to contribute any digits—significant or dirty—to the truncated sum (3.1.4). Regardless of whether any digits from $\Delta X_i{}^* \Delta Y_j$ can be used during rounding of (3.1.4) to get $X_{jr}$ or not, we compute the j=i+1 iteration by selecting $X_{jr}$ and $\Delta X_j$ from (3.1.4) as follows:

$$X_{jr}(X_{ir}{}^* Y_{jr} + X_{ir}{}^* \Delta Y_j + Y_{jr}{}^* \Delta X_i + \Delta X_i{}^* \Delta Y_j)_r \quad (3.1.5)$$

$$\Delta X_j = \Delta(X_{ir}{}^* Y_{jr} + X_{ir}{}^* \Delta Y_j + Y_{jr}{}^* \Delta X_i + \Delta X_i{}^* \Delta Y_j) \quad (3.1.6)$$

The expression ( . . . )$_r$ with a sum of four products inside on the right side of (3.1.5) needs an explanation. We associate with ( . . . )$_r$ a window through which we see digits of four products inside curly brackets. The product with the lowest precision in it is the left most digit in $X_{ir}{}^* Y_{jr}$. The product with the highest precision in it is the left most digit in $\Delta X_i{}^* \Delta Y_j$. The distance in decimal positions between left most digits in $X_{ir}{}^* Y_{jr}$ and $\Delta X_i{}^* \Delta Y_j$ is s+t digits. Sign ',' at the end of the right side in (3.1.5) is the sign for truncation and rounding operation being applied to the expression inside of the brackets. If operation ( . . . )$_r$ truncates and rounds V digits and v<s+t then $\Delta X_i{}^* \Delta Y_j$ cannot contribute any digits to the rounded value of $X_{jr}$. Similar consideration would apply to inequalities v<s (and $X_{ir}{}^* \Delta Y_i$ cannot contribute digits), or v<t (and $Y_{jr}{}^* \Delta X_i$ cannot contribute digits) to $X_{jr}$ value. Finally, if v<min(s,t) then only digits from $X_{ir}{}^* Y_{jr}$ can be used to form $X_{jr}$. Formula (3.1.6) is a complementary to (3.1.5) and plays no independent role in selecting the range of the i+1 iteration product.

Thus, formulas (3.1.5) and (3.1.6) enable to maintain the selected range (constant, incremental or variable) across iteration process. The rounded error $\Delta X_{i+1}$ and product $X_{(i+1)r}$ which are calculated at current iteration get passed as is to the next iteration. This concludes exploration of NRB to NDB conversion.

The following example illustrates some of the discussed issues. In particular, it restores the true significant digits in (3.1.5) using every one product inside of the right side brackets. For simplicity, we use the decimal fractions only.

Example 3.1.7

Let's $X=69783*10^{-7}$, $Y=345678*10^{-10}$, $X_1=6978*10^{-6}$, $\Delta X_1=3*10^{-7}$ $Y_1=34568*10^{-9}$, $\Delta Y_1=-2*10^{-10}$. We have $X_1{}^* Y_1=24121550400*10^{-17}$, $Y_1{}^* \Delta X_1=103704*100^{-17}$, $X_1{}^* \Delta Y_1=-139560*10^{-17}$, $\Delta X_1{}^* \Delta Y_1=-6*10^{-17}$.

Direct substitution of intermediate products $X_1{}^* Y_1$, $Y_1{}^* \Delta X_1$, $X_1{}^* \Delta Y_1$, $\Delta X_1{}^* \Delta Y_1$ in formula (3.1.4) validates our calculations.

Let's notice that product X*Y (=24122447874*$10^{-17}$) has eleven significant digits, and only the first four digits are in match with $X_1$*$Y_1$ digits. The last seven digits in $X_1$*$Y_1$ are in error because expression ($Y_1$*$\Delta X_1$+$X_1$*$\Delta Y_1$+$\Delta X_1$*$\Delta Y_1$) has a range is from $10^{-21}$ till $10^{-27}$, and every digit from this range is in error due accumulated rounding errors.■

There is a caveat here. In order to multiply numbers with more than eight significant digits we need double arithmetic multiplication. As Java offers only 16 decimal digits for doubles, therefore, just a simple multiplication of eight digits number by a nine digits number produces a loss of the last significant digit and rounding of the $16^{th}$ digit in the product. As such errors get accumulated we cannot use standard Java's data types to perform multiplication. Fortunately, Java has an advanced mechanism—the BigDecimal arithmetic—which enables operations over numbers with large range. We used earlier the BigDecimal arithmetic to get results in Table 2.1.1. We will use the BigDecimal Math Library further on for different encryption tasks throughout this paper. Our next topic of discussion is conversion NDB data to NIF format.

4.1. Conversion to NIF Format

Comment: If tomorrow's computers will be able to perform decimal operations without converting data to binary format first, then the discussion in this paragraph would be obsolete. Until then, we must visualize to some greater detail the problems associated with our data presentation inside computers so as to see what we can do to get around or minimize the conversion data errors.

In this section, our target is conversion of external data (mostly decimal) into internal (always binary) format. The problem with conversion, and subsequent idiosyncrasies associated with computational errors had attracted a considerable attention in science and technology since invention of the computers. Even so the IEEE standards based on works by W. Kahan, [3], D. Goldberg, [4], and others computer scientists and mathematicians had uncover the mystery behind enigma of computer calculations, the problem of getting the clean result from approximately calculated data will never go away. As our encryption/decryption go straight into the arithmetic over rational numbers, therefore, we will describe a few the most simple and primitive ways how to block the calculation errors from eradicating the defense line of our encryption. Let's look at a few examples before defining a method which will bring some comfort and trust to our calculations.

Example 4.1.1

Let's look at the following display of a decimal number after it had rushed through the printing pool to the screen. We took a rational number g=0.117 as an example to illustrate an existing problem in converting and storing it inside computer with maximum possible precision. Since 0.117 cannot be converted exactly into binary number, we decided to use 56 decimal positions so as to get a binary approximation to 0.117 with $10^{-56}$ accuracy. We used Big Decimal arithmetic to handle this task and entered 0.117 as a double data type for converting number g into BigDecimal number with 56 decimal positions. Here is how this conversion looks like:

BigDecG=0.11700000000000000677236045021345489658415317535400390625<<12345678901234567890123456789012345678901234567890123456789012345678901234567890123456>> (4.1.1)

The error beyond $17^{th}$ position can be explained as follows. Rounding 0.117 binary starts from extracting maximum binary fraction from it—which is $2^{-4}$=0.0625. The remainder is 0.117−0.0625=0.0545. Let's extract next maximum binary fraction from the remainder. This number is $2^{-5}$=0.03125. The next difference 0.0545−0.03125=0.02325 contains fraction $2^{-6}$=0.015625 and remainder 0.007625. Next maximum binary, the fraction $2^{-7}$, can't be subtracted from the previous remainder. However, the following, $2^{-8}$, binary fraction can be. As result, after eight iterations, we got eight binary digits 0.00011101, i.e.

$$0.117 \approx 0.00011101 \text{ (with some degree of accuracy)} \quad (4.1.2)$$

Continue this process, we would be able to get the binary image "in progress" as long as we have enough room to operate, i.e., the remainder is not null, and the decimal image of the next binary fraction range is within allowable range (in our case, 16 decimal digits). Since each division by two moves the lowest digit to the right by one position, therefore, when seventeenth division would occur, the lowest digit will be truncated (due shift and round operation), and the last significant digit of the remainder will become dirty, i.e., losses its significance. Further division by two of the binary fraction and subtraction from remainder makes remainder and the decimal image of the binary fraction even "more dirtier" (i.e., accumulates additional rounding and calculation errors), and thus, all the digits beyond $17^{th}$ position cannot be trusted. In fact, everything beyond this position in expression (4.1.1) is an accumulation of dirty digits.

We can alienated the problem in (4.1.1) and correct the conversion error by using the following two scale operation (available through BigDecimal library). First, we will truncate the BigDecimal number with 16 clean digits, so as to get unobstructed $g_1$=0.1170000000000000, using scale=16, and then, using another scale, to convert $g_1$ into $g_2$=0.11700000000000000 . . . 0 using scale=56. Thus, we can over shadow the conversion errors beyond $16^{th}$ digit and get clean data as long as we know ahead of time what actual range of our external data is. We will call this 2-step technique as "cut and paste" trick. We use this "trick" on many occasions throughout the paper because we found that conversion errors beyond $17^{th}$ position have gotten there due deficiency of the conversion algorithm which can be corrected to obtain a clean data with limitless precision. This justifies the "cut and paste" usage (simply speaking, CAP algorithm) for our encryption needs. The following example demonstrates one useful application where CAP algorithm produces cleanly a converted inside computer data with more than 26 digits.

Example 4.1.2

The NRB number $X_{nrb}$=11.012345678901234567 treated inside computer as double, though, as is, it consists of more than 16 digits. As double, it was converted into BigDecimal format, and the results of such conversion looks like this 11.01234567890123372535525268. It has only 14 significant digits after the decimal point matching the original number. The little trick here is that we can use CAP algorithm in tandem by breaking the initial number $X_{nrb}$ into two parts: 14 digits in one, and the rest in the other part, and after that, convert cleanly both parts (using CAP algorithm), and appending together two results. This will produce an accurate BigDecimal NIF representation for $X_{NRB}$ number as $X_{NIF}$=11.012345678901234567000000..0. We sparingly use this approach to get statistics for large samples of encrypted data.

5.0. Strategy for Improving Calculation Reliability

The follow up chapters 5.1-8.4 are dedicated to analysis of reliability in computer calculations and measures which we found useful to improve it. The following topics, in particular, will be covered up:
Confidence in computer calculations
Calculation errors over NIF data.
Choosing reliable algorithms and data precision to minimize loss of significance.
The ESIA algorithm for analysis of conversion error
Analysis of the BigDecimal conversion errors by using ESIA
The Simplified Cut and Paste tool for improving reliability of data
Accumulation calculations errors in NIF data
IBP effect on confidence
Prediction of resulting confidence using calculus
Examples for IBP estimation
Loss of significance due calculation and rounding errors accumulation
Calculation errors and precision estimates.
Incorporation of the latest IEEE requirements for reliable computing

5.1. Confidence in Computer Calculations

This is a huge topic to explore in one section. So, we will break our discussion of confidence into many not necessary independent topics in an attempt to address numerous factors involved in getting reliable results on computer. As computers are of limited precision, therefore, forceful truncation and rounding are part of the computer well being (not the applications well being, of course!). Simultaneously, this poses all kind of scenarios where those rounding and truncation errors can be exposed. As our goal to deliver an encryption scheme in the field of rational numbers, we must be alert to address all these uncertainties (errors and scenarios that expose them) as need arises.

In an attempt to systematize these errors and sources for those errors, we compiled a working list by placing in it the only those issues which we think are pertinent for security and reliability of our encryption and decryption model.

Here is the list of such errors and situations where these errors might occur in order, and those which will eventually lead us to definition of a reliable encryption scheme:
1. Conversion errors. As data enters computer, it must be converted to computer format. As computer data is always binary this creates conversion problems on the top of computer precision limitation problems.
2. Loss of significance is aggregated by the computer precision limitation and selection of inappropriate calculation algorithms
3. Choosing reliable and efficient algorithms to perform calculations as encryption adds one additional level of complexity to the calculations performed
4. Raising precision of the data under operations in order to separate a subrange of digits holding conversion errors from a subrange of digits holding calculations errors within one and the same data type.

Even so this list may not be complete but it highlights the area we are about to explore, and if some issues had not been included in this list now, we will add them as we go along. Thus, following our agenda, we will explore next the calculation errors using NIF data.

5.2. Calculation Errors Over NIF Data

Let's agree here and to the rest of this paper that the maximum range of the decimal digits for a casual numeric column in a database is assumed to be 150 digits.

In the previous samples 4.1-4.2, we discussed conversion errors associated with translating NDB into NIF data. We introduced the CAP algorithm to shadow off the conversion errors when range of the ought to be converted data is known ahead of time. There is quite a demand for the CAP tool, because entries from a single chunk could have different ranges and precisions, and this potentially could cause a wrong usage of data. Even when data's range and precision are properly recognized, nevertheless, calculation errors such as badly selected algorithms, or even simple arithmetic operations over numbers close by value could lead to a complete or partial loss of significance.

As the problem of loosing precision (the same as loosing significance) will never go away, and it gets only worse together with the amount of calculations performed, nevertheless, losing a few significant digits does not necessary mean to lose the whole result. Only when errors and data inaccuracy get intermixed with the statistical limits of confidence, only then we shall not trust our calculations and do something to correct the problem.

One way to prevent the loss of significance (due conversion and calculation errors) is to increase the precision range of data in operation. Such expansion enables to build a safety corridor in NIF data presentation into which calculation errors can be accumulated (or, as we say it, "dumped into"). These dumpers being filled with zeros (as significant digits) in the beginning, during data conversion, form some kind of a wall to prevent the accumulated errors from being moved into significance territory.

Our nearest goal is to increase the precision of data so as to prevent accumulation of calculation errors within an original (i.e., external) range of significant digits. This issue is resolved in the next paragraph where we improve the external-to-internal data conversion routines. Later, this enable us to build the clean internal data having practically unlimited precision (briefly speaking, PUP data).

6.0. Choosing Reliable Algorithms and Data Precision to Minimize Loss of Significance In this section, first, we will improve the data conversion routine using java.math.BigDecimal software. We will show that the currently available in Java double to BigDecimal data conversion routine has a systematic rounding error. Based on this finding, we built (using the same java.math.BigDecimal software) an efficient external-to-internal data conversion routine which enable us to produce the clean internal PUP data.

First, let's make the following fundamental assumption:
Statement 6.1.: The NIF format of every number M is deterministically defined.

Proof using Ever Shrinking Interval Algorithm (briefly ESIA): In order to prove this statement we will use the ESIA algorithm which builds iteratively two series of upper and lower binary boundaries approaching number M. With each iteration step, the upper boundaries are descending and lower boundaries are ascending so as the interval between latest pair of boundaries is smaller than for the previous pair. The descending and ascending factors used to reduce the upper and lower boundaries are binary fractions as well. The process stops if one of the boundaries matches number M, or the interval gets smaller than the a-priory set limit. In first case, i.e., when one of the boundaries matches M, this number, M, converts exactly to a binary fraction. In second case, M is approximately equal to a binary boundary (upper or lower), and the error of approximation is less than preset limit. Now, to complete the proof, let's denote the limit in ESIA iteration as $\epsilon$, and let's assume that $\epsilon$ lies inside interval $2^{-(k+1)}$ and $2^{-k}$. If $|\log_2 \epsilon|$ is an absolute value of $\log_2 \epsilon$, and $[|\log_2 \epsilon|]$ is the whole part $|\log_2 \epsilon|$ then to reach limit in ESIA iteration we need no more than k+1 steps. This completes the proof.

Note 6.2

The following few paragraphs demonstrate the usage of ESIA algorithm. In them, we explain the "mystery" of errors beyond $17^{th}$ position in BigDecimal representation of the decimal numbers. We observed those errors earlier in Example 4.1.1. We will show that these errors are not random events, but rather systematic errors of an inaccurate conversion routine. To prove this fact we reconstructed the same "conversion errors" using ESIA algorithm. With the use of Simplified version of the CAP Algorithm (which works with decimal numbers having no more than 17 significant decimal digits) we are able to correct these conversion errors and improve the conversion routine. As result, a clean NIF data, free of conversion errors, is produced—as table 6.3.2 will show. Using clean data, we were able to build the strong RLE symmetrical encryption thoroughly described in details in chapter 9 of this paper. In the next few paragraphs, we will describe in some details the error correction effort mentioned in this note. Right after that, we will discuss the calculation errors and the loss of precision due these errors. Both steps—conversion errors correction and estimation of the loss of significant digits aim in resolving reliability issues concerning RLE symmetrical encryption.

6.3. The ESIA Algorithm in Action

Example 6.3.1

To prove that ESIA is practically important, we analyzed the following series of decimal fractions: 0.01, 0.02, 0.03, 0.05, 0.07 and a few multiples of them. All together, we look at only eight fractions from 0.01 to 0.08. Their initial BigDecimal presentations are displayed in the second column of Table 6.3.1.

With respect to table 6.3.1 above, let's notice that we are dealing here with decimal numbers containing less than 17 significant digits (excluding leading zeros). Secondly, every BigDecimal in the $2^{nd}$ column (which is a conversion of the decimal on the left from the same row) contains conversion error starting in $18^{th}$ or $19^{th}$ positions. In the next table 6.3.2 we will display the same errors but obtained by our Java programs with the use of ESIA algorithm. This shows, thus, that the conversion errors in table 6.3.1 (displayed in the second column) are not randomly originated, as we were able to reproduce them by using a deterministic algorithm. As result, these errors could had been avoided, and, therefore, after displaying this reproduction of errors in table 6.3.2, we will describe the cleaning algorithm (called as Simplified Cap Algorithm) to produce the clean BigDecimals which match by value to the initial decimal numbers from the first column of table 6.3.1. The assemble of the clean BigDecimal is shown in the follow up table 6.3.3.

6.3.2. Analysis of the BigDecimal Conversion Errors by Using ESIA

As Java program (which implements ESTA algorithm) launches an iterative process, a series of shrinking intervals—surrounding seeds 0.01 trough 0.08—are produced. The size of each interval got recorded. Each iterative process addresses one seed at a time, and each interval delivers a distance between edges surrounded the original seed. The purpose for each iteration step is to shrink the interval from the previous iteration. The discrepancies between the seed and interval edges produce left and right approximation errors, and the largest of them get divided in half to define the shrinkage at the next iteration step.

If we accept the edges as seed's approximation, the size of interval gives the precision of approximation. When interval gets smaller than an a-priory preset level, the process stops.

This ESIA routine was implemented using BiDecimal Java technology. We used this routine to prove that java.math.BigDecimal conversion routine from double to BigDecimal data types generates conversion errors which has no random basis in it, but rather produced due deficiency of the algorithm used. As it shown in Table 6.3.1, the errors began accumulating after 17 significant digits were produced. In order to prove that errors in table 6.3.1 have no random origin, we tuned the ESIA Algorithm and repro-

TABLE 6.3.1

| Seed | "dirty" BigDecimal conversion |
|---|---|
| 0.01 | 0.01000000000000000020816681711721685132943093776702880859375 |
| 0.02 | 0.02000000000000000041633363423443370265886187553405761718750 |
| 0.03 | 0.02999999999999999888977697537484345957636833190917968750 |
| 0.04 | 0.040000000000000000832667268468867405317723751068115234375 |
| 0.05 | 0.05000000000000000277555756156289135105907917022705078125 |
| 0.06 | 0.05999999999999999777955395074968691915273666381835937500 |
| 0.07 | 0.07000000000000000666133814775093924254179000854492187500 |
| 0.08 | 0.08000000000000000166533453693773481063544750213623046875 | duced results from table 6.3.1. ESIA results are shown in the second column of table 6.3.2. These results are matching exactly.

ning 17 positions after the first significant digit is produced (by the conversion routine). We found (and table 6.3.2 illustrates it) that these conversion errors have no random

TABLE 6.3.2

| Seed | BigDecimal conversion | Latest right/left correction | Prey right/left correction |
|---|---|---|---|
| 1 0.01 | 0.0100000000000000002081 6681711721685132943093776702880859375000000000000 | rouRight -2.0816681 7117216851329430937767028808593750000000000E-19 | 8.6736173798840354720596 22406959533691406250000 000000E-19 |
| 2 0.02 | 0.0200000000000000004163 3363423443370265886187553405761718750000000000 | rouRight 5.8366636 5765566297341138124465942382812500000000000E-19 | 1.7347234759768070944119 24481391906738281250000 0000000E-18 |
| 3 0.03 | 0.0299999999999999988897 7697537484345957636833190917968750000000000000 | -1.1022302462515654042331 668090820312500000000000 000000E-19 | 1.3877787807814456755295 39585113525390625000000 00000000E-17 |
| 4 0.04 | 0.0400000000000000008326 6726846886740531772375106811523437500000000000 | 1.6733273153113259468227 624893184765625000000000 000000E-19 | 3.4694469519536141888238 48962783813476562500000 0000000E-18 |
| 5 0.05 | 0.0500000000000000027755 5756156289135105907917022705078125000000000000 | 2.2244424384371086489409 208297729492187500000000 0000000E-18 | 6.9388939039072283776476 97925567626953125000000 0000000E-18 |
| 6 0.06 | 0.0599999999999999977795 5395074968691915273666381835937500000000000000 | -2.2044604925031308084726 3336181640625000000000000 00000000E-19 | 2.7755575615628913510590 79170227050781250000000 00000000E-17 |
| 7 0.07 | 0.0700000000000000066613 3814775093924254179000854492187500000000000000 | -6.6133814775093924254179 00085449218750000000000 00000000E-19 | 2.7755575615628913510590 79170227050781250000000 00000000E-17 |
| 8 0.08 | 0.0800000000000000016653 3453693773481063544750213623046875000000000000 | -6.65334536937734810635 44750213623046875000000 00000000E-19 | 6.9388939039072283776476 97925567626953125000000 0000000E-18 |

As our ultimate goal is to produce the clean NIF data, therefore, in the next section we will introduce the Simplified Cut and Paste (simply, SCAP) which will be used throughout this paper to clean conversion errors and other reliability tasks.

However, before we move ahead with SCAP algorithm let's make the following comment. Note 6.3.3. If input data contains more than 17 significant digits (an event which most likely occurs in scientific application), then, due truncation operation, the straight conversion of the double to BigDecimal data types would generate irreparable conversion errors. Therefore, in order to convert decimals with more than 16 digits these numbers must be broken into chunks of numbers each containing no more that 16 significant digits. Then, each of these smaller chunks must be converted into clean BigDecimal equivalents, and to finalize the conversion all intermediate BigDecimal must be concatenated follow their original order.

6.4. The Simplified Cut and Paste Tool for Improving Reliability of Data

Let's recap what had been discussed so far regarding NDR to NIF conversion.

As we saw in tables 6.3.1, the conversion from double the BigDecimal inherently generates conversion errors begin-origin, but rather can be explained using ESIA tool. This means that conversion errors have deterministic origin, and as such can be truncated and replaced with zeros for as long as we want. The only limitation which had been imposed on the precision of our results is the maximum precision E-150 we shall not exceed.

Now, we can explain the narrative for SCAP Algorithm that enables us to clean deterministic conversion errors. We use the truncation operation to cut those errors first. This is achieved by using scale parameter which can be tuned to point to an exact location of the errors which we knew can be truncated. Next step is to achieve the desirable precision for NIF data. This property is achieved by using another scale parameter usually, larger the first scale. The second scale points to the rightmost decimal digit which defines the precision of NIF data we want to have. The gap between the first and the second scales gets filled with zeros, and all of them are significant digits for the future usage. Since scales are part of the BigDecimal math library and can tuned depending on the range and precisions of NIF data, the SCAP method can be used for various applications in connection with RLE encryption. Needless to say, though, that the most nontrivial element in applying the SCAP method is to figure out what are these scale parameters must be equal to? To answer this question we must be able to perform the analysis of errors estimates (which includes but not limited to analysis of differentials) and other elements of the prediction theory.

In conclusion of this paragraph, let's mention that SCAP method enable, indeed, the physical separation of the two areas in NIF digital format—one to keep the conversion errors, and the other to accumulate the calculation errors.∎

Next table 6.4.1 shows that by applying the SCAP Algorithm, the conversion errors in the second column of the table 6.3.1 can be eliminated, and the clean BigDecimal presentation of 0.01 through 0.08 decimals can be produced:

TABLE 6.4.1

| Seed | Dirty BigDecimal conversion | Clean BigDecimal conversion |
| --- | --- | --- |
| 0.01 | 0.010000000000000000020816681711721685132943093776702880859375000000000000 | 0.010000000000000000000000000000000000000000000000000000000000000000000000 |
| 0.02 | 0.020000000000000000041633363423443370265886187553405761718750000000000000 | 0.020000000000000000000000000000000000000000000000000000000000000000000000 |
| 0.03 | 0.029999999999999999888977697537484345957636833190917968750000000000000000 | 0.030000000000000000000000000000000000000000000000000000000000000000000000 |
| 0.04 | 0.040000000000000000083266726846886740531772375106811152343750000000000000 | 0.040000000000000000000000000000000000000000000000000000000000000000000000 |
| 0.05 | 0.050000000000000000277555756156289135105907917022705078125000000000000000 | 0.050000000000000000000000000000000000000000000000000000000000000000000000 |
| 0.06 | 0.059999999999999999777955395074968691915273666381835937500000000000000000 | 0.060000000000000000000000000000000000000000000000000000000000000000000000 |
| 0.07 | 0.070000000000000000666133814775093924254179000854492187500000000000000000 | 0.070000000000000000000000000000000000000000000000000000000000000000000000 |
| 0.08 | 0.080000000000000000166533453693773481063544750213623046875000000000000000 | 0.080000000000000000000000000000000000000000000000000000000000000000000000 |

This concludes the topic of decimal to binary conversion errors and correction procedures aim to produce the clean input data in computer format.∎

7.1. Accumulation Calculations Errors in NIF Data

Generally, the internal presentation (NIF) and its precision is different from the external, NDR, data, therefore, we will use two distinct terms and notations for NDR and NIF data precision.

We will call as an External Boundary Precision (or, EBP) its right most significant digit of NDR number. As an illustration, the number $10.15 (ten dollars and fifteen cents) has its EBP presentation measured in $100^{th}$ of a decimal point.

We will call as an Internal Boundary Precision (or, IBP) its right most significant digit of NIF number. The IBP, generally speaking, depends on a numeric format we choose for our numeric data—it could be an integer, a binary, a float, or any other legitimate format (in Java, for instance, there are ten plus different numeric presentations of data inside computer). Since data inside computer could migrate from one data type to another, so is true for IBP—it could change over time.

However, regardless whether we address IBP or EBP, their precisions are defined by their rightmost significant digit of data presentation. Dirty digits (which, by definition, can't be significant) do not participate in specifying IBP and EBP.

7.2. IBP Effect on Confidence

The specified types of precision—EBP and IBP—take us right into the issues of data confidence. Do we trust our data? The answer is not simple as it sounds, because computers stores our data not necessary in its natural format but with a certain degree of approximation. Only the whole numbers are stored inside computer adequately to their external storage (unless these numbers greater than $10^{16}$, in which case, depending on software we use, these numbers must be broken into manageable chunks and convert into NIF format separately per each chunk, and to finalize the conversion these separate NIF's numbers must be added algebraically. The fractional parts, to the contrary, are subjected to rounding and truncation at conversion time, and, therefore, future use of fractional data could become problematic due wrongly selected computational algorithms or random error accumulation processes. As a rule of thumb, if ND's fractional part contains more than 18 significant digits, then the conversion such fractional part to NIF data (in Java implementation) requires the usage of BigDecimal numbers and application of technique described in the note 6.3.2 earlier.

Thus, calculation of IBP for NIF data is straight forward. However, effect of internal data precision on computational results depends on the type of calculations inside machine are taking place.

7.3 Prediction of Resulting Confidence Using Calculus

In this paragraph we began to study the effect of the internal data precision and formulas for calculations on the confidence of calculation results.

Needless to say that, intuitively, there shall be a correlation between adequate algorithms and sufficient precision of the input data, from one side, and reliable calculation results, from the other. The question remains: can this correlation be measured? Reversing the question, we could ask: is it possible for a given calculation formula (or, more generally, for a given calculation algorithm) to choose data so that errors during calculations will not subdue the validity of the original results? As the answer to this problem depends entirely on the individual formulas in progress, therefore, we specifically redirect those questions to the formulas for calculating the average of a statistical sample $$A = (1/N)\Sigma x, x \in \pounds \quad (7.3.1)$$

and standard deviation for the same sample $$StDev = (1/N\Sigma_x(x-A)^2)^{1/2} \quad (7.3.2)$$

7.4. Examples for IBP Estimation

Even for specific formulas, the IBP estimation is quite elaborative process. Therefore, we will approach this problem by consider a few simple examples before going to general conclusions.

First, let's examine the standard deviation in formula (7.3.2) just standing on EBP side without going into details with N IF conversion.

Example 7.4.1

Let's consider a small sample #1 of just four numbers: a=2.56, b=4.09, c=2.51, d=1.38. According to (7.3.2), with N=4, and sample $S_1=\{a, b, c, d\}$, we would receive (using (7.3.1) for A and $S_1$ for £) $Average_1 = A = 2.635$, and $StDev_1 = 0.963496237667797$.

As StDev is calculated with some rounding error, let's find out how many significant digits this number has? To answer this, let's use two samples,—sample #1 in its entirety, and a sample #2 as a slightly changed version of sample #1 as it displayed below.

Example 7.4.2

Let's sample #2 be a modified version of sample #1 in which only one entry, c, has changed from 2.51 to 2.52. The rest of the values for a, b, d in sample #2 are the same as in sample #1.

For clarity reasons, let's use subscripts 1 and 2 for samples #1 and #2 correspondingly, and derive statistics—averages and StDev—for sample #2. This gives $Average_2 = 2.6375$ and $StDev_2 = 0.9631815768586939$. As $StDev_2$ distinct from $StDev_1$ starting in fourth position, let's find out whether this change could have been predicted. As this is the case, let's prove—for the reference purposes—that

Statement 7.4.3

The first three significant digits in $StDev_2$ could have been predicted by using formulas (7.3.1), (7.3.2) and data from samples #1 and #2.

Proof: The difference between $c_1$ and $c_2$ is 0.01 (less that 0.5%). This causes $Average_2$ change by 0.0025, i.e., less that 0.1%. As these changes are small, we can use the standard deviation differential to bind the estimated change of StDev as a function of its derivatives changes. Let's use notation $\sigma_1$ and $\sigma_2$ instead of symbol $StDev_1$ and $StDev_2$ correspondingly. Thus, we have $$\sigma_i = StDev = (1/N\Sigma_x(x-A)^2)^{1/2}, \quad i=1,2 \quad (7.4.3)$$

Let's put $\sigma_o = \sigma_1$, and denote $\Delta\sigma = \sigma_2 - \sigma_o$ (i.e., $\Delta\sigma$ is a change of $\sigma_o$ caused by c and A changes). Now, let make one last modification and put $\sigma = \sigma_2$ so as to get the final view for the changed sigma:

$$\sigma = \sigma_o + \Delta\sigma \quad (7.4.4)$$

Given expression (7.4.4) for sigma $\sigma$, let's estimate $\Delta\sigma$ as a differential, $d\sigma$, applied to the right part in (7.4.3). We have $$d\sigma = \Sigma_{x=a,b,c,d,A}(\partial\sigma/\partial x)^*\Delta x = (\partial\sigma/\partial A)^*\Delta A + (\partial\sigma/\partial c)^*\Delta c =$$
$$(-1)^*(1/N)^{1/2}*(\Sigma(x-A))^*(\Sigma(x-A)^2)^{-1/2}*\Delta A +$$
$$(1/N)^{1/2}*(c-A)*(\Sigma(x-A)^2)^{-1/2}*\Delta c, \quad (7.4.5)$$

as $\Delta x = 0$ for all the x=a,b,d. The second line in (7.4.5) converts to $$(-1)^*(1/N)^{1/2}*(\Sigma(x-A))^*(\Sigma(x-A)^2)^{-1/2}*\Delta A = (-1)^*(1/(N\sigma))^*(\Sigma(x-A))^*\Delta A, \quad (7.4.6)$$

where $\sigma$ in (7.4.6) is an old $\sigma$ (i.e., $StDev_1 = 0.963496237667797$), and A in $\Sigma(x-A)$, in the same (7.4.6), is an old A (i.e., $A = Average_1 = 2.635$). Since all the x's in $\Sigma(x-A)$ are taken from the sample #1, therefore, $\Sigma(x-A) = 0$. Thus, expression (7.4.5) can be rewritten as $$d\sigma = (1/(N\sigma))^*(c-A)^*\Delta c \quad (7.4.7)$$

Since N=4, $\sigma = 0.963496237667797$, c-A=2.51-2.635=-0.125, and $\Delta c = 0.01$, therefore, $$d\sigma = -3.243396162671334E\text{-}4 \quad (7.4.8)$$

The new predicted sigma using formula (7.4.4) is equal to 0.963171898051529867, where is the direct application of formula (7.4.3) towards sample's #2 data will give a=0.9631815768586939. Thus, predicted sigma and computed $StDev_2$ have four significant digits in common. Since the correction factor $d\sigma$ have the first significant digit in the $4^{th}$ decimal digit position, therefore, the predicted $StDev_2$ has at least four significant digits which we found to be true.∎

Note 7.4.9

The sample size limitation in formulas (7.4.1) through (7.4.5) is not important. For that matter, any chunk size can be used, and algorithm for $d\sigma$ precision estimation will be the same as all $\Delta x = 0$ but $\Delta c$. The only question remains is whether $\Sigma(x-A) = 0$ for large samples. In the next chapter, we will discuss the conditions where this equality ($\Sigma(x-A) = 0$) is true for the large samples as well.

Notice 7.4.10

Our calculations in this section in a way of using differentials for error estimates similar to calculations described in the Lipman Bers, Calculus, v1-2, Holt Rinehart., Inc, New York, 1969. We elaborated our formulas for predicting of the confidence intervals for errors distribution independently because our encryption have no sense without reliable arithmetic. These elaborations, though, enable us to perform the reliable computer calculations involving summation of the almost 20 million residuals to produce rudimentary statistics such as calculation of variance and covariance over large sample of data. The precision of the sampling data for these calculations had $10^{-38}$ tolerance interval, and statistical parameters—standard deviation and correlation coefficients—delivered had $10^{-22}$ precision.

Conclusion 7.4.11

Based on statement 7.4.3 we could draw the following conclusions about predicted precision:

{1}: the given initial precision limitations will aim in estimating the expected precision of sigma in (7.4.4)

{2}: if sigma's precision limitation is set, it will bind the lowest precision for parameters and expressions for the right part of (7.4.5);

{3}: Collorary from {2}: the desired precision for Average, A, and standard deviation can be lowered or raised to meet the requirements set in (7.4.4) and (7.4.5).

8.0. Loss of Significance Due Calculation and Rounding Errors Accumulation

We discuss here the strategies to prevent such losses and demonstrated our approach by using a few numerical examples. We will show that the loss of significance can be reduced if we allocate a sufficient amount of significant digits for calculation errors accumulation, and will separate this area from the area where the highest significant digits of the input data or intermediate results are positioned.

Equality relationship in the field of the truncated rational numbers.

Let's $M_1$ and $M_2$ be two rational numbers from external realm $R_e$. Let's $EBP_1$, $IBP_1$, $EBP_2$, $IBP_2$ are boundary precisions for NIF presentations of $M_1, M_2$ within computer internal realm $R_i$.

Definition 8.1.1

The tolerance interval $\mathcal{J}_R$ in any realm R is defined as a half of the highest precision unit among all the entries in R.

Example 8.1.2

If $10^{-m}$ is the highest precision among all the entries x from a given realm R, then the length of the tolerance interval $\mathcal{J}_R$ in R is $0.5*10^{-m}$.

For the future references, we will assign the length of the interval $\mathcal{J}_R$ as $|\mathcal{J}_R|$.

Definition 8.1.3

We say that numbers $M_1$ and $M_2$ are equal in the realm R and write this as $$M_1 =_R M_2 \quad (8.1.3)$$

if and only if they are
not exceptional symbols (i.e., not any of NaN, ±0 or ±∞)
they are equal within a given degree of tolerance in R so as $|M_1 - M_2| < |\mathcal{J}_R|$.

Example 8.1.4

Let's x=0.0983, and y=0.098345. If x and y are belong to a some realm R, they are not equal because y∈R implies $|\mathcal{J}_R| < 10^{-6}$, though, $|x-y| > 10^{-4}$. If they do not belong to the same realm, they cannot be compared. In case, when we use a universal but truncated realm $R_u$ to which all numbers with precisions less than $10^{-100}$ belong, then we would have $|\mathcal{J}_R| < 10^{-100}$ where is $|x-y| > 10^{-4}$, i.e., x and y are different within $R_u$ likewise.■

8.2 Calculation Errors and Precision Estimates

Let's clarify a few following statements:

Statement 8.2.1

For any number M with a precision lower than $10^{-100}$, we can use the Simplified CAP Algorithm to make M's precision higher by a few decimal points.

Indeed, if M has less than 17 significant digits, then we can use the SCAP Algorithm to truncate M beyond last significant digit and append a few zeros to the right side of the truncated M. This will increase the significant range and precision of M. If, on the other hand, M has more than 16 significant digits, then we will break M into several chunks of less than 17 digits each. After that, the only last chunk will be expanded by one or more digits and all the chunks will get concatenated together (while preserving the original order) as one BigDecimal number.

Statement 8.2.2

The NIF right most precision for every number M is either: (a) assigned at will, (b) estimated and assumed, (c) calculated and assumed.

Proof: Based on previous Statement 8.2.1, ESIA conversion process will end up in one of the following conditions:

(case 1), the process stops by itself when M is a finite binary fraction;

(case 2), iteration process to convert M into NIF format continues to get all digits of the M's data type (for example, for double data type, M will be presented as $17^{th}$ digits decimal or in scientific notation with a decimal or hex base).

When denominator q in M=p/q contains factor $2^m*5^n$ for some m and n, then IESIA might stops by itself before filling all the decimal positions in NIF. In this case conversion of M to NIF has no dirty digits. Therefore, we could extend the significance of NIF form for Mat will without changing the value of NIF form of M. Thus, in case 1, the condition a) is true. In case 2, when iteration limit $\epsilon$ is reached, then precision of M is defined by the last upper or lower boundary, i.e., c) is true. The b) condition is not necessary follows directly from statement 8.2.1, but inspired by it. Namely, if limit $\epsilon$ is too low, we can reassign $\epsilon$ so as to have the precision of M set to a higher level, and, thus, b) is taken place.■

Statement 8.2.3

For every number M in our system, its $IBP_M$ precision can be made higher than $EBP_M$ precision by a well established order of magnitude, i.e.

$$EBP_M << IBP_M \quad (8.2.3)$$

Proof: This statement immediately follows from the previous statement because in three cases a)-c) the $IBP_m$ precision can be chosen arbitrarily high.

Commentary 8.2.4

The inequality (8.2.3) aims in making the precision of NIF data much higher than NDR data and, therefore, much safer operations over NIF data.

Statement 8.2.5

For every subset L of data in realm R, the following equation is true:

$$\Sigma_{x \in L}(x - A_L) =_R 0, \qquad (8.2.5)$$

where $A_L$ is the average of the chunk L, and x is any element from it.

Proof: For rational NBR and NDB numbers the equality (8.2.5) is true due definition of $A_L$. Let's prove that if inequality (8.2.3) is true then equation (8.2.5) is true for NIF data as well.

The problem with (8.2.5) truthfulness, in case of NIF, is the loss of significant digits. Here are the factors which are contributing to this loss. First is rounding errors of $A_L$ and x's. Second is accumulation of errors during subtraction. Third is summation for large samples.

Let's admit here, that if (8.2.3) is not true, then due computer precision limitations, the calculation of $A_L$ (as $(1/N)\Sigma_{x \in L} x$, where N is the size of L) and subsequent rounding operation might affect the precision of $A_L$. This would invalidate the lowest significant digit of $x-A_L$ for x∈L. As result, during final summation, the inaccurate digits could get accumulated and moved up to the left so as to make inaccurate the whole result.

Thus, inequality (8.2.3) guaranty the freedom to choose the precision of $A_L$ as high as it is needed to build a safety corridor between the lowest precision of the chunk L data and the rightmost highest precision of $A_L$. Simultaneously, this will assure that the loss of significant digits in one (or many) x—A subtractions will not be promulgated to invalidate the entire sum in (8.2.5). This will take care of choosing the right range for $A_L$.

Next we will take care of the conversion errors business. If we will not intervene and leave to the computer to decide what range and where the conversion errors within NIF data will be also RLE, then here is what most likely to happen at data processing time: the conversion errors which are always present get accumulated and will move up towards the low precision digits causing loss of significance. For example, during averaging of the large samples, the summation of residuals x-A in (8.2.5) will lead to accumulation of conversion errors in the area of high precision. This will move up to the left the sum of these errors, thus, reducing the significant range. To prevent this loss of significance, the selection of the rightmost precision for data must include information about EBP precision for external data to reserve space for conversion errors. For example, to make sure that summation in (8.2.5) will not destroy the significant range of L, the square root of the cardinal number of L must be used as a factor to move to the right the rightmost precision of L. In addition, the same (the square root of the cardinal number of L) must be reserved for accumulation of calculation errors. Such strategy would prevent the summation in (8.2.5) to destroy the result significant range.∎

8.3. Example Showing the Reduction of the Loss of Significance

We learned, that excessive rounding causes one inherited abnormality—it forces significant and insignificant digits be positioned next to each other within one and the same data type. This mixture of different type of digits (i.e., clean or dirty digits) is the source for all kind of idiosyncrasies resulting in accumulation of errors, and, eventually, loss of significance.

Let's consider the following example. Let's X=0.53739363563835127 and Y=0.56260636536165875. Let's assume that $17^{th}$ position (7 for X and 5 for Y) contains rounding error, and all the other positions 1 through 16 are significant, i.e., clean. The sum S=X+Y is 1.00000000000000002, and error in $17^{th}$ position got promulgated all the way to the position of the whole numbers, thus, causing the loss of significance for entire sum S. Now, if we subtract $Z=3E10^{-17}$ from S (irrespective whether 3 in Z is significant or not), we will get D=S-Z=0.99999999999999999.

By looking at D, we do not know how many significant or insignificant digits it has. Generally speaking, in order to resolve the "significance" issues in this particular case we need to keep track of the history of how the sum was formed. Such formation of S may or may not help to qualify D as significant or as a "junk" number. Apparently, this is an extreme and radical case to deal with. There are several ways to avoid this "dead lock" situation. We will discuss just two of them.

The first one is known in computer science as the "change the algorithm of operations" method. In simple cases, like in our example, to escape the loss of significance, it is sufficient to change the order of operations. Continue with our case, let's compute the Y-Z first and then add X to it. This will prevent the loss of significance in (X+Y)−Z.

On the larger scale, the table 8.3.1 below, shows how unsustainable the computations on computers can be resulting in partial loss of significance of up 75% of significant range.

TABLE 8.3.1

| N# | Mean | Computed Mean | Data Type | Variance | Computational Error |
|---|---|---|---|---|---|
| 1 | 99.9999999 | 99.999999990167458 | 16digits/dbl | 0.0010 | −1.6756658054362106E−4 |
| 2 | 100.0 | 100.00000010814034 | 16digits/dbl | 0.0010 | −5.729322204217624E−5 |
| 3 | 100.0 | 100.00000321679174 | 16digits/dbl | 5.0 | 2.165858447114033E−4 |
| 4 | 100.0 | 99.99181666605385 | 16digits/dbl | 50.0 | −3.1930776100352887E−4 |
| 5 | 100.0 | 99.99987849932626 | 16digits/dbl | 0.5 | 4.367448462971879E−5 |
| 6 | 100.0 | 100.00006632508536 | 16digits/dbl | 0.5 | 4.312658255258839E−4 |

Table 8.3.1 displays the results of sampling due formula (8.2.5) of the Ser. No. 19/999,076 (almost 20 million) summation of the java double numbers. The average A shown in table as Computed Mean, and it is derived as $(1/N)\Sigma_{x \in}$L x. The Computational Error, causing loss of 11 to 12 significant digits out of 16 available, were factors of data conversion errors enhanced by computation errors as well as rounding errors. This is quite a loss of significance!

The second method which is recommended here will significantly improves the statistics in table 8.3.1 (see table 8.3.2 below) is based on the earlier described SCAP Algorithm. It shall be combined with the "change operations" method mentioned above. According to CAP, every internal NIF number got replaced by a number that has much larger range and precision. The idea to use CAP to improve the results in table 8.3.1 is to separate the highest precision digits where computational errors get accumulated from the last significant digits NIF numbers have (and where the data conversion were accumulated). CAP embeds NIF into much larger by range and precision numbers. If the old language 'C' is used for NDB to NIF conversion, then internal data in long double format (minimum allowable range $1E10^{-37}$ to $1E10^{37}$) would have 37 digits to work with, and for most of the real life applications (finance, chemistry, weather forecasting) this would be sufficient. Oracle, for example, allows routinely to use the maximum of 38 digit numbers and has no problem maintaining huge databases and applications, so caution must also be expedite and the loss of significance must always be monitored. For Java application (which we use in this paper to illustrate the RLE encryption method), the CAP application is a must.

For RLE encryption and the large statistical calculations over RLE encrypted data, we must have a sustainable computing results. The CAP application is demonstrated in the table 8.3.2. Tests 1 through 4, in this table, are based on scale 2=32. Test #5 uses a shorter scale2=21. This produces a loss of significance much higher than in tests 1-4 because the range of data in test 5 is narrower by 11 digits and, thus, all errors are bumping into each other causing such abnormality. When test #5 was recalculated over sample with range 32, the result get in line with the rest of the tests 1-4 (see line 6).

TABLE 8.3.2

| N# | Mean | Computed Mean | Var | Scale | Error |
|---|---|---|---|---|---|
| 1 | 99.99999 | 99.9999999016662009133107797953843 | 0.001 | 32 | 6.142742290403E−20 |
| 2 | 100.0 | 100.000000108137474621434667064936 17 | 0.001 | 32 | 6.611027924681E−20 |
| 3 | 100.0 | 100.000003216802575905402915792572 78 | 0.1 | 32 | 6.997610321620E−20 |
| 4 | 100.0 | 99.9918166660378731652327569926776 9 | 50.0 | 32 | 7.03735565972E−20 |
| 5 | 100.0 | 99.9998784993284426276 25 | 0.5 | 21 | 1.121238E−15 |
| 6 | 100.0 | 100.00006632510693347786895335527811 | 0.5 | 32 | 1.2504818693989E−19 |

8.4. Incorporation of the Latest IEEE Requirements for Reliable Computing

In view of the fact that all the elaborations and formulas in this text were done with a sole goal to be used on computers for numeric and statistical calculations, therefore, we must consciously incorporate the latest IEEE requirements for precision computing in our encryption/decryption models. We begin this incorporation by making a few assumptions. This list of assumptions will grow as need arises.

Assumption 8.4.1

For simplicity of notation, here and elsewhere in the following text, we write x≠0 if and only if number x is not a zero number nor any of the special symbol: NaN, ±0 or ±∞, where NaN, ±0, ±∞ are special symbols defined in the IEEE 754-2008 standards, [5]. normally, these symbols are associated with execution exceptions.

Assumption 8.4.2

If during calculations over encrypted numbers the result of operation has become one of special symbols: NaN, ±0 or ±∞, then calculations must cease to continue, and result must be assigned to one of these special symbols.

Assumption 8.4.3

In addition, an investigation must be launched to find the reason for such loss of significance. To prevent this undesirable event to occur, a forecasting of the potential loss of significance (including the estimation of the accumulation errors of operations (i.e., their range and precision)) must be performed before a large amount of calculations get started. These issues were addressed earlier, and here we rely on sections 8.0-8.3 methodics for getting such estimations.∎

9.1. Introduction to the Ratio Less Encryption (RLE)

In this section we will define a completely randomized RLE encryption scheme. The randomization breaks the ordering homomorphism between original and RLE image domains. It, literally, turns the image domain into a chaotic mess. As result, the intruder cannot use the traditional plain text as well as data ordering based attacks to compromised RLE encrypted data.

The completely randomized encryption scheme RLE (Ratio Less Encryption) is defined in steps below as follows.

Definition 9.1.1

Let's $\alpha, \beta, \gamma, \delta$—are rational numbers, and $$\Delta = \alpha\delta - \gamma\beta \quad (9.1.1)$$

1s a rational function satisfying the following conditions:

$$\Delta \neq 0, \neq NaN, \neq \pm 0, \neq \pm\infty \quad (9.1.2)$$

Assumption 9.1.3

Here and further on in this paper, we assume that $\alpha, \beta, \gamma, \delta$ are selected in such a way that conditions (9.1.1)-(9.1.2) are true.

Definition 9.2.1

Let's $x, r_x$ are two nonzero rational numbers taken from an unciphered true domain $\mathcal{R}$. The following functions $$\mathcal{D} = \mathcal{D}(x, r_x) = \alpha x + \beta r_x \quad (9.2.1)$$

$$\mathcal{E} = \mathcal{E}(x, r_x) = \gamma x + \delta r_x \quad (9.2.2)$$

over $x, r_x$ and $\alpha, \beta, \gamma, \delta$, predicated in the assumption 9.1.3, are called as Ratio Less Encryptions (briefly, RLE), or, interchangeably, as RLE transformations. Let's also name the encryption forms $\mathcal{D}$ and $\mathcal{E}$ in (9.2.1) and (9.2.2) as $\alpha$- and $\gamma$-encryptions correspondingly.

Elements $x, r_x$ utilized inside (9.2.1)-(9.2.2) equations are named as mutually complemented within given RLE transformation. Similarly, encryptions $\mathcal{D}(x, r_x)$, $\mathcal{E}(x, r_x)$ corresponding to the mutually complemented pairs, $x, r_x$, will be called as complemented encryptions.

Assumption 9.3

Here and elsewhere below, in this paper, we name the encryptions obtained with the use of formulas (9.2.1)-(9.2.2) as original encryptions.

9.4

Addition Homomorphism of RLE transformations: Let's $\mathcal{D}_i$, $\mathcal{E}_i$, i=1,2, are two duplets of the encryption forms, ($\mathcal{D}_1$, $\mathcal{E}_1$), ($\mathcal{E}_1$, $\mathcal{E}_2$), for the two nonzero rational numbers $x_1$, $x_2$ and complemented random values $r_{x1}$, $r_{x2}$. Let's define the sum $\mathcal{D}_1 + \mathcal{D}_2$, $\mathcal{E}_1 + \mathcal{E}_2$, as the following transformation over $x_1 + x_2$ and $r_{x1} + r_{x2}$ elements using the following rules:

$$\mathcal{D}_1 \mathcal{D}_2 = \alpha(x_1 + x_2) + \beta(r_{x1} + r_{x2}) \tag{9.4.1}$$

$$\mathcal{E}_1 + \mathcal{E}_2 = \gamma(x_1 + x_2) + \delta(r_{x1} + r_{x2}) \tag{9.4.2}$$

Statement 9.4.3

Let's ($\mathcal{D}_i$, $\mathcal{E}_i$, i=1,2, are two encrypted duplets of RLE transformations satisfying conditions (9.4.1)-(9.4.2). Then, there exist two rational numbers $x_3 = x_1 + x_2$, $r_{x3} = r_{x1} + r_{x2}$, so as their RLE encryption forms $\mathcal{D}_3$, $\mathcal{E}_3$ are satisfying the following equalities:

$$\mathcal{D}_3 = \mathcal{D}(x_3, r_{x3}) = \mathcal{D}_1 + \mathcal{D}_2,$$

$$\mathcal{E}_3 = \mathcal{E}(x_3, r_{x3}) = \mathcal{E}_1 + \mathcal{E}_2, \tag{9.4.3}$$

Proof: Let's encryptions $\mathcal{D}_3$, $\mathcal{E}_3$ for two rational number $x_3 = x_1 + x_2$ and $r_3 = r_{x1} + r_{x2}$ are chosen as in (9.4.3), i.e., $\mathcal{D}_3 = \mathcal{D}(x_3, r_{x3}) = \mathcal{D}_1 \mathcal{D}_2$, $\mathcal{E}_3 = \mathcal{E}(x_3, r_{x3}) = \mathcal{E}_1 + \mathcal{E}_2$. This, his, due definition of $x_3$, $r_3$, implies $\mathcal{D}(x_1 + x_2, r_{x1} + r_{x2}) = \mathcal{D}(x_1, r_{x1}) + \mathcal{D}(x_2, r_{x2})$, and $\mathcal{E}(x_1 + x_2, r_{x1} + r_{x2}) = \mathcal{E}(x_1, r_{x1}) + \mathcal{E}(x_2, r_{x2})$. On the other hand, if $\mathcal{D}$ is any encryption form which is equal to the sum of the two transformations $\mathcal{D}_1 + \mathcal{D}_2$, then due (9.2.1), $\mathcal{D}_i = \alpha x_i + \beta r_{xi}$, i=1,2, we have $\mathcal{D} = \mathcal{D}_1 + \mathcal{D}_2 = (\alpha x_1 + \beta r_{x1}) + (\alpha x_2 + \beta r_{x2}) = \alpha(x_1 + x_1) + \beta(r_{x1} + r_{x2}) = \alpha x_3 + \beta r_{x3} = \mathcal{D}_3$, i.e., there must be only one encryption transformation satisfying (9.4.1)-(9.4.3) conditions, and it is homomorphic by addition. Similar conclusion is true with respect to $\mathcal{E}_3$ transformation in (9.2.2).∎

Summarizing 9.4.2 and 9.4.5 statements we can conclude that

Statement 9.4.4

RLE transformations $\mathcal{D}$ and $\mathcal{E}$ defined by equations (9.2.1)-(9.2.2) deliver two homomorphisms by addition outlined by conditions (9.4.1)-(9.4.2).

9.5.1. Deciphering of the True Data from RLE Encrypted Forms

Let's decipher x from (9.2.1)-(9.2.2) equations. By subtracting the second equation (9.2.2) multiplied by β from the first equation (9.2.1) multiplied by δ, we will get $$x = (\delta \mathcal{D} - \beta \mathcal{E}) / \Delta \tag{9.5.1}$$

Definition 9.5.2

Let's call the algebraic expression in the right side of (9.5.1) as deciphering transformation and denoted it as $\mathcal{D}^{-1}(\mathcal{D}, \mathcal{E})$.

9.6. Congruent Classes in the RLE Encrypted Realm $\mathcal{E}(\mathcal{R})$

Definition 9.6.1

Let's $\mathcal{R}$ be an original RLE domain specified in section 1.1, i.e., $\mathcal{R}$ is a set of rational numbers defined by a given application and expanded by a set of five special symbols {NaN, ±0, ±∞}. Let's also $\mathcal{R}_R$ is a subset of random numbers complemented to $\mathcal{R}$ a according to (9.2.1)-(9.2.2) encryption rules. Here and further on we see no reason to distinguish $\mathcal{R}$ and $\mathcal{R}_R$ and will use the same symbol $\mathcal{R}$ for both of these sets. We call the set of encrypted duplets $$\{\mathcal{D}(x, r_x), \mathcal{E}(x, r_x) | x \in \mathcal{R}, r_x \in \mathcal{R}\} \tag{9.6.1}$$

as an encrypted realm over Descartes product $\mathcal{R} \times \mathcal{R}$ and denoted it as $\mathcal{E}(\mathcal{R})$.

Definition 9.6.2

Let's x,y are two numbers from $\mathcal{R} \setminus \{0, \text{NaN}, \pm 0, \pm \infty\}$, i.e., neither of them zero nor a special symbol. For simplicity, let's use the following short hand notation $$\mathcal{D}_x = \mathcal{D}(x, r_x), \mathcal{E}_x = \mathcal{E}(x, r_x) \tag{9.6.2}$$

$$\mathcal{D}_y = \mathcal{D}(y, r_y), \mathcal{E}_y = \mathcal{E}(y, r_y) \tag{9.6.3}$$

We call two duplets ($\mathcal{D}_x, \mathcal{E}_x$), ($\mathcal{D}_y, \mathcal{E}_y$)∈ $\mathcal{E}(\mathcal{R})$ as μ-related if and only if $$(\mathcal{D}_x, \mathcal{E}_x) \sim_\mu (\mathcal{D}_y, \mathcal{E}_y) \leftrightarrow (\mathcal{D}_x \delta - \mathcal{E}_x \beta)/\Delta = (\mathcal{D}_y \delta - \mathcal{E}_y \beta)/\Delta \tag{9.6.4}$$

i.e., deciphering of any duplet in the pair (($\mathcal{D}_x, \mathcal{E}_x$), ($\mathcal{D}_y, \mathcal{E}_y$)) produces the same true x (as we noted earlier in this paper, the phrase "the same true x", indeed, means the following: the computed results, ($\mathcal{E}_x \beta - \mathcal{D}_x \delta)/\Delta$ and ($\mathcal{E}_y e - \mathcal{D}_y \delta)/\Delta$, literally speaking, could be different, but the difference between them must lie within an acceptable level of tolerance).

Statement 9.6.3

The μ-relationship on $\mathcal{E}(\mathcal{R})$ is symmetric, reflexive and transitive, and, thus, breaks $\mathcal{E}(\mathcal{R})$ into set $\mathcal{E}(\mathcal{R})/\mu$ of congruent classes which, excluding special symbols, are in one-to-one correspondence with the original data set $\mathcal{R}$.∎

The most interesting side of $\mathcal{E}(\mathcal{R})/\mu$ is that, with exception of special symbols, every class $\underline{X} \in \mathcal{E}(\mathcal{R})/\mu$ can be inversed. The meaning of the word "inverse" can be interpreted as follows:

Definition 9.6.4 if multiplication operation $\underline{*}$ is defined in $\mathcal{E}(\mathcal{R})/\mu$ in a commutative, associative and distributive operation, then we say that class $\underline{Y}$ is inverse to a class $\underline{X}$, and denoted such $\underline{Y}$ as $\underline{X}^{-1}$, if and only if $\underline{X} * \underline{Y} = \underline{Y} * \underline{X} = \underline{1}$ where $\underline{1}$ is a unity class, i.e., $\underline{X} * \underline{1} = \underline{1} * \underline{X} = \underline{X}$ for every $\underline{X} \in \mathcal{E}(\mathcal{R})/\mu$.

This definition has one practical application: it enables multiplication and division operations in encrypted realm. We will revisit this topic after presenting the RLE data architecture.∎

Comment 9.6.5

For the all practical purposes, we have no interest in the knowledge of random variables used for encrypting the true data as our main concern is about two causes:

the reliability of the deciphered data (i.e., how close the deciphered numbers are matching the original data), and
the security of the original data and operations Comment 9.6.6

If rational function $\Delta$ does not satisfy the condition (9.1.2), i.e., it is either zero, or any of the special symbols, then encryption using formulas (9.2.1)-(9.2.2) might still be possible to perform, but decryption of x will be impossible.

Assumption 9.6.7

Here and elsewhere in the following text we will assume that $\alpha$, $\delta$, $\gamma$, $\beta$—RLE encryption coefficients, are chosen in such a way that predicates (9.1.1)-(9.1.2) are true.

Comment 9.6.8

The encryption forms for x=0 are $\mathcal{D}$ (0,r)=$\beta$r and $\mathcal{E}$ (0,r)= $\delta$r for any r. Thus, we may have many distinct duplets, ($\mathcal{D}$, $\mathcal{E}$), deciphering to zero: all of these duplets together form the congruent class zero, $\underline{0}$, in $\mathcal{E}$ ($\mathcal{R}$)/$\mu$. To the contrary, the encryption (and decryption) is not specified if x is one of the symbols: NaN, ±0 or ±∞.

The defined in this section congruence $\mathcal{E}$ ($\mathcal{R}$)/$\mu$ is one of the fundamental properties of RLE encryption aiming in establishing arithmetic operations in $\mathcal{E}$ ($\mathcal{R}$) domain. However, before discuss arithmetic operations in $\mathcal{R}$ and $\mathcal{E}$ ($\mathcal{R}$) domains, let's address in the next section the architecture of RLE system as far as RLE data hosting and securing operations are concerned.

9.7. Data Architecture and Security of RLE System

Before we will lay out the data architecture for secure RLE operations, let's consider a sample of encrypted data and try to protect it against an open data attack. Let's pick a pair x,$r_x \in \mathcal{R}$ and $\alpha$- and $\gamma$-encryptions $\mathcal{D}$ and $\mathcal{E}$. The deciphering formula (9.5.1) for getting true x from its $\alpha$- and $\gamma$-encryptions contains two RLE coefficients—$\delta$, $\beta$. Let's assume that intruder initiates an open data attack and have gotten a tip (from insider) regarding the two true data values $x_1$=A, $x_2$=B. Let's also assume that $\alpha$- and $\gamma$-encryptions are kept publicly on cloud, and intruder could get hold on $\mathcal{D}_i$ and $\mathcal{E}_i$=1,2, corresponding to these $x_1$, $x_2$. Then, intruder may use equation (9.5.1) twice separately for $x_1$=A and $x_2$=B, and builds a 2×2 system of linear equations to find $\delta/\Delta$, $\beta/\Delta$. Given the parameters $\delta/\Delta$, $\beta/\Delta$ are found, intruder uses formula (9.5.1) for every other complemented pairs $\mathcal{D}$ and $\mathcal{E}$ to get corresponding true x. Thus, intruder will be able to decipher the entire RLE system.

The intruder's attack which had been described right now is an imminent one if
  a. these $\alpha$- and $\gamma$-encryptions are both available to intruder
  b. the $\alpha$- and $\gamma$-encryptions are collocated in public domain, i.e., an indicator pointing to the $\alpha$-encryptions can be reuse to get the complemented $\gamma$-encryption.

9.7.1. Encryption Forms Dislocation in Current Data Architecture

In order to defend RLE system against open data attacks, theft of data, and the plain text attack (in which case, intruder uses a copy of data he/she have gotten by any other legal or illegal means), the following RLE data architecture and operations are proposed:

1. the $\alpha$-encryptions and $\gamma$-encryptions must be kept in two separate domains—PDL (Public Data Location), or DCL (Data Center Location). The cloud and PDL in this paper are used interchangeably and treated as synonyms.
2. the $\alpha$-encryptions forms will be hosted on public domain, i.e., on PDL.
3. the $\gamma$-encryptions forms will be kept privately at DCL
4. all operations will be executed against RLE encrypted data and results will be retained in encrypted forms
5. all operations will be completed in two steps: the first, initiation step, will begin in PDL, and the result of this step as well as the indicators of data will be sent to DCL
6. on DCL, during second step, RLE engages $\gamma$-encrypted data by employing corresponding indicators from PDL and completes execution by producing resulting duplet ($\mathcal{D}$,$\mathcal{E}$) of encrypted forms
7. per Client request, the result of operation will be deciphered and sent to the Client
8. the $\alpha$-encrypted result, if needed, will be sent to PDL for complex calculations∎

9.7.2. Discussions about Accepted Data Architecture Model

Let's make a few observations with respect to the just introduced RLE data architecture and operational scheme:
1. The development of the effective mathematical algorithms for performing encrypted calculations is a work in progress.
2. In this version of the proposed RLE, the summation of any number of $\mathcal{D}$-forms (i.e., $\alpha$-encryptions) can be completed at PDL and stored there or be sent to DCL for end-user usage.
3. In the follow up releases of RLE, it is visible to build the $\alpha$- and $\gamma$-encryptions in a template parameterized forms both of which will be kept on PDL.
4. For example, the $\gamma$-encryption could be done by using formula $\mathcal{E}$ =$\mathcal{E}$ (x,$r_x$,$r\mathcal{E}_x$)=$\gamma$x+$\delta r_x$+$r_{\oplus x}$ where $r_{\oplus x}$ is a new random variable unique for each x. Using such $\mathcal{E}$, the intruder will not be able to conduct the open data attack against RLE.
5. The handling of $r_{\oplus x}$ especially for multiplication operation is a little bit labor intensive, and outside the scope of this introduction to RLE encryption.
6. The current and the future versions of RLE data architecture assume that all the data is privately pre-computed.
7. The use of indicators for synchronizing DCL and PDL data (mentioned in the assumption "5, 6." in 9.7.1 paragraph) is implementation dependent.
8. For simplicity, in all the numerical examples in this paper, we assumed that $\alpha$- and $\gamma$-encryptions are co-located, i.e., can be referenced to by using the same indicators (for example, using row ID for the encrypted database operations).
9. However, for security purposes (for example, against theft protection), the installation of the current Data Architecture assumes that complemented forms are dislocated, i.e., $\alpha$- and $\gamma$-components have distinct indicators to be refered to.
10. The join between complemented $\alpha$- and $\gamma$-encryptions is conducted by using a special navigating mechanism which is privately installed on DCL.
11. Regardless of the navigation between complemented $\alpha$- and $\gamma$-encryptions, the formulas for RLE arithmetic operations over encrypted forms remain the same.

In view of breaking the encrypting realm $\mathcal{E}(\mathcal{R})$ into PDL and DCL domains, we will combine them by presenting $\mathcal{E}(\mathcal{R})$ as a Descartes product of PDL and DCL. Thus, if $\mathcal{P}$ and $\mathcal{C}$ are notations for corresponding encrypted domains PDL and DCL, then $E(\mathcal{R})=\mathcal{P} \times \mathcal{C}$, i.e., it is a set of all the duplets (p,q) where $p \in \mathcal{P}$, $q \in \mathcal{C}$.

Our next topic has a pure technical nature, though, it is used in almost every elaboration we do for multiplication and division operations in PDL or DCL. This technique—decomposition of encryption forms—exploits addition and one sided homomorphism of RLE operational scheme.

10.1 Decomposition of Encryption Forms into Sum of Encrypted Bi-Products

This section expands the deciphering operation introduced in the previous section by one step further: we will show that by encrypting (9.5.1), the right side encryption can be decomposed into sum of encrypted bi-products. This technique will hide the encryption coefficients, thus, extending domain of RLE secure arithmetic operations on public and private domain.

Statement 10.1.1

Encryption of the deciphering expression in (9.5.1) enables deciphering decomposition on DCL according to the following scheme:

$$\mathcal{D}(\delta\mathcal{D}(x, r_x) - \beta\mathcal{E}(x, r_x))/\Delta, r_\lambda) = \mathcal{D}(\delta/\Delta, r_{\theta 1})\mathcal{D}(x, r_x) - \mathcal{D}(\beta/\Delta, r_{\theta 2})\mathcal{E}(x, r_x) \quad (10.1.1)$$

$$\mathcal{E}((\delta\mathcal{D}(x, r_x) - \beta\mathcal{E}(x, r_x))/\Delta, r_\lambda) = \mathcal{E}(\delta/\Delta, r_{\theta 1})\mathcal{D}(x, r_x) - \mathcal{E}(\beta/\Delta, r_{\theta 1})\mathcal{E}(x, r_x) \quad (10.1.2)$$

Proof: Before we proceed, let's notice that two left most expressions in (10.1.1), (10.1.2) are exactly the $\mathcal{D}$ and $\mathcal{E}$ encryptions of the right most expression in (9.5.1). Therefore, for the proof of the Statement we will use equations (10.1.1)-(10.1.2) instead of (9.5.1).

This proof is broken into three logistical steps:
1. begin by propagating homomorphism $\mathcal{D}$ and $\mathcal{E}$ by addition against the left most expressions in (10.1.1) and (10.1.2)
2. reorganizing the propagated sums by vertically slicing them and forming three deciphering expressions from these vertical slices
3. repeating the same reorganization and vertical slicing against the right most expressions in (10.1.1) and (10.1.2) to match the deciphering result in step 2.

10.2.1 (Step 1)

First, let's notice that homomorphism by addition of $\mathcal{D}$ and $\mathcal{E}$ transformations enables elaboration of (10.1.1), (10.1.2) as follows:

$$\mathcal{D}_\delta = \mathcal{D}(x,r_x) = \mathcal{D}((\delta\mathcal{D}(x,r_x) - \beta\mathcal{E}(x,r_x))/\Delta, r_s) = \mathcal{D}((\delta/\Delta)\mathcal{D}(x,r_x), r_u) - \mathcal{D}((\beta/\Delta)\mathcal{E}(x,r_x), r_t) \quad (10.2.1.1)$$

$$\mathcal{E}_\beta = \mathcal{E}(x,r_x) = \mathcal{E}((\delta\mathcal{D}(x,r_x) - \beta\mathcal{E}(x,r_x))/\Delta, r_s) = \mathcal{E}((\delta/\Delta)\mathcal{D}(x,r_x), r_u) - \mathcal{E}((\beta/\Delta)\mathcal{E}(x,r_x), r_t) \quad (10.2.1.2)$$

The complete proof of elaborations in (10.2.1.1) and (10.2.1.2) will be brought in step 3. Here, let's just mention that both pairs $$(\mathcal{D}((\delta\mathcal{D}(x,r_x) - \beta\mathcal{E}(x,r_x))/\Delta, r_s), \mathcal{E}((\delta\mathcal{D}(x,r_x) - \beta\mathcal{E}(x, r_x))/\Delta, r_s)) \quad (10.2.1.3)$$

$$(\mathcal{D}((\delta/\Delta)\mathcal{D}(x,r_x), r_u) - \mathcal{D}((\beta/\Delta)\mathcal{E}(x,r_x), r_t), \mathcal{E}((\delta/\Delta)\mathcal{D}(x,r_x), r_u) - \mathcal{E}((\beta/\Delta)\mathcal{E}(x,r_x), r_t)) \quad (10.2.1.4)$$

are deciphering into the same expression $(\delta\mathcal{D}(x,r_x) - \beta\mathcal{E}(x, r_x))/\Delta$. This means, that encryption pairs, (10.2.1.3)-(10.2.1.4), belong to the same congruent class $\mathcal{E}(\mathcal{R})/\mu$, and, thus, for security reasons, the deciphering expression based on (10.2.1.3) duplets can be replaced by (10.2.1.4) which does not contain explicit RLE coefficients.

10.2.2 (Step 2)

Let's perform the reconfiguration of (10.2.1.1), (10.2.1.2) and (10.2.1.3), (10.2.1.4) sums, and extract two vertical slices from (10.2.1.1), (10.2.1.2) sums:

$$(\mathcal{D}((\delta/\Delta)\mathcal{D}(x,r_x),r_u), \mathcal{E}((\delta/\Delta)\mathcal{D}(x,r_x),r_u)),$$

$$(\mathcal{D}((\beta/\Delta)\mathcal{E}(x,r_x),r_t), \mathcal{E}((\beta/\Delta)\mathcal{E}(x,r_x),r_t)), \quad (10.2.2.1)$$

and correspondingly, two pairs from (10.2.1.3), (10.2.1.4):

$$(\mathcal{D}(\delta/\Delta,r_{\theta 1})\mathcal{D}(x,r_x), \mathcal{E}(\delta/\Delta,r_{\theta 1})\mathcal{D}(x,r_x)),$$

$$(\mathcal{D}(\beta/\Delta,r_{\theta 2})\mathcal{E}(x,r_x), \mathcal{E}(\beta/\Delta,r_{\theta 2})\mathcal{E}(x,r_x)) \quad (10.2.2.2)$$

Let's notice that presence of the different than $r_s$ random factors $r_u$, $r_t$ in (10.2.2.1), (10.2.2.2) would have no effect on deciphering of the true factors $\delta/\Delta$, $\beta/\Delta$ in the follow up step.

10.2.3 (Step 3)

We will show in this step that deciphering of every duplet in the (10.2.2.1) set produces the same result as the correspondingly positioned duplet in the (10.2.2.2) set. This will prove that the combine algebraic sum of the deciphering results found for (10.2.2.1) and (10.2.2.2) sets will produce the same summary result.

Let's make the following assignments:

$$XX_1 = \mathcal{D}^{-1}(\mathcal{D}((\beta/\Delta)\mathcal{E}(x,r_x),r_t), \mathcal{E}((\beta/\Delta)\mathcal{E}(x,r_x),r_t)),$$

$$XX_2 = \mathcal{D}^{-1}(\mathcal{D}((\beta/\Delta_{\theta 2})\mathcal{E}(x,r_x), \mathcal{E}((\beta/\Delta,r_{\theta 2})\mathcal{E}(x,r_x)), \quad (10.2.2.3)$$

The direct application of (9.5.12) to the right side of equation for $XX_1$ in (10.2.2.3) produces $$XX_1 = (\delta\mathcal{D}(\beta/\Delta\mathcal{E}(x,r_x),r_t) - \beta\mathcal{E}(\beta/\Delta\mathcal{E}(x,r_x),r_t))/\Delta = (\beta/\Delta)\mathcal{E}(x,r_x) \quad (10.2.2.4)$$

Similarly, $$XX_2 = (\delta\mathcal{D}(\beta/\Delta,r_{\theta 2})\mathcal{E}(x,r_x) - \beta\mathcal{E}(\beta/\Delta,r_{\theta 2})\mathcal{E}(x,r_x))/\Delta = (\delta\mathcal{D}(\beta/\Delta,r_{\theta 2}) - \beta\mathcal{E}(\beta/\Delta,r_{\theta 2}))\mathcal{E}(x,r_x) = (\beta/\Delta)\mathcal{E}(x,r_x) \quad (10.2.2.5)$$

Same elaborations lead to $$YY_1 = \mathcal{D}^{-1}(\mathcal{D}((\delta/\Delta)(x,r_x),r_u), \mathcal{E}((\delta/\Delta)(x,r_x),r_u) = (\delta/\Delta)\mathcal{D}(x_1,r_x)$$

$$YY_2 = \mathcal{D}^{-1}(\mathcal{D}(\delta/\Delta,r_u)\mathcal{D}(x,r_x), \mathcal{E}(\delta/\Delta,r_u)\mathcal{D}(x,r_x)) = (\delta/\Delta)\mathcal{D}(x_1,r_x) \quad (10.2.2.6)$$

This leads to $$(YY_1 - XX_1)/\Delta = (YY_2 - XX_2)/\Delta = x \quad (10.2.2.7)$$

This will conclude the proof of the Statement 10.1.1.∎

11.1. RLE Multiplication/Division Operations on DCL

Assumption 11.1.1

Let's agree that here and in the follow up text that when we discuss or perform arithmetic operations on DCL we mean that all the components involved in those operations are presented in encrypted forms—either original encryptions or combinations of them.

Since RLE encryptions come in duplet forms—($\mathcal{D}$, $\mathcal{E}$), therefore, we would also assume that all the results of arithmetic operations on DCL or PDL domains are produced in duplet forms. Those duplets, if needed, can be sent to user's application for private decryption, using formula (9.5.1), or they could be kept on DCL or PDL for further use. The fact, that deciphering operation (9.6.6) effectively eliminates randomization and restores the true data on DCL without dragging around or keeping track of random components embedded in ciphered data has two major advantages:

1. it enables to keep data in encrypted form on PDL and DCL at all the times
2. it enables to perform simple as well as complex arithmetic calculations without intermediate deciphering.

We will revisit and discuss these topics later on upon concluding analysis of arithmetic operations covering, specifically, multiplication and division operations on DCL.

Our imminent goal, thus, is to show that by knowing the encrypted images $\mathcal{D}(x_1,r_1)$, $\mathcal{E}(x_1,r_1)$, $\mathcal{D}(x_2,r_2)$, $\mathcal{E}(x_2, r_2)$ of the individual original entries $x_1$, $x_2$, we will be able to find without intermediate deciphering the encrypted values of the products $\mathcal{D}(x_1*x_2, r_u)$, $\mathcal{E}(x_1*x_2, r_u)$ and ratios $\mathcal{D}(x_1/x_2, r_v)$, $\mathcal{E}(x_1/x_2, r_v)$ for the true unciphered entries $x_1$, $x_2$.

Before we proceed with our plan, let's present an RLE one-sided homomorphism enable encrypting individual components inside complex expressions (such as RLE coefficients, random constants, etc.).

11.2 One Sided Homomorphism of RLE Transformations

Definition 11.2.1. Transformations $$\mathcal{D}^{-1}(\mathcal{D}(x*z,r_y),\mathcal{E}(x*z,r_y)) = x\mathcal{D}^{-1}(\mathcal{D}(z,r_y),\mathcal{E}(z,r_y))$$

$$\mathcal{D}^{-1}(\mathcal{D}(x*z,r_y),\mathcal{E}(x*z,r_y)) = z\mathcal{D}^{-1}(\mathcal{D}(x,r_y),\mathcal{E}(x,r_y)) \quad (11.2.1.1)$$

are called as one-sided homomorphisms.

Statement 11.2.1

The deciphering operation applied against multiplication products behaves like a one sided homomorphism as it enables selective deciphering of individual multipliers follow scheme below:

$$D^{-1}(D(x*z,r_y),E(x*z,r_y)) = xD^{-1}(D(z,r_y),$$
$$E(z,r_y)) = z\mathcal{D}^{-1}(\mathcal{D}(x,r_y),\mathcal{E}(x,r_y)) \quad (11.2.1)$$

Proof: By replacing x with x*z in formula (9.5.1), we will get $$(11.3.2)(\delta\mathcal{D}(x*z,r_y)-\beta\mathcal{E}(x*z,r_y))/\Delta = x*z$$

Since z can be represented as $\mathcal{D}^{-1}(\mathcal{D}(z, r_y),\mathcal{E}(z, r_y))$, therefore, (11.3.2) gives $$\mathcal{D}^{-1}(\mathcal{D}(x*z,r_y),\mathcal{E}(x*z,r_y)) = x*z = x*\mathcal{D}^{-1}(\mathcal{D}(z,r_y),\mathcal{E}(z,r_y))$$

Similarly:

$$\mathcal{D}^{-1}(\mathcal{D}(x*z,r_y),\mathcal{E}(x*z,r_y)) = z\mathcal{D}^{-1}(\mathcal{D}(x,r_y),\mathcal{E}(x,r_y)).\blacksquare$$

Corollary 11.2.4

For ciphering of algebraic expressions we shall use the following decompositions:

$$\mathcal{D}((\delta\mathcal{D}(x,r_y)-\beta\mathcal{E}(x,r_y))/\Delta,r_\lambda) = \mathcal{D}(\delta/\Delta,r_{\theta 1})\mathcal{D}(x,r_y) - \mathcal{D}(\beta/\Delta,r_{\theta 2})\mathcal{E}(x,r_y) \quad (11.2.4.1)$$

$$\mathcal{E}((\delta\mathcal{D}(x,r_y)-\beta\mathcal{E}(x,r_y))/\Delta,r_\lambda) = \mathcal{E}(\delta/\Delta,r_{\theta 1})\mathcal{D}(x,r_y) - \mathcal{E}(\beta/\Delta,r_{\theta 2})\mathcal{E}(x,r_y) \quad (11.2.4.2)$$

Proof: In order to prove that presented in (11.2.4.1), (11.2.4.2) transformations are true, as far as congruent relationship (9.6.4) in $\mathcal{E}(\mathcal{R})$ is concerned, let's show that a duplet compounded from the left sides of equations (11.2.4.1), (11.2.4.2)

$$(\mathcal{D}((\delta\mathcal{D}(x,r_y)-\beta\mathcal{E}(x,r_y))/\Delta,r_y)/\Delta,r_\lambda), \mathcal{E}((\delta\mathcal{D}(x,r_y)-\beta(\mathcal{E}(x,r_y))/\Delta,r_\lambda)) \quad (11.2.4.3)$$

and a duplet compounded from the right sides of the same equations $$(\mathcal{D}(\delta/\Delta,r_{\theta 1})\mathcal{D}(x,r_y)-\mathcal{D}(\beta/\Delta,r_{\theta 2})(\mathcal{E}(x,r_y)),$$

$$(\mathcal{E}(\delta/\Delta,r_{\theta 1})\mathcal{D}(x,r_y)-(\mathcal{E}(\beta/\Delta,r_{\theta 2})(\mathcal{E}(x,r_y)) \quad (11.2.4.4)$$

are μ-related, i.e., belong to the same congruent class in $\mathcal{E}(\mathcal{R})/\mu$. This can be achieved by showing that deciphering of the both duplets produces the same result. Indeed, starting with (11.2.4.3), we will proceed as follows:

$$\mathcal{D}^{-1}(\mathcal{D}((\delta\mathcal{D}(x,r_y)-\beta\mathcal{E}(x,r_y))/\Delta,r_\lambda),\mathcal{E}((\delta\mathcal{D}(x,r_y)-\beta\mathcal{E}(x,r_y))/\Delta,r_\lambda))) = (\delta\mathcal{D}((\delta\mathcal{D}(x,r_y)-\beta(\mathcal{E}(x,r_y))/\Delta,r_\lambda)-\beta\mathcal{E}((\delta\mathcal{D}(x,r_y)-\beta\|(x,r_y))/\Delta,r_\lambda))/\Delta = ((\delta\mathcal{D}(x,r_y)-\beta\mathcal{E}(x,r_y))/\Delta = x$$

Correspondingly, the second duplet upon regrouping inside deciphering scheme will produce $$\mathcal{D}^{-1}(\mathcal{D}(\mathcal{D}(\delta/\Delta,r_{\theta 1})\mathcal{D}(x,r_y)-\mathcal{D}(\beta/\Delta,r_{\theta 2})(\mathcal{E}(x,r_y)),(\mathcal{E}(\delta/\Delta,r_{\theta 1})\mathcal{D}(x,r_y)-(\mathcal{E}(\beta/\Delta,r_{\theta 2})(\mathcal{E}(x,r_y)))) = \mathcal{D}^{-1}(\mathcal{D}(\delta/\Delta,r_{\theta 1})\mathcal{D}(x,r_y),(\mathcal{E}(\delta/\Delta,r_{\theta 1})\mathcal{D}(x,r_y))-\mathcal{D}^{-1}(\mathcal{D}(\beta/\Delta,r_{\theta 2})\mathcal{E}(x,r_y)),(\mathcal{E}(\beta/\Delta,r_{\theta 2})\mathcal{E}(x,r_y)) = \mathcal{D}^{-1}(\mathcal{D}(\delta/\Delta,r_{\theta 1}),\mathcal{E}(\delta/\Delta,r_{\theta 1}))\mathcal{D}(x,r_y)-\mathcal{D}^{-1}(\mathcal{D}(\beta/\Delta,r_{\theta 2}),\mathcal{E}(\beta/\Delta,r_{\theta 2}))(\mathcal{E}(x,r_y)) = (\delta/\Delta)\mathcal{D}(x,r_y)-(\beta/\Delta)(\mathcal{E}(x,r_y)) = x.\blacksquare$$

The next section has a pure technical purpose, as it studies the deciphering of the duplets ($\mathcal{D}(1,r_\varsigma)\mathcal{D}(x,r_x)$, $\mathcal{E}(1,r_\varsigma)\mathcal{D}(x,r_x)$) on the DCL sites.

11.3.1. Deciphering Duplets on DCL

The encryption forms for z=1 are defined as follows: $\mathcal{D}(1,r) = \alpha+\beta r$, $\mathcal{E}(1,r) = \gamma+\delta r$ for some r. Let's The products $\mathcal{D}(1,r_\varsigma)\mathcal{D}(x,r_x)$, $\mathcal{E}(1,r_\varsigma)\mathcal{D}(x,r_x)$, $\mathcal{D}(1,r_\varsigma)\mathcal{E}(x,r_x)$, $\mathcal{E}(1,r_\varsigma)\mathcal{E}(x,r_x)$, for any $x \in \mathcal{R}$ are just four rational numbers with no visible distinction from any other number in the rational domain $\mathcal{R}$. However, all these four numbers upon division by $\mathcal{D}(1,r_\varsigma)$ and $\mathcal{E}(1,r_\varsigma)$ produce $\mathcal{D}(x,r_x)$, $\mathcal{E}(x,r_x)$ correspondingly. This fact is summarized in the

Statement 11.3.2

Let's $\mathcal{D}(1, r_\varsigma)$, $\mathcal{E}(1, r_\varsigma)$, $\mathcal{D}(x, r_x)$, $\mathcal{E}(x, r_x)$, are defined as in the beginning of this section. Then $$\mathcal{D}^{-1}(\mathcal{D}(1, r_\varsigma)\mathcal{D}(x, r_x), \mathcal{E}(1, r_\varsigma)\mathcal{D}(x, r_x)) = \mathcal{D}(x, r_x) \quad (11.3.2.1)$$

$$\mathcal{D}^{-1}(\mathcal{D}(1, r_\varsigma)\mathcal{E}(x, r_x), \mathcal{E}(1, r_\varsigma)\mathcal{E}(x, r_x)) = \mathcal{E}(x, r_x) \quad (11.3.2.2)$$

Proof: Let's prove this statement for $\mathcal{D}(x, r_x)$ as the case for $\mathcal{E}(x, r_x)$ can be proved by replacing $\mathcal{D}(x, r_x)$ (for the prove purpose only) by $\mathcal{E}(x, r_x)$. From definition of $\mathcal{D}(1, r_\varsigma)$ we have $$\mathcal{D}(1, r_\varsigma)\mathcal{D}(x, r_x) = \alpha \mathcal{D}(x, r_x) + \beta \mathcal{D}(x, r_x) r_\varsigma = \mathcal{D}(\mathcal{D}(x, r_x), \mathcal{D}(x, r_x) r_\varsigma) \quad (11.3.2.3)$$

$$\mathcal{E}(1, r_\varsigma)\mathcal{D}(x, r_x) = \gamma \mathcal{D}(x, r_x) + \delta \mathcal{D}(x, r_x) r_\varsigma = \mathcal{E}(\mathcal{D}(x, r_x), \mathcal{D}(x, r_x) r_\varsigma) \quad (11.3.2.4)$$

Then, due deciphering formula (9.5.1), we have $$\mathcal{D}^{-1}(\mathcal{D}(1, r_\varsigma)(\mathcal{D}(x, r_x), \mathcal{E}(1, r_\varsigma)\mathcal{D}(x, r_x)) = \mathcal{D}^{-1}(\mathcal{D}(\mathcal{D}(x, r_x), \mathcal{D}(x, r_x) r_\varsigma), \mathcal{E}(\mathcal{D}(x, r_x), \mathcal{D}(x, r_x) r_\varsigma))) =$$

$$(\delta \mathcal{D}(\mathcal{D}(x, r_x), \mathcal{D}(x, r_x) r_\varsigma) - \beta(\mathcal{E}(\mathcal{D}(x, r_x), \mathcal{D}(x, r_x) r_\varsigma)))/\Delta = (\alpha \delta \mathcal{D}(x, r_x) - \beta \gamma \mathcal{D}(x, r_x))/\Delta = (\alpha \delta - \beta \gamma)\mathcal{D}(x, r_x)/\Delta = \mathcal{D}(x, r_x) \quad (11.3.2.6)$$

The following observation is following immediately from statement 11.3.2:

Corollary 11.3.3

Equality $\mathcal{D}^{-1}(\mathcal{D}(1, r_\varsigma)x, \mathcal{E}(1, r_\varsigma)x) = x$ is true. ∎

11.4.1. Ciphering Complex Multiplication Expressions

In this section, we will elaborate the encryption algorithm for ciphering product $x_1 * x_2$ on DCL.

For the sake of arguments, the following equations define the original (due (9.2.1)-(9.2.2)) encryption forms for $x_1 * x_2$:

$$Z_1 = \alpha x_1 + \beta r_1,$$

$$W_1 = \gamma x_1 + \delta r_1 \quad (11.4.1.1)$$

$$Z_2 = \alpha x_2 + \beta r_2,$$

$$W_2 = \gamma x_2 + \delta r_2 \quad (11.4.1.2)$$

Subsequent application of (9.5.1) against (11.4.1.1)-(11.4.1.2) will produce $$x_1 = \mathcal{D}^{-1}(Z_1, W_1) = (\delta Z_1 - \beta W_1)/\Delta$$

$$x_2 = \mathcal{D}^{-1}(Z_2, W_2) = (\delta Z_2 - \beta W_2)/\Delta \quad (11.4.1.3)$$

Further, by encrypting equations (11.4.1.3) and using Corollary 11.3.3, we will get $$\mathcal{D}(\mathcal{D}^{-1}(Z_1, W_1), r_{\lambda 1}) = \mathcal{D}(\delta/\Delta, r_{\theta 1})Z_1 - \mathcal{D}(\beta/\Delta, r_{\theta 2})W_1 \quad (11.4.1.4)$$

$$\mathcal{E}(\mathcal{D}^{-1}(Z_1, W_1), r_{\lambda 1}) = \mathcal{E}(\delta/\Delta, r_{\theta 1})Z_1 - \mathcal{E}(\beta/\Delta, r_{\theta 2})W_1 \quad (11.4.1.5)$$

$$\mathcal{D}(\mathcal{D}^{-1}(Z_2, W_2)) = \mathcal{D}(\delta/\Delta, r_{\theta 1})Z_2 - \mathcal{D}(\beta/\Delta, r_{\theta 2})W_2 \quad (11.4.1.6)$$

$$\mathcal{E}(\mathcal{D}^{-1}(Z_2, W_2)) = \mathcal{E}(\delta/\Delta, r_{\theta 1})Z_2 - \mathcal{E}(\beta/\Delta, r_{\theta 2})W_2 \quad (11.4.1.7)$$

therefore, on DCL side, the deciphering formula the product $x_1 * x_2$, is derived as follows:

$$x_1 * x_2 = \mathcal{D}^{-1}(Z_1, W_1)\mathcal{D}^{-1}(Z_2, W_2) = ((\delta Z_1 - \beta W_1)(\delta Z_2 - \beta W_2))/\Delta^2 = (\delta Z_1 - \beta W_1)(\delta Z_2 - \beta W_2)/\Delta^2 = (\delta^2 Z_1 Z_2 - \delta\beta(Z_1 W_2 + W_1 Z_2) + \beta^2 W_1 W_2)/\Delta^2 \quad (11.4.1.8)$$

In view of an explicit usage of RLE coefficients, we will convert (11.4.1.8) expressions into encrypted forms, so we could use it either on DCL and PDL sites. Let's encrypt the both sides of (11.4.1.8). This produces the following encryptions:

$$\mathcal{D}(x_1 * x_2, r_{\lambda J}) = (\mathcal{D}(\delta^2, r_{\omega 1})Z_1 Z_2 - \mathcal{D}(\delta\beta, r_{\omega 2})(Z_1 W_2 + W_1 Z_2) + \mathcal{D}(\beta^2, r_{\omega 3})W_1 W_2)/\Delta^2 \quad (11.4.1.9)$$

$$\mathcal{E}(x_1 * x_2, r_{\lambda J}) = (\mathcal{E}(\delta^2, r_{\omega 1})Z_1 Z_2 - \mathcal{E}(\delta\beta, r_{\omega 2})(Z_1 W_2 + W_1 Z_2) + \mathcal{E}(\beta^2, r_{\omega 3})W_1 W_2)/\Delta^2 \quad (11.4.1.10)$$

Let's notice that duplet constructed from the left sides of (11.4.1.9)-(11.4.1.10), due (9.5.1), deciphers to $x_1 * x_2$ by definition of the encryption forms $\mathcal{D}(x_1 * x_2, r_{\lambda J})$, $\mathcal{E}(x_1 * x_2, r_{\lambda J})$. If, in addition, we will show that duplet constructed from the right most sides of (11.4.1.9)-(11.4.1.10), is also deciphers to $x_1 * x_2$, then this would mean that we found a decomposition of encryption forms (occupying the right most sides of (11.4.1.9)-(11.4.1.10)) which contain bi-product of the encryption forms (for example, $\mathcal{D}((\delta/\Delta)^2, r_{\omega 1})*(Z_1 Z_2)$, $\mathcal{D}((\delta\beta/\Delta^2), r_{\omega 2})*(Z_1 W_2 + W_1 Z_2)$, $\mathcal{D}((\beta/\Delta)^2, r_{\omega 3})*(W_1 W_2)$) which is more secure than the right most side of (11.4.1.8) containing explicit RLE coefficients. The transition from (11.4.1.9)-(11.4.1.10) to (11.4.1.8) is done next.

11.5.1. Deciphering of the Multiplication Results on DCL

We begin this section by computing the following three deciphering expressions:

$$\mathcal{D}^{-1}(\mathcal{D}(\delta^2/\Delta^2, r_{\omega 1})Z_1 Z_2, \mathcal{E}(\delta^2/\Delta^2, r_{\omega 1})Z_1 Z_2) \quad (11.5.1.1)$$

$$\mathcal{D}^{-1}(\mathcal{D}(-\delta\beta/\Delta^2, r_{\omega 2})(Z_1 W_2 + W_1 Z_2), \mathcal{E}(-\delta\beta/\Delta^2, r_{\omega 2})(Z_1 W_2 + W_1 Z_2)) \quad (11.5.1.2)$$

$$\mathcal{D}^{-1}(\mathcal{D}(\beta^2/\Delta^2, r_{\omega 3})W_1 W_2, \mathcal{E}(\beta^2/\Delta^2, r_{\omega 3})W_1 W_2) \quad (11.5.1.3)$$

An immediate application of (9.5.1) and one-sided homomorphism towards (11.5.1.1), (11.5.1.2), (11.5.1.3) will produce correspondingly, $(\delta^2/\Delta^2)Z_1 Z_2$, $(-\delta\beta/\Delta^2)(Z_1 W_2 + W_1 Z_2)$, $(\beta^2/\Delta^2)W_1 W_2$. By adding together these three components, we will get, due (11.4.1.8):

$$(\delta^2/\Delta^2)Z_1 Z_2 + (-\delta\beta/\Delta^2)(Z_1 W_2 + W_1 Z_2) + (\beta^2/\Delta^2)W_1 W_2 = x_1 * x_2 \quad (11.5.1.4)$$

Thus, combining together all the elaborations and formulas derived in this and previous sections, we proved the following fundamental result:

Statement 11.5.1.6

Equations (11.4.1.9) and (11.4.1.10) enable encrypted computing on DCL of the encrypted forms $\mathcal{D}(x_1 * x_2, r_{\varsigma k})$ and $\mathcal{E}(x_1 * x_2, r_{\varsigma k})$ for $x_1 * x_2$ product that. ∎

Notice 11.5.1.7. Statement 11.5.1.6 allows series of encrypted arithmetic operations to be performed on DCL. We will explore this feature later upon concluding with division operation. Next section, though, will bring the numeric example of multiplication.

11.5.2. Numeric Example for Multiplication

Initial Data
X_one=84.703624017929
X_two=88.44839268288277
R_one=92.53495650085871
R_two=90.33341213109753
Big_new_Ro=1.494631
RLE Coefficients
Big_Alph=0.0872//α

Big_Beta=1.2395//β
Big_Delt=4.0051//δ
Big_Gama=−0.7034//γ
Determinant
Δ=αδ−γβ=1.22110902
Encryption Forms of X1 and X2
C_one=Big_Alph*X_one+
 Big_Beta*R_one=122.08323459717779
D_one=Big_Gama*X_one+
 Big_Delt*R_one=119.68096417844278
C_two=Big_Alph*X_two+
 Big_Beta*R_two=311.03122514737794
D_two=Big_Gama*X_two+
 Big_Delt*R_two=299.57974951311894
Source Code
double  D_δ2_rω1=Big_Alph*Big_Delt*Big_Delt+
 Big_Beta*Big_new_Ro;
double  D_δβ_rω2=Big_Alph*Big_Delt*Big_Beta+Big_
 Beta*(Big_new_Ro*11.78);
double  D_β2_rω3=Big_Alph*Big_Beta*Big_Beta+Big_
 Beta*(Big_new_Ro*2.9176);
double  E_δ2_rω1=Big_Gama*Big_Delt*Big_Delt+
 Big_Delt*Big_new_Ro;
double  E_δβ_rω2=Big_Gama*Big_Delt*Big_Beta+Big_
 Delt*(Big_new_Ro*11.78);
double  E_β2_rω3=Big_Gama*Big_Beta*Big_Beta+Big_
 Delt*(Big_new_Ro*2.9176);
double D_x1Mx2=(D_δ2_rω1*C_one*C_two−D_δβ_rω2*
 (C_one*D_two+C_two*D_one)+
 D_β2_rω3*D_one*D_two)/(Det2*Det2);
double E_x1Mx2=(E_δ2_rω1*C_one*C_two−E_δβ_rω2*
 (C_one*D_two+C_two*D_one)+
 E_β2_rω3*D_one*D_two)/(Det2*Det2);
double  calculated_x1Mx2=(Big_Delt*D_x1Mx2−
 Big_Beta*E_x1Mx2)/Det2;
log("\n Multiplication Test \n calculated x1*x2="+
 calculated_x1Mx2);
log("true x1*x2="+X_one*X_two);
Multiplication Test
calculated x1*x2=7491.899398801246
true x1*x2=7491.899398801044

Discussions of the test results: The scale factors, 1.0 (for E_β2_rω1), 11.78 (for D_δβ_rω2), and 2.9176 (for E_β2_rω3) are chosen at random. The calculated product x1*x2 resulted in loss of the three significant digits, due disparity in ranges of RLE coefficients α, β, γ, δ. The precision of the result can be significantly improved by using BigDecimal data types. The match of 13 decimal digits between calculated and the true results cannot happened at random, and, thus, we claim it as a proof of concept for getting reliable encrypted multiplication results directly from encrypted data bypassing three steps:
 1. decrypting individual multipliers
 2. multiplying individual multipliers
 3. encrypting result of multiplication
Using BigDecimal arithmetic, the result can be improved.∎

11.6. Series of Multiplication

In order to get the product x1*x2*x3, we will compute the encrypted forms $\mathcal{D}(x_1*x_2, r_k)$, $\mathcal{E}(x_1*x_2, r_k)$, as shown in formulas (11.4.1.9)-(11.4.1.10), and reuse the same formulas in which Z1 is replaced by $\mathcal{D}(x_1*x_2, r_k)$, and $W_1$ by $E(x_1*x_2, r_k)$. In addition, $Z_2$, $W_2$ are replaced by $Z_3$, $W_3$ correspondingly. The follow up example demonstrates these operations. Before we proceed with calculations, let's discuss the precision and location of such operations.

We will begin with the location of operations first. Since each equation either (11.4.1.9) or (11.4.1.10) uses both, α-, γ-encryptions, Z and W, therefore, neither of them, $\mathcal{D}(x_1*x_2, r_k)$, $\mathcal{E}(x_1*x_2, r_k)$, can be calculated on cloud. Otherwise, due open data attack, intruder and insider working together could decipher RLE code. Thus, multiplication over encrypted forms is done at DCL. The fact that data is encrypted still enables secure operations so as a regular user (without top security clearance) cannot see nor decipher intermediate results. Only the purposely deciphered data which is destined by the Application scheme will reach the end-user.

In case of the theft of data, the intruder will face a difficult problem:
1. due the fact that γ-encryptions in DCL and α-encryptions in PDL are dislocated against each other, the navigation between complemented forms is almost impossible: the indicators which are good for picking up DCL data will not work for PDL
2. a full scan of one list against the other to create a $10^{12}$ of 2×2 deciphering equations for extracting δ/Δ, β/Δ could produce a lot of the false positive hypothesis about reality of δ/Δ, β/Δ found
3. Application of the each pair of δ/Δ, β/Δ for deciphering RLE code will turn into an another large computational task because the navigation mechanism is kept privately and only downloaded into memory cash as needed by Application Server.

This concludes the époque about the location of the data components.

Now, let's address the next problem—errors accumulation during multiplication. Since accumulation of errors during series of multiplications could exceed some reliability level, therefore, number of multipliers must be limited. If $\epsilon(\prod x_i, p_1, \ldots, p_n, q_1, \ldots, q_n)$ is an error accumulation function (where $\prod x_i$ is a product, $p_i$—precisions, $q_i$—range of the multipliers) then differential $$d(\mathcal{E}(x_1*x_2 \ldots *x_n, p_1, \ldots, p_n, q_1, \ldots, q_n)) = \frac{\partial E}{\partial \Pi}\Sigma\frac{\partial \Pi}{\partial x}d(x_i) + \Sigma\frac{\partial E}{\partial p}d(p_i) + \Sigma\frac{\partial E}{\partial q}d(q_i)$$

can be used for the analysis of the error gross estimate. In case when we use a standard procedure for error estimates as $$d(\Pi x_i) = \Sigma\frac{\partial \Pi}{\partial x}d(x_i),$$

then derivations $d(x_1)$, $d(x_2)$, . . . , being amplified by the magnitude of $$\frac{\partial \Pi}{\partial x}$$

hide some intrinsic properties of irregularities in precision, range and relative importance of these factors. There is another factor—the position of calculations error accumulation, which is also very important. If this position overlaps with rounding errors accumulation location (occurred due limited precision of the selected data types), then this might create a spike in loss of significant digits. Thus, $\epsilon(x_1{*}x_2 \ldots {*}x_n, p_1, \ldots, p_n, q_1, \ldots, q_n)$ may suite better for the errors estimation using quality and homogeneity of data as a few independent factors in addition to computer precision limitations.

11.6.1. Numeric Example for Calculating x1*x2*x3

By using the $\alpha$-encryption, D_x1Mx2, instead of C_one, and E_x1Mx2 instead of D_one In the previous example, and replacing C_two by C_three, and D_two by D_three, we will be able to compute the $\alpha$-,$\gamma$-encryptions for x1*x2*x3, i.e., to find $\mathcal{D}$ (x1*x2*x3, $r_{123}$), $\mathcal{E}$ (x1*x2*x3,$r_{123}$). The following calculations prove the concept:

Source code:
log("/n Preparation for getting x1*x2*x3");
double    D_x1Mx2Mx3=(D_δ2_rω1*D_x1Mx2*C_tee−
   D_δβ_rω2*(D_x1Mx2*D_tee+C_tee*E_x1Mx2)+
   D_β2_rω3*E_x1Mx2*D_tee)/(Det2*Det2);
double    E_x1Mx2Mx3=(E_δ2_rω1*D_x1Mx2*C_tee  −
   E_δβ_rω2*(D_x1Mx2*D_tee+C_tee*E_x1Mx2)+
   E_β2_rω3*E_x1Mx2*D_tee)/(Det2*Det2);
double calculated_x1Mx2Mx3=(Big_Delt*D_x1Mx2Mx3−
   Big_Beta*E_x1Mx2Mx3)/Det2;
log("2187 /n Multiplication Test \n calculated x1*x2*x3="+
   calculated_x1Mx2Mx3);
log("true x1*x2*x3="+X_one*X_two*X_tee);
Test Data
X1 and X2 are the same as in the previous example.
X3=X_tee=81.80437453214896
R3=R_tee=93.07353341213109
Encrypted Input Data
C_tee=122.49798612353987
D_tee=315.2276116230126
D_x1Mx2 is $\alpha$-encryption for x1*x2 and it is calculated in the previous example
E_x1Mx2 is $\gamma$-encryption for x1*x2 and it is calculated in the previous example
D_x1Mx2=−723525.7354738119
E_x1Mx2=−2345253.2061952176
Test Results
calculated_x1Mx2Mx3=612870.1443765203
true x1*x2*x3=612870.1443767023
Conclusion
Four significant digits lost, and twelve out of sixteen digits are matching to the true product of three numbers.■

11.7.1. Division Preliminary Observations

For analysis of division operation, we will use the same initial data as we did for multiplication in section 11.4.1. In addition, we assume that both, $x_1$ and $x_2$, are nonzero numbers. Since ratio $x_1/x_2$ is, in fact, a product of $x_1$ and $1/x_2$, therefore, we compute ratio $x_1/x_2$ in DCL by multiplying encrypted forms of $x_1$ and $1/x_2$. To aim this goal, we develop an inverse encrypting technique for getting $\mathcal{D}$ (1/$x_2$,r), $\mathcal{E}$ (1/$x_2$)—the encrypted inverse forms—by using $\alpha$-, $\gamma$-encryptions $\mathcal{D}$ ($x_2$, $r_2$), $\mathcal{E}$ ($x_2$, $r_2$). To begin explaining inverse encrypting let's assume that $$Z_{/x2}= \mathcal{D}(1/x_2, r_{/x})=\alpha(1/x_2)+\beta r_{/x}, \quad (11.7.1.5)$$

$$W_{/x2}= \mathcal{E}(1/x_2, r_{/x}, r_{\psi 2})=\gamma(1/x_2)+\delta r_{/x} \quad (11.7.1.6)$$

12.1. Inverse Encrypting for Division Operations

The encryptions $Z_{/x2}, W_{/x2}$, (in (11.7.1.5)-(11.7.1.6)) are based on inverted $x_2$ which in a sense a true data by itself.

Our goal, though, is to maintain all the arithmetic operations in encrypted forms for enhanced security purposes. Let's begin with an equality that ties three factors—$x_2, 1/x_2$, their encrypted forms and complemented condition:

$$1=x_2{*}(1/x_2)= \mathcal{D}^{-1}(Z_2, W_2){*} \mathcal{D}^{-1}(Z_{/x2}, W_{/x2}) \quad (12.1.1)$$

$$x_2 \neq 0, \neq \text{NaN}, \neq \pm 0, \neq \pm \infty \quad (12.1.2)$$

Let's notice that condition (12.1.2) is essential for (12.1.1) taking place, therefore, here and below we will assume that (12.1.2) is always true for the purpose of this paper. Under these assumptions, let's build a 2×2 system of algebraic equations for defining $Z_{/x2}, W_{/x2}$ as follows:

$$x_2= \mathcal{D}^{-1}(Z_2, W_2)=(\delta Z_{x2}-\beta W_{x2})/\Delta,$$

$$1/x_2= \mathcal{D}^{-1}(Z_{/x2}, W_{/x2})=(\delta Z_{/x2}-\beta W_{/x2})/\Delta,$$

$$x_2{*}(1/x_2)=(1/\Delta^2)(\delta^2 Z_{x2}-\beta\omega_{x2})Z_{/x2}+(-\beta\delta Z_{x2}+\beta^2 W_{x2})W_{/x2} \quad (12.1.3)$$

Since $x_2{*}(1/x_2)=1$, therefore, by encrypting the both sides of (12.1.3) and applying addition homomorphism, first, and one sided homomorphisms, second, we will get $$\mathcal{D}(1, r_\varsigma)=(\mathcal{D}(\delta^2/\Delta^2, \omega_1)Z_{x2}- \mathcal{D}(\beta\delta/\Delta^2, \omega_2)W_{x2})Z_{/x2}+(- \mathcal{D}(\beta\delta/\Delta^2, \omega_2)Z_{x2}+ \mathcal{D}(\beta^2/\Delta^2, \omega_3)W_{x2})W_{/x2} \quad (12.1.4)$$

$$\mathcal{E}(1, r_\varsigma)=(\mathcal{E}(\delta^2/\Delta^2, \omega_1))Z_{x2}- \mathcal{E}(\beta\delta/\Delta^2, \omega_2)W_{x2})Z_{/x2}+(- \mathcal{E}(\epsilon\delta/\Delta^2, \omega_2)Z_{x2}+ \mathcal{E}(\beta^2/\Delta^2, \omega_3)W_{x2})W_{/x2} \quad (12.1.5)$$

To simplify these two expressions, let's declare the following privately created public keys $$Q_1= \mathcal{D}(\delta^2/\Delta^2, \omega_1), Q_2= \mathcal{D}(\beta\delta/\Delta^2 \omega_2), Q_3= \mathcal{D}(\beta^2/\Delta^2, \omega_3)$$

$$P_1= \mathcal{E}(\delta^2/\Delta^2, \omega_1) P_2= \mathcal{E}(\beta\delta/\Delta^2, \omega_2), P_3= \mathcal{E}(\beta^2/\Delta^2, \omega_3) \quad (12.1.6)$$

Upon using these keys, we will get a 2×2 system of linear algebraic equations $$\mathcal{D}(1, r_\varsigma)=(Q_1{*}Z_{x2}-Q_2{*}W_{x2})Z_{/x2}+(-Q_2{*}Z_{x2}+Q_3{*}W_{x2})W_{/x2}$$

$$\mathcal{E}(1, r_\varsigma)=(P_1 Z_{x2}-P_2 W_{x2})Z_{/x2}+(-P_2 Z_{x2}+P_3 W_{x2})W_{/x2}$$

with unknown variables $Z_{/x2}, W_{/x2}$ (which correspond to the encryption forms $\mathcal{D}$ (1/$x_2$,r), $\mathcal{E}$ (1/$x_2$,r)) and random $r_{/\psi 2}$. Before we compute $Z_{/x2}, W_{/x2}$ using system (12.1.6), let's simplify this system it by using grouping parameters as follows:

$$Q_{1Z}=(Q_1{*}Z_{x2}-Q_2{*}W_{x2})$$

$$Q_{1W}=(-Q_2{*}Z_{x2}+Q_3{*}W_{x2})$$

$$P_{1Z}=(P_1 Z_{x2}-P_2 W_{x2})$$

$$P_{1W}=(-P_2 Z_{x2}+P_4 W_{x2}) \quad (12.1.7)$$

Under these assignments, the (12.1.6) system can be rewritten as $$Q_{1Z}Z_{/x2}+Q_{1W}W_{/x2}= \mathcal{D}(1, r_\varsigma)(\equiv D_{1\lambda})$$

$$P_{1Z}Z_{/x2}+P_{1W}W_{/x2}= \mathcal{E}(1, r_\varsigma)(\equiv E_{1\xi}) \quad (12.1.8)$$

The determinant of the 2×2 system is calculated via formula:

$$\Delta_{\lambda\xi}=Q_{1Z}P_{1W}-E_{1\xi}Q_{1W} \quad (12.1.9)$$

The pivotal determinants for defining $Z_{/x2}, W_{/x2}$ variables are presented below as $$\Delta_{Z/x2}=D_{1\lambda}P_{1W}-E_{1\xi}Q_{1W} \quad (12.1.10)$$

$$\Delta_{W/x2}=Q_{1Z}E_{1\xi}-P_{1Z}D_{1\lambda} \quad (12.1.11)$$

Hence $$Z_{/x2}=\Delta_{Z/x2}/\Delta_{\lambda\xi} W_{/x2}=\Delta_{W/x2}/\Delta_{\lambda\xi} \quad (12.1.12)$$

$$1/x_2=(\delta Z_{/x2}-\beta W_{/x2})/\Delta \quad (12.1.14)$$

12.2.1. Numeric Illustration for Inverse Encryption

The initial data used for this example is the same as in numerical example in section 11.5.2. Java source code for inverse encrypting and computing 1/x2 from inverse forms
double rς =21.672; //random for $\mathcal{D}$(1,r ς ), $\mathcal{E}$(1,r ς )
double D_1_rς =Big_Alph+Big_Beta*rς ;
double E_1_rς =Big_Gama+Big_Delt*rς ;
double eq_1_1=D_δ2_rω1*C_two−D_δβ_rω2*D_two; // $\mathcal{D}$ ($\delta^2/\Delta^2,\omega_1)Z_{x2}$
double eq_1_2=−D_δβ_rω2*C_two+D_β2_rω3*D_two;
double eq_2_1=E_δ2_rω1*C_two−E_δβ_rω2*D_two;
double eq_2_2=−E_δβ_rω2*C_two+E_β2_rω3*D_two;
//New Determinant
double Det_noKsi=eq_1_1*eq_2_2−eq_2_1*eq_1_2; //$\Delta_{\lambda\xi}=Q_{1Z}P_{1W}-P_{1Z}Q_{1W}$
double piv_Zx2=D_1_rς *eq_2_2−E_1_rς *eq_1_2;
double piv_Wx2=eq_1_1*E_1_rς −eq_2_1*D_1_rς ;
//encrypted inverse 1/x2
double D_Zx2=piv_Zx2/Det_noKsi; //$Z_{/x2}=\Delta_{Z/x2}/\Delta_{\lambda\xi}$, $W_{/x2}=\Delta_{W/x2}/\Delta_{\lambda\xi}$
double E_Wx2=piv_Wx2/Det_noKsi;
//computed 1/x2
double calc_1Dx2=(Big_Delt*D_Zx2−Big_Beta*E_Wx2)*Det2;
//Test result print
log("\n Calc 1/x2="+calc_1Dx2);
log("true 1/x2="+1/X_two);
Numeric Results
Calc 1/x2=0.011306027952201649
true 1/x2=0.011306027952201871
Conclusion
The inverse operation performed on DCL over $\mathcal{D}$ ($x_2$, $r_\lambda$), $\mathcal{E}$ ($x_2,r_\lambda$)
In the next section we will utilize the result from this section to compute ratio x1/x2.

12.3. Numeric Example for a Ratio $x_1/x_2$ Computed on DCL

In this section, we will put together multiplication and inverse encrypting operations to compute the encrypted ratio on DCL, i.e., will find ($\Psi(x_1/x_2,r_\lambda)$ and $\mathcal{E}$ ($x_1/x_2,r_\lambda$) by manipulating encrypted duplets ($\mathcal{D}$ ($x_1,r_\lambda$), $\mathcal{E}$ ($x_1,r_\lambda$)) and ($\mathcal{D}$ ($x_2,r_{\lambda 2}$), $\mathcal{E}$ ($x_2,r_{\lambda 2}$)) only.

According to our plan we will derive first the inverted duplet ($\mathcal{D}$ ($1/x_2,r_{\lambda 3}$), $\mathcal{E}$ ($1/x_2,r_{\lambda 3}$)) by using original duplet and ($\mathcal{D}$ ($x_2,r_{\lambda 2}$), $\mathcal{E}$ ($x_2,r_{\lambda 2}$)). This was done in the previous section 12.1. Thus, the only thing that is left to produce the encrypted ratio $x_1/x_2$ on DCL is to compute the encrypted product $x_1 * x_2$ with $x_2$ being replaced by $1/x_2$.

In the numeric example that follows we will use data and results from the previous example derived in 12.2.1 and will combine this data with multiplication example in section 11.5.2.
Java Source Code
//FINAL DIVISION
double D_x1Dx2=(D_δ2_rω1*D_Zx2*C_one−D_δβ_rω2*(D_Zx2*D_one+C_one*E_Wx2)+D_β2_rω3*E_Wx2*D_one)/(Det2*Det2);
double E_x1Dx2=(E_δ2_rω1*D_Zx2*C_one−E_δβ_rω2*(D_Zx2*D_one+C_one*E_Wx2)+E_β2_rω3*E_Wx2*D_one)/(Det2*Det2);
double calc_x1Dx2=(Big_Delt*D_x1Dx2−Big_Beta*E_x1Dx2)*Det2;
log("2247/n Division Test \n calc x1/x2="+calc_x1Dx2);
log("true x1/x2="+X_one/X_two);
Test Results
calc x1/x2=0.9576615407995217
true x1/x2=0.957661540799503

12.4. Series of Divisions

The RLE scheme does not impose additional restriction on the number of divisions in a single expression except limitations caused by calculation errors accumulation. Though the division can be successfully performed in encrypted form on DCL, it is more practical to compute all the necessary products separately for nominator and denominator and complete the calculation of the ratio as a final step—whenever it is possible—by dividing the products in the nominator into product of denominator using RLE division rules.

As we discussed earlier, the loss of significance is predicated by the logic of algebraic expressions as well as by the precision degradation caused by computer imperfections. There is no shortcuts on reliability control as the anonymously obtained results during calculations could significance skew the output beyond limitations. Thus, in order to maintain the reliable computing, we must constantly monitor the precision of intermediate results.∎

The remaining chapters of this paper are dedicated to RLE encrypted databases and statistical calculations using encrypted databases.

13.1. RLE Database Operations On PDL and DCL

We will describe in this chapter the application of RLE scheme for database encryption and operations. First, we briefly address the database properties which RLE database application scheme is predicated upon. Then, we will begin exploring statistical operations over encrypted databases. As we shall see, RLE scheme takes advantage of the database structural data organization to utilize an embedded in RLE addition homomorphism.

13.1.1. Database Model for RLE Application

Here and elsewhere in the following text, we assume that there is a true table T with two columns D and E. Column D contains the original data (such as salary, or age, or stock price information, or else). Column E, on the other hand, contains the true (unencrypted) random information. Upon encrypting columns D and E (as well as other columns in table T), using formulas (9.1.1) and (9.1.2), the encrypted table $\mathcal{T}$ —which is an image of T—is formed. Table $\mathcal{T}$ is broken into two parts, one which installed on PDL domain, and the other which installed on DCL domain. This type of data organization will retain the RLE security at all times. Thus, two encrypted columns, $\mathcal{D}$ and $\mathcal{E}$ will end up in different domains—PDL and DCL correspondingly.

From operational stand point, if a request from the Client must be satisfied by using both α- and γ-encryptions, then data from the $\mathcal{D}$ column must be brought in to DCL side and combined with the column $\mathcal{E}$ data. There are, though, exceptions to this scheme. Indeed, if statistical calculations required a large summation to be performed over $\mathcal{D}$ data, then such summation can be successfully completed in PDL domain and the result will be brought in to DCL where it will be combined with a complemented sum computed for $\mathcal{E}$ data.

As RLE transformations, (9.1.1) and (9.1.2), are defined for the complemented pairs only, therefore, we assume that there is in place a navigation mechanism which brings together α- and γ-encryptions at all times whenever RLE needs complemented pairs to work on.

13.1.2. RLE Statistical Calculations in DCL Computing

Here and elsewhere in the remaining part of this paper, we will use the database model described in section 13.1.1. Our goal with respect to this model is to show that

Statement 13.1.2

The statistical variances $^eV(\mathcal{D})$, $^eV(\mathcal{E})$ and covariance $^eK(\mathcal{D},\mathcal{E})$ can be calculated on DCL by using encrypted data in the $\mathcal{D}$ and $\mathcal{E}$ database columns. Upon calculations, the statistical results can be either deciphered on DCL in cash and transmitted to the end-user, or be kept in the encrypted forms on DCL or PDL.

Comment 13.1.2

The procedure of keeping data in two domains DCL and PDL will not endanger the RLE security and, subsequently, will create a safe environment for the original and encrypted data.

14.1. RLE Methods for Statistical Calculations in DCL Computing

The formula for calculation variance statistics using encrypted data in $\mathcal{D}$ is presented below as:

$$^eV(\mathcal{D}) = \Sigma(\mathcal{E}(x,r_x) - \mathcal{H}_{\mathcal{D}(x,r)})^2, \quad (14.1.1)$$

where $x \in D$, $r_x \in E$, $(x,r_x)$ is a pair of a mutually complementary entries from table T, $\mathcal{D}(x,r_x)$ is an RLE encrypted image of x, and $\mathcal{H}_{\mathcal{D}(x,r)}$ is average for encrypted elements in $\mathcal{D}$.

Note 14.1.1

For simplicity and the proof of concept, we use the entire set of elements from columns D (original, true, data) and E (random data complemented to the original data in D).

Note 14.1.2

According to RLE scheme columns D and E never get stored or transmitted to public domain.

Note 14.1.3

As other arrangements in PL/SQL operations are likely arising, the computing of the statistical results for the partial sets of elements are straight forward and require similar operations. Those partial scale database applications will be elaborated in a different research on RLE privacy preserving in database operations.

Note 14.1.4

In the follow up text, some of the RLE operations over encrypted data are targeting data either in columns $\mathcal{D}$ or $\mathcal{E}$ but not in both. Therefore we don't need to transfer data from column $\mathcal{D}$ to DCL but rather complete statistical calculations in public domain (PDL) and only the final result of operations shall be brought in to DCL.

Since RLE is a summation homomorphism, therefore, average $$\mathcal{H}_{\mathcal{D}(x,r)} = (1/N^{\mathcal{D}})\Sigma(\mathcal{D}(x,r_x)) = (\alpha A_{Lx} + \beta A_{Lr}) \quad (14.1.2)$$

where $A_{Lx}$ and $A_{Lr}$ are corresponding averages for data set in columns D and E. Subsequently, formula (14.1.2) can be rewritten as $$^eV(\mathcal{D}) = \Sigma((x - A_{Lx})\alpha + (r_x - A_{Lr})\beta)^2 \quad (14.1.3)$$

If we denote the true variance of the elements in D as $'V(x)$, then $'V(x) = \Sigma(x - A_{Lx})^2$. Subsequently, the true variance $'V(r_x)$ of the column E is $\Sigma(r_x - A_{Lr})^2$, and the true covariance $'K(x,r_x)$ between true columns D and E is $\Sigma(x - A_{Lx})(r_x - A_{Lr})$. Under these notation, the right part of (14.1.3), after opening braces, can be rewritten as $$^eV(\mathcal{D}) = \Sigma(x - A_{Lx})^2\alpha^2 + \Sigma(r_x - A_{Lr})^2\beta^2 + \quad (14.1.4)$$
$$2\alpha\beta\Sigma(x - A_{Lx})(r_x - A_{Lr})$$
$$= {}'V(x)\alpha^2 + {}'V(r_x)\beta^2 + 2\alpha\beta {}'K(x, r_x)$$

The same operations over encrypted variance $^eV(\epsilon)$ over column $\mathcal{E}$ will produce $$^eV(\mathcal{E}) = \Sigma((x - A_{Lx})\gamma + \Sigma(r_x - A_{Lr})\delta)^2 = \quad (14.1.5)$$
$$= \Sigma(x - A_{Lx})^2\gamma^2 + \Sigma(r_x - A_{Lr})^2\delta^2 +$$
$$2\gamma\delta\Sigma(x - A_{Lx})(r_x - A_{Lr}) =$$
$$= {}'V(x)\gamma^2 + {}'V(r_x)\delta^2 + 2\gamma\delta {}'K(x, r_x)$$

The relations (14.1.4) and (14.1.5) define two algebraic equations for defining three unknown variances $'V(x)$, $'V(r_x)$ and $'K(x,r_x)$. The third equation will come from exploring the covariance $^eK(\mathcal{D},\mathcal{E})$ between two encrypted columns $\mathcal{D}$ and $\mathcal{E}$. It is calculated as $$^eK(\mathcal{D},\mathcal{E}) = \Sigma(\mathcal{D}(x,r_x) - \mathcal{H}_{\mathcal{D}(x,rx)})(\mathcal{E}(y,r_y) - \mathcal{H}_{\mathcal{E}(y,ry)}) \quad (14.1.6)$$

Let's notice that $\mathcal{D}$ and $\mathcal{E}$ columns are physically residing in two different domains—PDL and DCL correspondingly. However, in order to compute (in this version of RLE) we will bring column $\mathcal{D}$ to DCL where (14.1.6) will be safely computed. Applying averaging formulas to $\mathcal{D}$ $(x,r_x)$, $\mathcal{E}(y,r_y)$, $\mathcal{H}_{\mathcal{E}(y,ry)}$, and $\mathcal{H}_{\mathcal{E}(y,ry)}$, we get $$^eK(\mathcal{D},\mathcal{E}) = \Sigma((x-A_{Lx})\alpha + \Sigma(r_x-A_{Lx})\beta)((x-A_{Lx})\gamma + \Sigma(r_x-A_{Lr})\delta) \quad (14.1.7)$$

After a few algebraic transformations, (14.1.7) will turned into $$^eK(\mathcal{D},\epsilon) = \alpha\gamma({}'V(x)) + \beta\delta({}'V(r_x)) + (\alpha\delta + \beta\gamma)({}'K(x,r_x)) \quad (14.1.8)$$

This is the last equation together with two previously derived in (14.4.4) and (14.4.5) enable to devise the unknown true variances $'V(x)$ and $'V(r_x)$, and covariance $'K(x,r_x)$ as a unique solution to the 3×3 system of the linear algebraic equations. We will assume here that determinant of this system is neither zero nor any of the exceptional symbols such as NaN, ±0 or ±∞. In the following text we will elaborate in greater details the conditions under which the determinant of the described 3×3 system is nonzero nor an exceptional symbol NaN, ±0 or ±∞.

In conclusion of this paragraph let's notice that equations (14.1.4), (14.1.5), (14.1.8) connect together the encrypted parameters, $^eV(\mathcal{D})$, $^eV(\mathcal{E})$ and $^eK(\mathcal{D},\epsilon)$, with true statistical parameters $^tV(x)$, $^tV(r_x)$ and $^tK(x,r_x)$ using RLE encryption coefficients. Since the statistical variables $^eV(\mathcal{D})$, $^eV(\epsilon)$ and $^eK(\mathcal{D},\epsilon)$ are from the encrypted data, they can be sent over network to any central service locations which holds the RLE private keys. Thus, there is no need to use the original deciphered data for statistical computing anywhere in network, yet, the statistical parameters can be obtained readily by transmitting a few encrypted results.

In the next section, we will display formulas for arithmetic operations to derive the true statistics from their RLE encrypted images.

15.1. Getting $^tV(x)$, $^tV(r)$ and $^tK(x,r)$ as Equation Solutions

Let's $M=M(\alpha,\delta,\beta,\gamma)$ is the matrix for equations (14.1.4), (14.1.5) and (14.1.8). Here is how it looks in the table form:

$$M = \begin{matrix} \alpha^2 & \beta^2 & 2\alpha\beta \\ \gamma^2 & \delta^2 & 2\gamma\delta \\ \gamma\alpha & \beta\delta & \alpha\delta+\beta\gamma \end{matrix} \quad (15.1.1)$$

Let's $\Delta$ be this matrix's determinant. The mathematical formula for computing determinant $\Delta$ using matrix M in (15.1.1) is presented below:

$$\Delta = \alpha^2*\delta^2*(\alpha\delta+\beta\gamma)+\alpha\gamma*\beta^2*2\gamma\delta+\gamma^2*2\alpha\beta*\beta\delta - \alpha\gamma*\delta^2*2\alpha\beta - \gamma^2*\beta^2*(\alpha\delta+\beta\gamma) - \alpha^2*\beta\delta*2\gamma\delta = \alpha^3*\delta^3 - 3\alpha^2*\delta^2*\beta\gamma+3\alpha\delta*\gamma^2*\beta^2 - \gamma^3*\beta^3 = (\alpha\delta-\gamma\beta)^3 \quad (15.1.2)$$

Thus, in order to find the unique solution for the true variances $^tV(x)$, $^tV(r_x)$ and covariance $^tK(x,r_x)$, the RLE encryption coefficients in (9.1.1)-(9.1.2) must satisfy the following condition:

$$\alpha\delta \neq \gamma\beta, \text{ nor } \alpha\delta-\gamma\beta \text{ can be any of symbols NaN, } \pm 0 \text{ or } \pm\infty \quad (15.1.3)$$

Here and further on in this paper we will assume that coefficients $\alpha,\delta,\beta,\gamma$ in (9.1.1)-(9.1.2), indeed, satisfy condition (15.1.3).

Thus, what is left for us to elaborate is to find the explicit expressions for variances and covariance $^tV(x)$, $^tV(r_x)$, $^tK(x, r_x)$. Let's notice that the completion of this task, will, simultaneously prove the statement 13.1.2.

In order to find the solution to the 3×3 system of linear algebraic equations specified in (14.1.4), (14.1.5), (14.1.8), let's create three pivotal matrices $T_1$, $T_2$, and $T_3$ as:

Matrix $T_1$

| $^eV(\mathcal{D})$ | $\beta^2$ | $2\alpha\beta$ |
| $^eV(\mathcal{E})$ | $\delta^2$ | $2\gamma\delta$ |
| $^eK(\mathcal{D},\mathcal{E})$ | $\beta\delta$ | $\alpha\delta+\beta\gamma$ |

Matrix $T_2$

| $\alpha^2$ | $-^eV(\mathcal{D})$ | $2\alpha\beta$ |
| $\gamma^2$ | $-^eV(\mathcal{E})$ | $2\gamma\delta$ |
| $\alpha\gamma$ | $-^eK(\mathcal{D},\mathcal{E})$ | $\alpha\delta+\beta\gamma$ |

Matrix $T_3$

| $\alpha^2$ | $\beta^2$ | $^eV(\mathcal{D})$ |
| $\gamma^2$ | $\delta^2$ | $^eV(\mathcal{E})$ |
| $\alpha\gamma$ | $\beta\delta$ | $-^eK(\mathcal{D},\mathcal{E})$ |

These three matrices are obtained from matrix M by replacing its $1^{st}$, $2^{nd}$, $3^{rd}$ columns correspondingly with a column constructed by using the right sides of the equations (14.1.4), (14.1.5), (14.1.8). The determinants $\Delta_i=\Delta(T_i)$, i=1, 2, 3, are defined as follows:

$$\Delta_1 = {}^eV(\mathcal{D})*\delta^2*(\alpha\delta+\beta\gamma)+{}^eV(\mathcal{E})*\beta\delta*2\alpha \\ \beta + {}^eK(z\mathcal{D},\mathcal{E})*\beta^2*2\gamma\delta - {}^eK(\mathcal{D},\mathcal{E})*\delta^2*2\alpha \\ \beta - {}^eV(\mathcal{E})*\beta^2*(\alpha\delta+\beta\gamma) - {}^eV(\mathcal{D})*\beta\delta*2\gamma \\ \delta = ({}^eV(\mathcal{D})*\delta^2+{}^eV(\mathcal{E})*\beta^2-{}^eK(\mathcal{D},\mathcal{E})*2\delta\beta) \\ (\alpha\delta-\beta\gamma) \quad (15.1.4)$$

$$\Delta_2 = \alpha^2*(-{}^eV(\mathcal{E}))*(\alpha\delta+\beta\gamma)+\alpha\gamma*(-{}^eV(\mathcal{D}))*2\gamma \\ \delta+\gamma^2*2\alpha\beta*(-{}^eK(\mathcal{D},\mathcal{E}))+\alpha\gamma*{}^eV(\mathcal{E})*2\alpha\beta+\gamma^{2*e} \\ V(\mathcal{D})*(\alpha\delta+\beta\gamma)+\alpha^{2*e}K(\mathcal{D},\mathcal{E})*2\gamma\delta \quad (15.1.5)$$

$$\Delta_3 = \alpha^2*\delta^{2*e}K(\mathcal{D},\mathcal{E})+\alpha\gamma*\beta^{2*e}V(\mathcal{E})+\gamma^{2*e}V(\mathcal{D})*\beta\delta - \\ \alpha\gamma*\delta^{2*e}V(\mathcal{D})-\gamma^2*\beta^{2*e}K(\mathcal{D},\mathcal{E})-\alpha^2*\beta\delta^{*e}V(\mathcal{E}) \quad (15.1.6)$$

Correspondingly, the solution to the system $$^tV(x) = \Delta_1/\Delta \quad (15.1.7)$$

$$^tV(r_x) = \Delta_2/\Delta \quad (15.1.8)$$

$$^tK(x,r_x) = \Delta_3/\Delta \quad (15.1.9)$$

Subsequently, $$^tV(x) = ({}^eV(\mathcal{D})*\delta^2+{}^eV(\mathcal{L})*\beta^2-{}^eK(\mathcal{D},\mathcal{L})*2\delta\beta)/(\alpha\delta-\beta\gamma)^2 \quad (15.1.10)$$

$$^tV(r_x) = ({}^eV(\mathcal{D})*\gamma^2+{}^eV(\mathcal{L})*\alpha^2-{}^eK(\mathcal{D},\mathcal{L})*2\alpha\gamma)/(\alpha\delta-\beta\gamma)^2 \quad (15.1.11)$$

$$^tK(x,r_x) = ({}^eV(\mathcal{D})*\delta\gamma+{}^eV(\mathcal{L})*\alpha\beta-{}^eK(\mathcal{D},\mathcal{L})*(\alpha\delta+\beta\gamma))/(\alpha\delta-\beta\gamma)^2 \quad (15.1.15)$$

The numeric example will be presented next.

16.1. Numerical Examples

Our goal in this section is to create a numeric example in which a true original table T containing a few numeric columns was converted into an encrypted table $\mathcal{T}$ by using RLE transformation. Then, two mutually complemented columns (that were transformed by RLE application) and their encrypted images were statistically analyzed and statistical parameters—variance and covariance—were calculated for the original (the true) and encrypted columns. Next, the encrypted statistics was plugged into the system of algebraic equations (14.1.4)-(14.1.5), (14.1.8) to derived the deciphered true variances and covariance $^tV(x)$, $^tV(r_x)$, $^tK(x, r_x)$. As the last step in this example, the derived statistics and the original statistics were compared to see what kind of significance the derived statistics did have. For comparing and analysis, the true and deciphered results were placed into tables for concluding discussions.

16.1.1. Database Model for this Example

We assumed that the two samples, $L$ and $R$, each containing 300275 rational (double precision) numbers were generated by using the Gaussian random number generator with mean 100.0f and variance 5.0f for set L and mean 2.13f and variance 0.05f for set $R$. Both sets were loaded as is (i.e., unsorted and unorganized) into two columns L and R of the true database table T. As entities of the same table, those columns entries are in one-to-one correspondence (based on row IDs) to each other. This enables to apply the RLE transformation against columns L and R by using formulas (9.1.1)-(91.2). The RLE coefficients $\alpha$, $\beta$, $\gamma$, $\delta$ are set as follows:

$$\alpha=0.0872, \beta=1.2395, \gamma=-0.7034, \delta=4.0051 \quad (16.1.1)$$

Upon transformation, two encrypted columns $\mathcal{L}$ and $\mathcal{R}$ are created inside encrypted database table $\mathcal{E}(T)=\mathcal{T}$. Since the whole purpose of this exercise is to see how the precision and significance of the deciphered results are degrading, we maintain two independent RLE encryptions—one for double precision data, and another—for 38 digits BigDecimal data and operations.

The deciphered results for the true variances ${}^tV_1(x)$ and ${}^tV_2(x)$ were obtained from data in both tables, $\mathcal{T}_1$ and $\mathcal{T}_2$, and displayed in tables 16.2.1-16.2.2. We used double precision for columns $\mathcal{L}_1$, $\mathcal{R}_1$ in table $\mathcal{T}_1$, and BigDecimal, 38 digits scale, for columns $\mathcal{L}_2$, $\mathcal{R}_2$ in table $\mathcal{T}_2$. Independently, for comparing purposes, we calculated the true variance and covariance from original (true) data and placed them in the same tables.

16.2. Original and Deciphered Covariance

TABLE 16.2.1.

| | | double precision based calculations | | |
|---|---|---|---|---|
| | | Calculated from RLE data | Derived from the True Data | |
| | Formulas | | Formulas used | |
| ${}^tV(x)$ | (15.1.7) | 7480247.599716847 | $\Sigma(x - A_{Lx})^2$ | 7480247.599716848 |
| ${}^tV(r_x)$ | (15.1.8) | 543754.6258459229 | $\Sigma(r - A_{Lr})^2$ | 543754.6258459229 |
| ${}^tK(x, r_x)$ | (15.1.9) | 1971149.2987314523 | $\Sigma(x - A_{Lx})(r - A_{Lr})$ | 1971149.2987314519 |

Shown in the first row of table 16.2.1 the deciphered and true variances ${}^tV(x)$ are different from the BigDecimal version displayed in tables—16.2.2 and 16.2.3. The difference begins in the $8^{th}$ decimal position. Since BigDecimal calculation was performed with E-38 precision, and V(x) in tables 16.2.2 and 16.2.3 match each other with up to 25 decimals after the decimal point, therefore, the calculated results in tables 16.2.2 and 16.2.3 are trusty up to up to $25^{th}$ decimal digits after the decimal point. Subsequently, the last three digits in the calculated results of ${}^tV(x)$ and ${}^tK(x,r_x)$, which are displayed in table 16.2.1, are dirty. Thus, calculation of variance and covariance using double precision arithmetic for a sample size of 300K resulted in a loss of three significant digits.

TABLE 16.2.2

| | | Deciphering statistics using BigDecimal with E-38 precision |
|---|---|---|
| Formula | | Calculated from true data |
| ${}^tV(x)$ | (15.1.7) | 7480247.599716790401086531430824⁀9 6964202814052 |
| ${}^tV(r_x)$ | (15.1.8) | 543754.625845928916683933106306012⁀8 8321727673 |
| ${}^tK(x, r_x)$ | (15.1.9) | 1971149.29873149235433753516700469⁀4 55336447883 |

TABLE 16.2.3.

| Deciphered Variance (${}^tV(x)$), E-38 BigDecimal precision |
|---|
| From encrypted data   7480247.5997167904010865314308249⁀ 1897348414135 |

17.1. Deciphering Covariance in General Case

In this section we will compute the covariance statistics between two meaningful columns (for example, we can use salary and age, or moving average of one for the industry pertinent statistics and the stock price fluctuation of a particular company, etc.). Thus, for those scenarios where RLE is used for a meaningful covariate analysis, we must redefine the covariance formula. Let's L and D are two columns containing original data (say, salary an age), and $L_R$, $D_R$, are two random columns that are complementary to L and D in RLE encryption scheme. The encrypted covariance ${}^eK(\mathcal{D}(x,r_x), \mathcal{L}(y,r_y))$ is calculated via formula (14.1.6):

$${}^eK(\mathcal{D}(x,r_x), \mathcal{L}(y,r_y))=\Sigma(\mathcal{D}(x,r_x)-\mathcal{\tilde{A}}_{\mathcal{D}(x,rx)})$$
$$(\mathcal{D}(y,r_y)-\mathcal{\tilde{A}}_{\mathcal{E}(y,ry)}), x \in D, y \in L, L \neq D \quad (17.1.1)$$

where x and y are true entries (for example, age and salary) belonging to the different columns, and L and D, and neither of them are not randomly created. Each of two columns has independently crafted complementing columns of random entries—$R_L$ for L, and $R_D$ for D. It is assumed that encryption of D is done differently than the encryption of L, This means that there are two set of the encryption coefficients: $\alpha, \beta, \gamma, \delta$ (used for encrypting (D, $D_R$), and $\omega, \theta, \nu, \pi$ (for encrypting (L, $L_R$)). Given that these assumptions are in place, the encrypted covariance can be described as $${}^eK(\mathcal{D}(x,r_x), \mathcal{L}(y,r_y))=\Sigma(\mathcal{D}(x,r_x)-\mathcal{\tilde{A}}_{\mathcal{D}(x,rx)})$$
$$(\mathcal{E}(y,r_y)-\mathcal{\tilde{A}}_{\mathcal{E}(y,ry)})=\Sigma((x-A_{Lx})\alpha+(r_x-k_{rx})\beta)\Sigma$$
$$((y-A_{Ly})\omega+(r_y-A_{Lry})\theta)=\alpha\omega\Sigma(x-A_{Lx})(y-A_{Ly})+$$
$$\beta\omega\Sigma(r_x-A_{Lrx})(y-A_{Ly})+\alpha\theta\Sigma(x-A_{Lx})(r_y-A_{Lry})+\beta\theta\Sigma$$
$$(r_x-A_{Lrx})(r_y-A_{Lry})=\alpha\omega{}^tK(x,y)+\beta\omega{}^tK(r_x,y)+\alpha\theta{}^tK$$
$$(x,r_y)+\beta\theta{}^tK(r_x,r_y) \quad (17.1.2)$$

This would be the first equation for deriving the decipher covariance ${}^tK(x,y)$. This first equation has four unknown variables ${}^tK(x,y)$, ${}^tK(r_x,y)$, ${}^tK(x,r_y)$, ${}^tK(r_x,r_y)$. The other three equations are derived by using ${}^eK(\mathcal{D}(x,r_x), \mathcal{L}_R(y,r_y))$, ${}^eK(\mathcal{D}_R(x,r_x), \mathcal{L}(y,r_y))$, ${}^eK(\mathcal{D}_R(x,r_x), \mathcal{L}_R(y,r_y))$ which produce:

$${}^eK(\mathcal{D}_R(x,r_x), \mathcal{L}(y,r_y))=\gamma\omega{}^tK(x,y)+\delta\omega{}^tK(r_x,y)+$$
$$\gamma\theta{}^tK(x,r_y)+\delta\theta{}^tK(x,r_y)+\delta\theta{}^tK(r_x,r_y) \quad (17.1.3)$$

$${}^eK(\mathcal{D}(x,r_x), \mathcal{L}_R(y,r_y))=\alpha\nu{}^tK(x,y)+$$
$$\beta\nu{}^tK(r_x,y)+$$
$$\pi\pi^t K(x,r_y)+\beta\pi^tK(r_x,r_y) \quad (17.1.4)$$

$${}^eK(\mathcal{D}_R(x,r_x), \mathcal{L}_R(y,r_y))=\gamma\nu{}^tK(x,y)+\delta\nu{}^tK(r_x,y)+\gamma\pi{}^tK(x,r_y)+\delta\pi{}^tK(r_x,r_y) \quad (17.1.5)$$

The matrix of this system of equations looks as follows $$\begin{matrix} \alpha\omega & \beta\omega & \alpha\theta & \beta\theta \\ \gamma\omega & \delta\omega & \gamma\theta & \delta\theta \\ \alpha\nu & \beta\nu & \alpha\pi & \beta\pi \\ \gamma\nu & \delta\nu & \gamma\pi & \delta\pi \end{matrix} \quad (17.1.6)$$

and its determinant $\Delta$ is computed by decomposing it into a sum of smaller determinants:

$$\Delta = \alpha\omega^* \begin{vmatrix} \delta\omega & \gamma\theta & \delta\theta \\ \beta v & \alpha\pi & \beta\pi \\ \delta v & \gamma\pi & \delta\pi \end{vmatrix} - \beta\omega^* \begin{vmatrix} \gamma\omega & \gamma\theta & \delta\theta \\ \alpha v & \alpha\pi & \beta\pi \\ \gamma v & \gamma\pi & \delta\pi \end{vmatrix} + \quad (17.1.7)$$

$$\alpha\theta^* \begin{vmatrix} \gamma\omega & \delta\omega & \delta\theta \\ \alpha v & \beta v & \beta\pi \\ \gamma v & \delta v & \delta\pi \end{vmatrix} - \beta\theta^* \begin{vmatrix} \gamma\omega & \delta\omega & \gamma\theta \\ \alpha v & \beta v & \alpha\pi \\ \gamma v & \delta v & \gamma\pi \end{vmatrix}$$

By breaking each of the 3×3 determinant in (17.1.7) into 2×2 determinants like in bellow equation:

$$\alpha\omega^* \begin{vmatrix} \delta\omega & \gamma\theta & \delta\theta \\ \beta v & \alpha\pi & \beta\pi \\ \delta v & \gamma\pi & \delta\pi \end{vmatrix} = \alpha\omega^* \frac{|\alpha\pi\,\beta\pi|\ |\beta v\,\beta\pi|\ |\beta v\,\alpha\pi|}{(\delta\omega^*|\gamma\pi\,\delta\pi|-\gamma\theta^*|\delta v\,\delta\pi|+\delta\theta^*|\delta v\,\gamma\pi|)} \quad (17.1.8)$$

leads to $$\Delta = \alpha\omega\delta\omega\pi^2\Delta_x - \alpha\omega\gamma\theta^*0 + \alpha\omega\delta v\pi(-\Delta_x) - \beta c\Delta_x - \beta\omega(-\gamma\theta) v\pi\Delta_x - \beta\omega\delta\theta^*0 + \alpha\theta\gamma\omega^*0 - \alpha\theta\delta\omega v\pi\Delta_x + \alpha\theta\delta\theta v^2\Delta_x - \beta\theta\gamma\omega v\pi(-\Delta_x) + \beta\theta\delta\omega^*0 - \beta\theta\gamma\theta v^2\Delta_x, \quad (17.1.9)$$

where $\Delta_x = \alpha\delta - \gamma\beta$. If we denote $\Delta_y = \omega\pi - v\theta$, then (17.1.10) will be transformed into $$\Delta = \Delta_x^2(\omega^2\pi^2 - 2\omega\theta v\pi + \theta^2 v^2) = \Delta_x^2 \Delta_y^2 \quad (17.1.10)$$

In order to find the true covariance $'K(x,y)$ from the system (17.1.2)-(17.1.5) we must replace the first column in matrix (17.1.6) with the encrypted covariance values found in the left side of equations (17.1.2)-(17.1.5). After this replacement, the matrix for defining $'K(x,y)$ will look as follows:

$$\begin{vmatrix} K_1 & \beta\omega & \alpha\theta & \beta\theta \\ K_2 & \delta\omega & \gamma\theta & \delta\theta \\ K_3 & \beta v & \alpha\pi & \beta\pi \\ K_4 & \delta v & \gamma\pi & \delta\pi \end{vmatrix} \quad (17.1.11)$$

where $K_1 = {^e}K(\mathcal{D}(x,r_x), \mathcal{L}(y,r_y))$, $K_2 = {^e}K(\mathcal{D}_R(x,r_x), \mathcal{L}(y,r_y))$, $K_3 = {^e}K(\mathcal{D}(x,r_x), \mathcal{L}_R(y,r_y))$ and $K_4 = {^e}K(\mathcal{D}_R(x,r_x), \mathcal{L}_R(y,r_y))$.

Finally, to get the deciphered covariance $'K(x,y)$, we will use formula:

$$'K(x,y) = \Delta_{K,1}/\Delta \quad (17.1.12)$$

where $\Delta$—the determinant of the matrix in (17.1.6) found in (17.1.10), and $\Delta_{K,1}$ is determinant of the matrix (17.1.11) which contains RLE encrypted covariance and privately held coefficients for encrypting columns D and L.

In order to get $\Delta_{K,1}$ we will decompose the original $\Delta_{K,1}$ into sum of 3×3 determinants using the same method we used to compute $\Delta$, though, instead of the first row, we will use the first column. The formula for computing $\Delta_{K,1}$ will look as follows:

$$\Delta_{K,1} = K_1^* \begin{vmatrix} \delta\omega & \gamma\theta & \delta\theta \\ \beta v & \alpha\pi & \beta\pi \\ \delta v & \gamma\pi & \delta\pi \end{vmatrix} - K_2^* \begin{vmatrix} \beta\omega & \alpha\theta & \beta\theta \\ \beta v & \alpha\pi & \beta\pi \\ \delta v & \gamma\pi & \delta\pi \end{vmatrix} + \quad (17.1.13)$$

$$K_3^* \begin{vmatrix} \beta\omega & \alpha\theta & \beta\theta \\ \delta\omega & \gamma\theta & \delta\theta \\ \delta v & \gamma\pi\nu & \delta\pi \end{vmatrix} - K_4^* \begin{vmatrix} \beta\omega & \alpha\theta & \beta\theta \\ \delta\omega & \gamma\theta & \delta\theta \\ \beta v & \alpha\pi & \beta\pi \end{vmatrix}$$

After computing four determinants in (17.1.13), we will get the following expression for $\Delta_{K,1}$ $$\Delta_{K,1} = K_1(\delta\omega\pi^2\Delta_x - \beta v^*0 + \delta v\theta\pi(-\Delta_x)) - K_2(\beta\omega\pi^2\Delta_x - \beta v\theta\pi\Delta_x + \delta v^*0) + K_3(\beta\omega^*0 - \delta\omega\theta\pi\Delta_x + \delta v\theta^2\Delta_x) - K_4(\beta\omega\theta\pi(-\Delta_x) - \delta\omega^*0 + \beta v\theta^2\Delta_x) = \Delta_x(\delta\pi K_1(\omega\pi - v\theta) - K_2\beta\pi(\omega\pi - v\theta) - K_3\delta\theta(\omega\pi - v\theta) + K_4\beta\theta(\omega\pi - v\theta)) = \Delta_x\Delta_y(K_1\delta\pi - K_2\beta\pi - K_3\delta\theta + K_4\beta\theta) \quad (17.1.14)$$

where $\Delta_y = \omega\pi - v\theta$ is determinant for RLE encryption coefficients for columns L and $L_R$ (an origin for y and $r_y$ elements). Hence, finally, $$'K(x,y) = (K_1\delta\pi - K_2\beta\pi - K_3\delta\theta + K_4\beta\theta)/\Delta_x\Delta_y \quad (17.1.15)$$

∎

18.1. Covariance (Test Data Description)

In order to illustrate the usefulness of the previous section work aimed to decipher the encrypted covariance ${^e}K(\mathcal{D}(x, r_x), \mathcal{L}(y,r_y))$, ${^e}K(\mathcal{D}_R(x,r_x), \mathcal{L}(y,r_y))$, ${^e}K(\mathcal{D}(x,r_x), \mathcal{L}_R(y,r_y))$ and ${^e}K(\mathcal{D}_R(x,r_x), \mathcal{L}_R(y,r_y))$ into a true covariance $'K(x,y)$, we generated four samples of data using Gaussian random number generator. Each sample used different mean and standard deviation as routine to generate these samples shows:

| Data generator | Mean | Std | Column name | |
|---|---|---|---|---|
| TryBigDec1( ).RandSig1( | 100.0f, | 5.00f, | D_RandSig); | |
| TryBigDec1( ).RandSig1( | 10.0f, | 100.00f, | DR_RandSig); | |
| TryBigDec1( ).RandSig1( | 50.0f, | 5.00f, | L_RandSig); | |
| TryBigDec1( ).RandSig1( | 5.0f, | 500.00f, | LR_RandSig); | (18.1.1) |

The four produced samples—D_RandSig, DR_RandSig, L_RandSig, LR_RandSig—were used to create a new true table T. For that, created four samples were entered "as is" into four distinct columns, D, DR, L, and LR of table T. Next, table T was encrypted into table $\mathfrak{I}$ using formulas (9.1.1) and (9.1.2). We apply two different sets of coefficients, $\alpha$, $\beta$, $\gamma$, $\delta$, for encrypting columns D and DR, and $\omega$, $\theta$, $v$, $\pi$ for encrypting columns L and LR. Below these two sets of coefficients are displayed as double data types:

double D_alpha=0.0872;

double D_beta=1.2395;

double DR_gama=−0.7034;

double DR_delta=4.0051;

double L_omega=1.3061;

double L_teta=−0.4358;

double LR_nu=2.0431;

double LR_pi=3.5491; (18.1.2)

The test results—to check out the usefulness of formula (17.1.15)—are presented in the next section. All calculations were produced on PC laptop HP Pavilion dv6000™ configured as AMD Turion™ 64×2 Mobile Technology TL-56 1.80 GHz, 32-bit Operating System Vista with 2 GB of RAM. We used the Java software with Java.math.BigDecimal library included in NetBeans IDE 6.9 installed separately as a standalone package.

18.1.2. Covariance (Calculated Test Results)

Start testing 2012-08-02 05:38:36.196
Original & randomized data have gotten at 2012-08-02 05:38:47.178
Calculated Averages
$Average_D$=100.00440841199002863
$Average_{DR}$=9.8519537643445042871
$Average_L$=50.004275104969137196
$Average_{LR}$=5.3233661795703605443
RLE Coefficients:
BigD_alpha=0.08720000000000000000000000000000 0000000000000
BigD_ beta=1.23950000000000000000000000000000 000000000000
BigDR_gama=− 0.70340000000000000000000000000000000000 000000000
BigDR_delta=4.00510000000000000000000000000000 0000000000000000
BigLomega=1.30610000000000000000000000000000000 0000000000000
BigL_teta=− 0.43580000000000000000000000000000000000000 000000
BigLR_nu=2.04310000000000000000000000000000 0000000000000000
BigLR_pi=3.54910000000000000000000000000000000 000000000000
Covariances for the Four Encrypted Columns Using Double Precision Data:
eK1_x_y=5.092055538395554E7
eK2_rx_y=1.6304338104120618E8
eK3_x_ry=−4.186093778943358E8
eK4_rx_ry=−1.3400629592589872E9
BigDecimal Encryption and Covariances Calculated at 2012-08-02 05:43:07.23
Covariances for the Four Encrypted Columns Using BigDecimal Data:
eBig_K1_x_y=50920555.3839560805658115401145 9927802495907134518000000
eBig_K2_rx_y=163043381.041205108494929061541 4838601028317194320440000000
eBig_K3_x_ry=− 418609377.894343824268081645467649829159 9383149236060000000
eBig_K4_rx_ry=− 1340062959.258960811416785759293978743051 319777510586000000
Control Sums Accuracy Results (for Averages Calculations):
eBigD_Avg=0E-48, eBigDR_Avg=0E-48, eBigL_Avg=0E-48, eBigLR_Avg=0E-48
Time Marks During Covariances Calculations:
completed at 2012-08-02 05:43:08.04 lasting total 4 min 31 sec: 1) download of raw data (11 sec; 2) encryption and randomization—4 min 20 sec
Covariance Results by Using Double Data Type
deciphered=−32363.76265276129
original=−32363.762655110873

Covariance Results by Using BigDecimal Data Type
deciphered=− 32363.7626551102165945129364502815645570 60000405515667
original=− 32363.7626551102165945129364502815645570 60000000000000

18.1.3. Numeric Test Discussions

The deciphered and original covariances are in match with each other, though, different original data types produce different matching accuracies:
1. double data type sample with starting precision of $10^{-11}$ delivers up to $10^{-5}$ accuracy result
2. BigDecimal sample with starting precision of $10^{-48}$ delivers up to $10^{-42}$ accuracy result The above calculations were performed just to show that original statistics—variance of and covariance for a set of $3*10^5$ entries—can be computed very accurately:

TABLE 18.1.4

| Test description & computing time | Type of encryption | Data type/Precision |
|---|---|---|
| Load true data from DB Encrypting $3*10^5$ pairs twice Uploading to encrypt table Compute var, covar, four col | | BigDecimal |
| 4 min 20 sec | strong RLE | $10^{-42}$ |

■

Section 20

20.1 Introduction

We now discuss a new scheme for doing homomorphic encryption. To maintain the security of the RLE model requires, when anonymizing a numeric column, that one of the two resulting encrypted columns be located on the DCL. We have invented a different homomorphic encryption scheme that keeps more encrypted data on the PDL. It is described below.

The new scheme is based on the cryptographic concept of the one-time pad. Numeric values are encrypted by adding specially generated random numbers to them. The random numbers are computed from a very wide range of mathematical formulas. The resulting ciphertexts are stored on the PDL, e.g., in a table. Also stored on the PDL is auxiliary information associated with each table row. This information is used in creating the random numbers to encrypt the original values. The auxiliary information is also used to decrypt the encrypted values later on the DCL. In our scheme, original numeric values are encrypted using two different encryption methods which thus produce two different ciphertexts. Each ciphertext is used to perform a different kind of homomorphic operation and is stored in its own column on the PDL. The first encryption method allows numbers to be fully homomorphically added and subtracted. The second encryption method allows numbers to be fully homomorphically multiplied and divided. To decrypt results for either method, results are computed on the PDL and returned to the DCL, along with the appropriately combined auxiliary information. The DCL uses the auxiliary information to remove the random numbers associated with the aggregated encrypted results. The outcome is the plaintext results originally requested by the user. When complex formulas are involved—involving addition and/or subtraction and multiplication and/or division—results cannot be fully computed on the PDL because our two encryption methods are not compatible cryptographically. Therefore, partial results are computed on the PDL and sent to the DCL. Additional cryptographic methods are applied to these results to convert them into compatible encryption schemes. Fully homomorphic arithmetic can then be used to complete the original requested computation on the DCL. At all times, whether on the PDL or DCL, our scheme ensures that no plaintext result is ever revealed until it finally must be presented to the user.

20.2 Homomorphic Operations

Our scheme facilitates homomorphic operations. We first provide a definition of a homomorphic scheme so that we can later demonstrate how our approach meets the definition. Let E be an encryption function and D be the associated decryption function. E is a homomorphic encryption function if D(E(X) (operator1) E(Y)) decrypts to the result X (operator2) Y where X and Y are two numbers and operator1 and operator2 are among {+, −, *, /}. Our scheme supports two types of homomorphic methods. First, it provides a method to perform homomorphic addition and subtraction. We have created encryption function E1 and decryption function D1 with the properties such that D1(E1(X)+E1(Y))= X+Y. The same functions also facilitates D1(E1(X)−E1(Y))=X−Y. We will see later how E1 is constructed so that we can ascertain that it meets the definition of homomorphic scheme. Our scheme also provides a different method for homomorphic multiplication and division. We have created another encryption function E2 and its associated decryption function D2 with the properties such that D2(E2(X)+E2(Y))= X*Y. Similarly E2 and D2 have the properties such that D2(E2(X)−E2(Y))=X/Y. We will also see later how E2 is constructed so that we may ascertain how it also meets our definition of homomorphic scheme.

We should point out that our scheme is designed to work in a relational algebra context, i.e. an SQL context. And by design it is a bit limited in that context. First, our E1 and E2 functions support homomorphic operations within any numeric columns but only for rows that don't repeat. That is, standard SUM, AVG, and other SQL functions that aggregate unique row values can be computed homomorphically. If row values repeat then we need a somewhat different approach to do overall computations. In this case, our parser on the DCL—before it converts the user's query to send to the PDL—will break up the query into individual sub-queries. Each sub-query will have aggregating functions involving only unique rows. Each sub-query will be sent to the PDL and individual results obtained there. Results from all the sub-queries will be returned to the DCL and final results will be computed on the DCL. For example, the query "SELECT SUM(salary) WHERE last_name='Smith' GROUP BY last_name" would be completely handled by the E1 function on the PDL because all rows are unique. A self-JOIN statement that involves the same rows, on the other hand, will be appropriately divided on the DCL into independent sub-queries. These will be sent and computed on the PDL and their results returned to the DCL where the computation of the self-JOIN will be completed.

Also, as we suggested in section 20.1, queries that involve addition/subtraction and multiplication/division cannot be fully computed on the PDL. Our homomorphic approach for addition/subtraction is different from our homomorphic approach for multiplication/division. If a user requests a formula with a mix, separate partial results will be computed on the PDL and returned to the DCL. On the DCL, they will be homomorphically combined/completed. The partial results will be homomorphically combined when the original encrypted formats were incompatible by applying a standardization encryption function. This function will use various randomized scaling factors and partial decryptions so that it meets the definition of homomorphic encryption function. In this manner, added/subtracted results will be combined with multiplied/divided results to produce a final result that can be decrypted and presented to the user. The randomized scaling factors and partial decryptions that the standardization encryption function uses will be discussed in the next version of this paper. But an example at the end of this paper will demonstrate the intuition behind this function's workings.

Also, if the original query involve many nested expressions of addition/subtraction and multiplication/division, then the above-mentioned process will have to repeat a number of times. Moving from the innermost level of parenthesis to the outer, intermediate results will be computed, and a standardization encryption function, Ek, will convert the addition/subtraction-based results and the multiplication/division-based results into a standard encrypted form. These will be combined to produce Ek-based results. Then the next parenthetical level will be tackled and results will be computed there. Using standardization encryption function E(k+1), they, along with the Ek results, will be converted and combined into E(k+1) results. Afterwards the next parenthetical level would be tackled. And so on. This process would continue until the results at the final parenthetic level are combined. Finally, the appropriate decryption function would be used to decrypt those results into a plaintext result which can be returned to the user. (Again, the methods involved for creating standardization encryption functions at each nested parenthetical level will be defined in the next version of this paper).

The important point to make about our overall scheme though is that it always provides "end-to-end" encryption. At no time is sensitive data revealed during the computation process on the PDL or the DCL, until the results are finally ready to be presented to the user.

20.3 Detailed Description of Scheme

We now explain how our scheme encrypts numbers in a database to facilitate homomorphic operations. Imagine an original plaintext table has several numeric columns. Our scheme anonymizes these columns using the following ordered steps:
1) The original plaintext table is copied into a temporary table.
2) The temporary table's row order is randomized. Each numeric column Ni thus becomes Si (a "scrambled" column).
3) The temporary table is divided into groups. Each group will have an equal number of rows, Z rows. (However, the last group in the table will probably have less rows—unless the total number of rows in the table happens to be an exact multiple of Z). A new column, called group_column in the rest of this Appendix, will be added to the temporary table to identify the group associated with the row. The group_column value for a row will be set to (row number)/Z, i.e., the quotient after the Si row number is divided by Z. How Z is selected will be described in step (4) below.
4) Within each group, each row will be associated with an index, i, such that i=1 . . . Z. A new column, called index_column in the rest of this Appendix, will be added to the temporary table to identify the index in the group associated with the row. The index_column value for a row will be set to (row number) mod Z, i.e., the remainder after the Si row number is divided by Z. In terms of representing index values, each value in the index_column will be a binary number that holds exactly Z bits. All the bits in this binary number will be zero except for the bit of the index. The indices will be numbered right to left within this binary number. For example, if the row number is 2156 and Z is 20 for this temporary table (i.e. 20 rows per group), index i would be 2156% 20=16. Thus, the index_column value for this row will look like '0x00001000000000000000'. Here there is a 1 is in the $16^{th}$ position (moving right to left) and the rest of the bits are zero.

We now explain how to select Z in our scheme. This is a performance-driven exercise. Z is the length in bits of the binary index value that is held in a database column. And these binary variables will be added together on the PDL, as will be explained later in this document. Thus, when an application wants to use our scheme, it should choose a Z such that the database on the PDL can readily manipulate such binary numbers. The idea is to maximize the number of bits that can fit within a standard database column of type BINARY so that adding many numbers in this column would be easy. For example, the system may start with Z=1024 and see whether this is too little or too much in terms of the system performance in supporting many additions of such numbers.

5) For each Si column, the following steps are performed:
  a) A new column, called add_column in the rest of this document, will be created in the temporary table. It will be used to facilitate adding and subtracting the encrypted values in the Si column, i.e. it will contain the E1-encrypted Xs. The encoding of each value X will be E1(X)=X+f1(g,i). Function f1 will be created to take as input the group number (g) and index (i) of the row in the table and convert them into a random number. Function f1 can be defined in numerous ways. For example, f(g,i) could be defined as i+g; it could be defined as the expression [square root (7*i+15/g)]; it could be defined heuristically by if-statements such as "if g=1 and i=1 then f1(g,i)=12; if g=1 and i=2 then f1(g,i)=77; if g=1 and i=3 then f1(g,i)=60.8; . . . if g=5 and i=8 then f1(g,i)=-45; etc"; it could be defined by hash(g,i) where hash is a standard cryptographic hash function like SHA256, group g is used to derive a long key k (perhaps from a lookup table), and the expression hash(g,i) is the hash of the index i with the key k appropriately converted (i.e. formatted) into a large number that can be added to X; or it could be any combination of such methods. (Note that f(g,i) defined based on purely polynomial constructions may be less secure than the heuristic expressions or hash computations mentioned above depending on factors such as number of groups, number of numeric values in the column, etc). Function f1 is the key mechanism that provides the randomization that makes E1 a secure encryption function.
  b) Another new column, called mult_column in the rest of this document, will also be created in the temporary table. It will be used to multiply and divide the encrypted values in the Si column, i.e. it will contain the E2-encrypted Xs. The encoding of each value X for this column will be E2(X)=log(X)+f2(g,i). The log representation of X means natural log, and the log of X is taken so that the system can encrypt logs of Xs and use addition of logs when multiplication of Xs is called for. Likewise, the system can perform subtraction of logs when division of Xs is called for. The purpose of adding and subtracting logs is so that the system will accumulate less calculation errors. For example, our scheme could be configured to use multiplication instead of logs. E2(X) could be defined as X*f2(g,i), i.e. multiplying by a random number. To compute X*Y the system would compute E2(X)*E2(Y). But such multiplication will accumulate errors after the decimal point faster in comparison to adding logs. Note that as a result of using logs, we can only encode numbers greater than 0, as logs of 0 and negative numbers don't exist. Thus, our homomorphic abilities for multiplication and division are restricted to cases when the numbers involved are greater than zero. In the future, we will provide a scheme for dealing with 0 and negative numbers for multiplication and division.
  Note that the f2(g,i) function is computed just like f1(g,i), i.e. any combination of computations that are dependent on group number and index of the row may be used. The function f2(g,i) should be different from f1(g,i) so that if any knowledge is gleaned about f1(g,i) it will not disclose any knowledge about f2(g,i). Once again, the randomization of the f2 function provides the security of the E2 encryption function.
  6) The group_column, index_column as well as the add_column and mult_column for each Si column are placed into the PDL. The anonymized numeric columns are now ready to be used in production.

Note that for better security, as an optional part of steps (5a) and (5b), it's also possible to analyze all the Xs in the Si column to find the f1(g,i) and f2(g,i) that will better hide those Xs (for example, extreme outliers). Rather than constructing random f1(g,i) and f2(g,i) functions we could construct the f1 and f2 to better hide X values. That's not the approach adopted in this document, but it could be done.

Also note that from a security point of view, in steps (5a) and (5b), a different f1(g,i) and f2(g,i) needs to be used for every Si column to prevent known plaintext attacks. For example, if the random number associated with a given X, or even the definition for the entire function f1 or f2, were discovered for some Si, the attacker would not be able to decrypt the random numbers associated with f1 or f2 for other Xs in the same row (i.e. values in other numeric columns in the same row). Likewise the attacker couldn't surmise the f1 or f2 for other columns (other Si's). The random numbers and functions f1 and f2 would be different for other Si columns by design.

20.4 Homomorphic Addition/Subtraction

In this section we discuss how the above anonymization approach supports homomorphic addition and subtraction in SQL. When a user requests to add or subtract numbers, the DCL will convert his query to operate on the PDL. As per the restrictions described in section 20.2, if a query implicates identical rows within the same SELECT statement, the statement will be divided into multiple independent SELECT sub-statements. Each sub-statement will be sent to the PDL and its results returned to the DCL. On the DCL all the results from all sub-statements will be combined homomorphically because all the sub-statements are of the same format, i.e. E1-encrypted. The final result will be decrypted and returned to the user as representing the result of the original SELECT statement.

We now describe how an individual SELECT sub-statement will be processed to show its homomorphic properties. Imagine the SELECT sub-statement requires adding two numbers, X1 and X2. Although our analysis will generalize to adding X1 . . . Xn; subtracting X2 from X1 (which is addition in reverse); etc. The DCL will convert the SELECT sub-statement to use the add_column, i.e. to use E1 encryption. On the PDL, E1(X1) will be added to E1(X2). The result of adding two (and for reference purposes more) E1(Xi)'s on the PDL will be called the aggregated E1(X) value in the rest of this document. To facilitate decryption of this value, the PDL will also add the index_column values of the rows for X1 and X2, but only if they are part of the same group. If they are part of the same group, the binary numbers of these two rows will be added, otherwise they will not be added. The resulting index_column value will be called the aggregated index value in the rest of this document. It is associated with a specific group. Hence, in the case of adding E1(X1) and E1(X2), we will have either one aggregated index value because both of the rows were from the same group, or two aggregated index values because the two rows were from different groups.

After the aggregated E1(X) value and aggregated index values, along with their respective groups, have been calculated on the PDL, they are returned to the DCL. On the DCL, the aggregated E1(X) value will be decrypted. For each group, the DCL breaks up in the aggregated index value into its individual indices. For each index, the DCL computes f1(g,i). (Because all the rows added together are unique, there will never be an "overflow" when adding indices. Each row always represents a different index within one group and the rest of the bits in the index value are zero). The DCL then adds all the f1(g,i) values together across all the groups. This sum is subtracted from the aggregated E1(X) value. The result is the plaintext result of adding the original X1 and X2.

Let us look at the formulas, which will also demonstrate that E1 is homomorphic according to our definition of homomorphic encryption from above. We have $E1(X1)=X1+f1(g_{x1},i_{x1})$ $E1(X2)=X2+f1(g_{x2},i_{x2})$ If we add these two on the PDL we obtain $E1(X1)+E1(X2)=X1+f1(g_{x1},i_{x1})+X2+f1(g_{x2},i_{x2})$ If we decrypt this sum on the DCL we obtain $D1\ (E1(X1)+E1(X2))=[X1+f1(g_{x1},i_{x1})+X2+f1(g_{x2},i_{x2})]-[f1(g_{x2},i_{x2})+f1(g_{x1},i_{x1})]=X1+X2$ This form abides by the definition of the homomorphic encryption function from section 20.2. We have "D(E(X) (operator1) E(Y)) decrypts to the result X (operator2) Y where X and Y are two numbers and operator1 and operator2 are among {+, −, *, /}." In this case, X and Y represent X1 and X2, operator1 is + and operator2 is +.

Here is an example of how E1 works to illustrate the mechanics. Imagine that the original plaintext table has 8 rows, and Z=4 (i.e. 4 rows per group—based on application testing). The function f1(g,i) is defined to be hash1(g,i), where group g is used to derive a long key k, and hash1(g,i) is the industry-standard SHA256 hash function applied to the index i and key k, converted to an appropriate format so it can be added to X. The function f2(g,i) is defined to be hash2(g,i) where group g is used to derive a different long key k, and hash2(g,i) is the industry-standard SHA256 hash function applied to the index i and key k, also converted to an appropriate format so it can be added to X. After following the anonymization steps of section 20.3, the temporary table below is constructed and stored on the PDL. (Note that the first two columns, X and its row number, will obviously not be on the PDL—they are present here only for illustration. Also, the hash computations/representations are purposefully made smaller only for illustration. They would be much bigger on real systems).

| X | row number | add_column [E1(X)] | mult_column [E2(X)] | group_column | index_column |
|---|---|---|---|---|---|
| 44 | 1 | 44 + [hash1(1,1) = 5] = 49 | log(44) + [hash2(1,1) = 8] = 11.78418963 | 1 | 0x0001 |
| 34 | 2 | 34 + [hash1(1,2) = 7] = 41 | log(34) + [hash2(1,2) = 32] = 39.52636052 | 1 | 0x0010 |
| 28.5 | 3 | 28.5 + [hash1(1,3) = 9] = 37.5 | log(28.5) + [hash2(1,3) = 112] = 115.34990409 | 1 | 0x0100 |
| 89.3 | 4 | 89.3 + [hash1(1,4) = 11] = 100.3 | log(89.3) + [hash2(1,4) = 260] = 264.49200149 | 1 | 0x1000 |
| 10 | 5 | 10 + [hash1(2,1) = 8] = 18 | log(10) + [hash2(2,1) = 12] = 14.30258509 | 2 | 0x0001 |
| 44 | 6 | 44 + [hash1(2,2) = 10] = 54 | log(44) + [hash2(2,2) = 40] = 43.78418963 | 2 | 0x0010 |
| 2004 | 7 | 2004 + [hash1(2,3) = 12] = 2016 | log(2004) + [hash2(2,3) = 116] = 123.60290046 | 2 | 0x0100 |
| 127 | 8 | 127 + [hash1(2,4) = 14] = 141 | log(127) + [hash2(2,4) = 264] = 268.84418709 | 2 | 0x1000 |

Imagine the user issues a request to add the Xs in rows 2, 4, and 7. The aggregated E1(X) value becomes 41+100.3+2016=2157.3. The aggregated index values of the involved rows must also be computed to facilitate this value's decryption on the DCL. There are two groups implicated across the Xs, groups 1 and 2. For group 1, the aggregated index value becomes 0x0010+0x1000 or 0x1010. For group 2 the aggregated index value becomes 0x0100. The 2157.3; the 0x1010 along with the fact that this aggregated index value is for group 1; and the 0x0100 along with the fact that this aggregated index value is for group 2, are returned to the DCL. The DCL will decrypt the aggregated E1(X) value. When the DCL gets these data, it first sums all the f1(g,i) associated with group 1. Seeing 0x1010, it understands that the $2^{nd}$ and $4^{th}$ index are involved (moving right to left). It uses the definition of f1(g,i) to compute the sum of the two associated random numbers, i.e. it computes hash1(1,2)+hash1(1,4) to obtain 7+11 or 18. (See the table above for the values of the relevant hash1 computations). Next, the DCL transforms the index value for group 2 into the single random number. 0x0100 represents index 3, thus the random number computed for group 2—again, using the definition of f1(g,i)—is hash1(2,3), or 12. (Again, see the table above for the value of the relevant hash1 computation). Combining the two sums, the DCL obtains 18+12 or 30. This sum is subtracted from the aggregated E1(X) value: the DCL obtains 2157.3−30, or 2127.3. This is the same value as the original plaintext sum of the implicated Xs, which is 34+89.3+2004 or 2127.3. This illustrates the accuracy of our scheme.

20.5 Homomorphic Multiplication/Division

In this section we discuss how our scheme supports homomorphic multiplication and division. When a user requests to multiply or divide numbers, the DCL will convert his query to operate on the PDL. Again, as per the restrictions described in section 20.2, and as mentioned in section 20.4, if a query implicates identical rows within the same SELECT statement, the statement will be divided into multiple independent SELECT sub-statements. Each sub-statement will be sent to the PDL and its results will be returned to the DCL. On the DCL all the results from all the sub-statements will be combined homomorphically because all such results are of the E2 format. The final result will be decrypted and returned to the user as the answer to the original SELECT statement.

We describe how an individual SELECT sub-statement will be processed to show the homomorphic properties of E2. Imagine the SELECT sub-statement requires multiplying X1 by X2. (Of course—such an analysis also generalizes to multiplying X1 by X2 by X3 . . . Xn; as well as dividing X2 by X1, which is, of course, inverse multiplication; etc). The DCL will convert the SELECT sub-statement to use the mult_column, i.e. to use E2. On the PDL, the system adds E2(X1) and E2(X2). Recall that E2 uses logs and thus terms will be added when multiplication of plaintext values is required. We call the result of adding two (and for reference more) E2(Xi)'s on the PDL the aggregated E2(X) value in the rest of this Appendix. So that the aggregated E2(X) value can be decrypted on the DCL, as part of this operation, the PDL will also add the index_column values of the two involved rows but, again, only if they are part of the same group. If they are part of the same group, the index numbers of the rows are added, otherwise, the index numbers of the two rows are not added. As for the homomorphic addition/subtraction case, the resulting index_column value, added or not, will be called the aggregated index value in the rest of this Appendix. It is also associated to a specific group. In the case of adding E2(X1) and E2(X2) on the PDL, we will again either have one aggregated index value if the two involved rows were from one group, or we will have two aggregated index values if the two involved rows were from different groups. After the aggregated E2(X) value and aggregated index values, along with their respective groups, have been calculated they are all returned to the DCL.

To decrypt the aggregated E2(X) value, for each group, the DCL breaks up the aggregated index value into individual indices. For each index, the DCL computes f2(g,i). The DCL adds all the f2(g,i) values together for all the groups. It subtracts this sum from the aggregated E2(X) value. Call this result C. The DCL raises e to the power of C, reversing the log effect. The result of this computation is the plaintext result of multiplying X1 and X2. (Note, that rather than using natural log and e, a different log/power could be employed during the anonymization of the original table, further confusing any potential attacker trying to break this scheme if he were to examine the encrypted data on the PDL).

Once again, let us observe the formulas behind E2 and how this function is homomorphic. We have $E2(X1) = \log(X1) + f2(g_{x1}, i_{x1})$ $E2(X2) = \log(X2) + f2(g_{x2}, i_{x2})$ If we add these two on the PDL we obtain $E2(X1) + E2(X2) = \log(X1) + f2(g_{x1}, i_{x1}) + \log(X2) + f2(g_{x2}, i_{x2})$ Now if we decrypt this sum on the DCL we obtain $D2(E2(X1) + E1(X2)) = e^{([\log(X1) + f2(g_{x1}, i_{x1}) + \log(X2) + f2(g_{x2}, i_{x2})] - [f2(g_{x2}, i_{x2}) + f2(g_{x1}, i_{x1})])} = X1*X2$ This is again of the homomorphic form we discussed in section 20.2. We have "D(E(X) (operator1) E(Y)) decrypts to the result X (operator2) Y where X and Y are two numbers and operator1 and operator2 are among {+, −, *, /}." In this case, X and Y represent X1 and X2, operator1 is + and operator2 is *.

Here is an example to illustrate E2 operations. Assume the same table from the addition/subtraction example before, with the same Z, f1(g,i), and f2(g,i). (It's reproduced just for reference).

| X | row number | add_column [E1(X)] | mult_column [E2(X)] | group_column | index_column |
|---|---|---|---|---|---|
| 44 | 1 | 44 + [hash1(1,1) = 5] = 49 | log(44) + [hash2(1,1) = 8] = 11.78418963 | 1 | 0x0001 |
| 34 | 2 | 34 + [hash1(1,2) = 7] = 41 | log(34) + [hash2(1,2) = 32] = 39.52636052 | 1 | 0x0010 |
| 28.5 | 3 | 28.5 + [hash1(1,3) = 9] = 37.5 | log(28.5) + [hash2(1,3) = 112] = 115.34990409 | 1 | 0x0100 |
| 89.3 | 4 | 89.3 + [hash1(1,4) = 11] = 100.3 | log(89.3) + [hash2(1,4) = 260] = 264.49200149 | 1 | 0x1000 |
| 10 | 5 | 10 + [hash1(2,1) = 8] = 18 | log(10) + [hash2(2,1) = 12] = 14.30258509 | 2 | 0x0001 |
| 44 | 6 | 44 + [hash1(2,2) = 10] = 54 | log(44) + [hash2(2,2) = 40] = 43.78418963 | 2 | 0x0010 |
| 2004 | 7 | 2004 + [hash1(2,3) = 12] = 2016 | log(2004) + [hash2(2,3) = 116] = 123.60290046 | 2 | 0x0100 |
| 127 | 8 | 127 + [hash1(2,4) = 14] = 141 | log(127) + [hash2(2,4) = 264] = 268.84418709 | 2 | 0x1000 |

Suppose the user wants to multiply the Xs in rows 4, 5, and 8. First, the aggregated E2(X) value is computed on the PDL. This is 264.49200149+14.30258509+268.84418709, or 547.63877367. For each group, the relevant indices must be captured. Groups 1 and 2 are involved for the three Xs. For group 1, the aggregated index value is 0x1000. For group 2, the aggregated index value becomes 0x0001+0x1000 or 0x1001. The 547.63877367; the 0x1000 and the fact that this aggregated index value is for group 1; and the 0x1001 and the fact that this aggregated index value is for group 2, are all sent to the DCL. On the DCL the aggregated E2(X) value is decrypted. For each group, the sum of the associated f2(g,i)'s are computed and then all the sums combined. In the case of group 1, because 0x1000 is the fourth index, we must compute f2(1,4), which is, per the definition of f2(g,i), hash2(1,4), or 260. (See the table above for the value of the relevant hash2 computation). For group 2, the DCL sees that 0x1001 represents the first and fourth indices. It computes the sum f2(2,1)+f2(2,4), which is hash2(2,1)+hash2(2,4), or 12+264, or 276. (Again, see the table above for the values of the relevant hash2 computations). The sum of all the f2(g,i)'s is thus 260+276, or 536. This sum is subtracted from the aggregated E2(X) value, which becomes 547.63877367−536, or 11.63877367. Finally, the constant e is raised to this power, i.e. the DCL computes e^11.63877367, which is 113,411 (after rounding with a pre-determined precision). Notice that this is again the result of the actual plaintext multiplications. We have 89.3*10*127 or 113,411. This again illustrates the accuracy of our scheme.

20.6 Standardization Encryption Example

As explained in section 20.2 we cannot perform fully homomorphic computations on the PDL when the request contains a mixture of addition/subtraction and multiplication/division. To handle such requests, we compute partial results on the PDL and then return the partial results to the DCL. On the DCL we used standardization encryption to convert them into forms that can be homomorphically combined. Afterwards, the arithmetic can be completed homomorphically on the DCL. And this process may need to be repeated several times if there are complex nested expressions.

In this section we show a simple example to demonstrate the intuition behind the standardization process. As we indicated in section 20.3, a more formal explanation of how such standardization encryption works will be provided in the next version of this paper. Imagine a user wants to compute (X1+X2)+(X3*X4). We cannot compute this formula completely on the PDL because it contains addition and multiplication elements, which are incompatible. So we compute C1=E1(X1)+E1(X2) and C2=E2(X3)+E2(X4) separately on the PDL. Then we return both results to the DCL along with their associated group numbers and aggregated index values for each group. On the DCL, we use a standardization encryption function to convert C1 and C2 into encrypted forms for subsequent homomorphic computations. We first modify C2. We remove all the random numbers involved in computing C2. We compute the sum—call it S2—of the two f2(g,i)'s for the two originally involved Xs (X3 and X4). Next, we pick a random number, Q, and set C2'=e^[C2−S2+log(Q)]. The effect of this last step is to partly decrypt the product of X3 and X4 per the definition of E2; add a new random number, log(Q), to the result; and simplify this result by raising e to the resulting power. Computationally all this happens simultaneously on the DCL, and the final effect of the overall step is a further encryption of the product of X3 and X4. The result is now integrated with a new random number, Q, thus, intermediate result C2 is protected by this random number. Now we "standardize" C1. We multiply C1 by Q—i.e., set C1'=C1*Q. This further encrypts C1 by also multiplying it by a random number (again Q). Having these two encrypted intermediate values, we can continue with the following homomorphic arithmetic:

$$F=C1'+C2'=C1*Q+e^{\hat{}}[C2-S2+\log(Q)]=([X1+f1(g_{x1},ix_{x1})]+[X2+f1(g_{x2},i_{x2})])*Q+e^{\hat{}}(([log(X3)+f2(g_{x3},i_{x3})]+[log(X4)+f2(g_{x4},i_{x4})])-[f2(g_{x3},i_{x3})]+f2(g_{x4},i_{x4})]+\log(Q))=([X1+X2]+[f1(g_{x1},i_{x1})+f1(g_{x2},i_{x2})])*Q+e^{\hat{}}((log(X3)+log(X4)+log(Q))=([X1+X2]+[f1(g_{x1},i_{x1})+f1(g_{x2},i_{x2})])*Q+(X3*X4*Q)=([X1+X2+(X3*X4)]+f1(g_{x1},i_{x1})+f1(g_{x2},i_{x2}))*Q$$

We now have an encrypted intermediate result F and it represents an encrypted result of the user's original request. This can be seen by noticing the two terms on the left in the above formula and the random values used to encrypt those two terms in the right half of the above formula. Now we can decrypt F. We divide F by Q; call the result F'. We compute the sum of the two f1(g,i)'s for the two Xs related to C1 (X1 and X2). Call this result S1. We subtract S1 from F'. The result is the plaintext result of (X1+X2)+(X3*X4), as can be witnessed in the above formula. Thus, this result can be returned to the user.

Notice how the "standardization" process—call this our encryption function E3—is also homomorphic. This is seen because we have $$E3(C1')=C1*Q$$

$$E3(C2')=e^{\hat{}}[C2-S2+\log(Q)]$$

Now if we add these two on the DCL we get $$E3(C1')+E3(C2')=C1*Q+e^{\hat{}}[C2-S2+\log(Q)]$$

When we decrypt this on the DCL with the associated decryption function, D3, we obtain $$D3\ (E3(C1')+E3(C2'))=[(C1*Q+e^{\hat{}}[C2-S2+\log(Q)])/Q]-[f1(g_{x1},i_{x1})+f1(g_{x2},i_{x2})]=(X1+X2)+(X3*X4)$$

Thus, E3 is again of the homomorphic form discussed in 20.2. We have "D(E(X) (operator1) E(Y)) decrypts to the result X (operator2) Y where X and Y are two numbers and operator1 and operator2 are among {+, −, *, /}." In this case, X and Y represent (X1+X2) and (X3*X4), respectively; operator1 is + and operator2 is +.

Note that from the perspective of security, at no time are intermediate results in the above process decrypted. "Keys" used for the standardization encryption, such as the random number Q, could be kept in memory rather than on disk. If at any time the DCL system should crash or of some attacker should break into it, he will not be able to retrieve those keys from transient storage (i.e., memory) so easily. Thus he will not be able to decrypt any intermediate results that he may find.

GLOSSARY

| Term | Definition |
|---|---|
| ODB | The original unencrypted database. |
| O1 ... Op, Oi, Oj | O1 ... Op are the original unencrypted tables making up the ODB: O1 through Op. Oi and Oj are the more generic descriptions of these tables. That is, i, j = 1 ... p. |
| ADB | The anonymized database into which the ODB is converted. |
| A1 ... Ap, A2, Ai, Aj | A1 ... Ap are the anonymized tables making up the ADB, into which tables O1 through Op are converted. A2, and more generally, Ai and Aj are the same as tables A1 ... Ap. That is, in the case of Ai and Aj, i, j = 1 ... p. |
| V1 | Table to hold all possible alphanumeric symbols making up tables O1 ... Op. The overall goal of V1 is to maintain the data schema of the ODB in the ADB so that existing database applications continue to work. V1 is used for constructing the private encoding/decoding key for each Ai, including the key to encode/decode string value lengths for each Ai. |
| B1 | The first temporary table into which O1 is converted as its being anonymized. |
| GpNum | New column introduced into every table A1 through Ap as tables O1 through Op are anonymized. GpNum holds the number of the group to which a given row belongs. Used to discard rows from result sets that belong to "false" groups (i.e. which contain fake records) and retain rows that belong to "true" groups (i.e. containing the original ODB data). |
| RecInfo | New column introduced into every table A1 through Ap as tables O1 through Op are anonymized. RecInfo contains the lengths of each string value in that row, permuted to be represented as a character within the list of V1 symbols. Used to trim string values in results sets so that the proper string values can be returned to the user. |
| RowNum | New column introduced into every table A1 through Ap as tables O1 |

-continued

GLOSSARY

| Term | Definition |
|---|---|
| | through Op are anonymized. RowNum is the row number for the row. Used to determine if a numeric value in a result set row was originally an outlier so that its proper outlier value can be restored before it's returned to the user. |
| R1, Ri | R1 is a table used for DELETE command processing. It holds the RowNums for those rows that are scheduled for deletion. If any rows in R1 are implicated in any query they will not be processed because the rows are ultimately scheduled to be erased. Ri is just like R1 but for the other Ai tables; that is, i = 2 . . . p. Ri is used to handle the processing of the DELETE command for each Ai. Ri holds the RowNums of rows that are scheduled for deletion. If any rows in Ri are implicated in any Ai query they will not be processed because they are scheduled to be erased. |
| E1 | Temporary table used to foil re-identification attempts via token frequency analysis attacks. E1 contains a histogram of tokens in every string column in B1. In every column in the histogram, tokens are combined into disjoint sets of 5. E1 records the number of rows needed for each token to equal the frequency of the leader in its 5-element group. Used in conjunction with the C1 table. |
| C1 | Temporary table used with E1; it contains "false" rows randomly selected from B1. Tokens will be replaced in the columns in C1 based on their "rows needed" parameter in E1. The purpose of this replacement is to ensure that result sets involving string tokens in any 5-group set will return true and false rows whose total number approximately equals, which considerably undermines re-identification efforts. |
| Aggregated "rows needed" value | Used in the context of E1 and F1. The total number of "rows needed" for a given column or position in, respectively, E1 or F1. This number represents the total number of rows needed within a column or position for all, respectively, tokens or positions in their 5-element groups to equal the frequency of their leaders of their 5-element groups. |
| F1 | Temporary table used to foil re-identification attempts from character frequency analysis attacks. It contains a histogram of every character position of every string column in B1. For every position in every column in the histogram, its character values are grouped into disjoint sets of 5. F1 records the number of rows needed for each position to equal the frequency of the leader in its 5-element group. Used in conjunction with the D1 table. |
| D1 | Temporary table used with F1; it contains "false" rows randomly selected from B1. Character positions will be replaced in the columns in D1 based on their "rows needed" parameter in F1 to ensure that result sets involving character positions in any 5-group set will return true and false |

-continued

GLOSSARY

| Term | Definition |
|---|---|
| | rows whose total number approximately equals, which significantly undermines re-identification efforts. |
| G1 | Temporary table, a copy of B1. Used to reorder the groups in B1 to further obscure any potential insecure groupings of rows. |
| Y1 | Temporary table, a copy of G1. This table, listing which GpNums are true and false in A1, will become part of the database private key. It will be used to discard rows from false groups in results sets when they are returned from the server to the client. |
| H1 | A table containing the original outlier values and the values that replaced them. This table will become part of the database private key for A1 to properly restore outlier values on the client when results sets from the server involving A1 contain masked outlier values. |
| X1, Xi | X1 is a table used for JOINing A1 with A2 on a single column. X1 contains all the unique values within that single column in A2 replicated and encoded as many times as there are groups in A1. It will be used in conjunction with the J1 construct to restore the result set of the JOIN command on the client. Similarly, Xi is a table used for JOINing Ai with Aj on a single column more generally. Xi contains all the unique values within the implicated column in Aj replicated and encoded as many times as there are groups in Ai. Like X1, Xi is used to restore the JOIN result set on the client. |
| B2, Bi | B2, and more generally, Bi, is the same as table B1 but used for anonymizing table O2 or (more generally) table Oi. |
| Database Private Key | A set of nine files to be made available to client machines so they can interact with the ADB. The database private key is composed of the Ai table private key files and general database files. The following are the Ai table private key files: |
| | 1. The Y1 table, indicating whether a particular group is true or false. |
| | 2. The file describing how each character position is encoded for each group in each string column. This file also describes the encoding for each string length "column" in each group. |
| | 3. The file describing the average, random multiplier, and random addend for each numeric column in each group. |
| | 4. The H1 table, describing the original and modified numeric outlier values in certain rows. |
| | 5. The file containing the maximum lengths of each padded string column. |
| | 6. The file describing how many rows there are in the table. |
| | 7. The file describing how many groups there are in the table. |

-continued

GLOSSARY

| Term | Definition |
| --- | --- |
| | The following are the general database files:<br>1. The V1 table, containing the domain of the characters in O1 . . . Op.<br>2. The file describing how many rows the database server can handle within an anonymized subquery whose components are linked by OR statements. |
| J1 | A temporary table used when JOINing two tables in the ADB. It contains the results of the first table JOINed to table X1 combined with the results of X1 JOINed to the second table. J1 is used to restore the result set of the JOIN on the client. |
| R1O | Just like the R1 table for the A1. R1O is just a reference to a table associated with O1. It's used for comparing the performance of the DELETE command on an A1 table with an O1 table. R1O holds those O1 row numbers that are scheduled for deletion. If any rows in R1O are implicated in any O1 query they will not be processed because they will ultimately (in theory, because we never actually deleted any O1 rows in testing) be erased. |

While the invention has been described in connection with what is presently considered to be the most practical and preferred embodiments, it is to be understood that the invention is not to be limited to the disclosed embodiments but, on the contrary, is intended to cover various modifications and equivalent arrangements included within the spirit and scope of the appended claims.

The invention claimed is:

1. A computer-implemented method of anonymizing a database and querying it comprising:

(a) anonymizing a database on a server computer, (b) hosting said anonymized database on the server computer of step (a) or another server computer, (c) generating a query on a client computer, (d) encrypting the query on the client computer to form an encrypted query, (e) transmitting the encrypted query to the server computer, (f) operating on the encrypted query at the server computer to produce an encrypted result, (g) returning the encrypted result to the client computer, (h) post processing the encrypted result on the client computer, without decryption, to produce a post processed encrypted result, (i) decrypting the post processed encrypted result at the client computer to produce a decrypted result and presenting the decrypted result to the user, wherein the database is anonymized by using secure encryption and decryption methods to encode each rational number value within numeric columns, wherein the encryption and decryption methods use linear transformations by using fixed and privately kept encryption coefficients and the encryption method is defined by $D=D(x,rx)=\alpha x+\beta rx$ and $E=E(x,rx)=\gamma x+\delta rx$ and the decryption method is defined by $x=(\delta D-\beta E)/\Delta$ where $\Delta=\alpha\delta-\gamma\beta$.

2. The method of claim 1 where the encryption and decryption methods form the basis of algorithms that can be used to perform general numerical and statistical calculations on the server, or on the server and client, using data encrypted via those encryption methods.

3. The method of claim 2 wherein the general numerical and statistical calculations are done using an algorithm that protects against losses of significant digits in computations due to rounding, truncation and inadequate binary data presentation.

4. The method of claim 1 whereby the database is anonymized by adding specially-generated random numbers to encode each numeric value within numeric columns.

5. The method of claim 4 whereby encrypted numerical data is arithmetically combined using addition, subtraction, multiplication, and division, or combinations thereof, either on the server, or on the server and client, but in all cases without decryption.

6. A computer-implemented apparatus for performing computations on encrypted data and querying encrypted data, comprising: (1) a computer system; (2) logic, performed by the computer system, for (a) anonymizing a database on a server computer, (b) hosting said anonymized database on the server computer of step (a) or another a server computer, (c) generating a query on a client computer, (d) encrypting the query on the client computer to form an encrypted query, (e) transmitting the encrypted query to the server computer, (f) operating on the encrypted query at the server computer to produce an encrypted result, (g) returning the encrypted result to the client computer, (h) post processing the encrypted result on the client computer, without decryption, to produce a post processed encrypted result, (i) decrypting the post processed encrypted result at the client computer to produce a decrypted result and presenting the decrypted result to the user wherein the database is anonymized by using secure encryption and decryption methods to encode each rational number value within numeric columns, wherein the encryption and decryption methods use linear transformations by using fixed and privately kept encryption coefficients and the encryption method is defined by $D=D(x,rx)=\alpha x+\beta rx$ and $E=E(x,rx)=\gamma x+\delta rx$ and the decryption method is defined by $x=(\delta D-\beta E)/\Delta$ where $\Delta=\alpha\delta-\gamma\beta$.

7. The method of claim 6 where the encryption and decryption methods form the basis of algorithms that can be used to perform general numerical and statistical calculations on the server, or on the server and client, using data encrypted via those encryption methods.

8. The method of claim 7 wherein the general numerical and statistical calculations are done using an algorithm that protects against losses of significant digits in computations due to rounding, truncation and inadequate binary data presentation.

9. The method of claim 6 whereby the database is anonymized by adding specially-generated random numbers to encode each numeric value within numeric columns.

10. The method of claim 9 whereby the encrypted numerical data as encrypted is arithmetically combined using addition, subtraction, multiplication, and division, or combinations thereof, either on the server, or on the server and client, but in all cases without decryption.

11. An article of manufacture comprising a program storage device embodying instructions for a computer-implemented method for performing computations on encrypted data and querying encrypted data, the logic comprising: (a) anonymizing a database on a server computer, (b) generating a query on a client computer, (c) encrypting the query on the client computer to form an encrypted query, (d) transmitting the encrypted query to the server computer, (e) operating on the encrypted query at the server computer to produce an encrypted result, (f) returning the encrypted result to the client computer, (g) decrypting the encrypted result at the client computer to produce a decrypted result, and (h) post processing the decrypted result at the client computer to produce a result and presenting the result to a user, wherein anonymizing the database is accomplished by forming two or more groups within at least one table and wherein each group is associated with an anonymization key, and
wherein the database is anonymized by using secure encryption and decryption methods to encode each rational number value within numeric columns, wherein the encryption and decryption methods use linear transformations by using fixed and privately kept encryption coefficients and the encryption method is defined by $$D=D(x,rx)=\alpha x+\beta rx \text{ and }$$

$$E=E(x,rx)=\gamma x+\delta rx$$

and the decryption method is defined by $$x=(\delta D-\beta E)/\Delta$$

where $$\Delta=\alpha\delta-\gamma\beta.$$

12. A client-server database system comprising:
(a) at least one client computer,
(b) at least one server computer, and
(c) a network connecting the client computer and the server computer,
(d) wherein the server computer hosts an anonymized database, the anonymized database is operated upon by the server computer to produce an encrypted results set in response to an encrypted query from the client computer, the encrypted results set is sent from the server to the client computer, the encrypted result is post processed on the client computer, without decryption, to produce a post processed encrypted results set, and the post processed encrypted results set is decrypted by the client computer to produce a decrypted result to be presented to a user, wherein the anonymized database is anonymized by forming two or more groups within at least one table and wherein each group is associated with an anonymization key, and
wherein the database is anonymized by using secure encryption and decryption methods to encode each rational number value within numeric columns, wherein the encryption and decryption methods use linear transformations by using fixed and privately kept encryption coefficients and the encryption method is defined by $$D=D(x,rx)=\alpha x+\beta rx \text{ and }$$

$$E=E(x,rx)=\gamma x+\delta rx$$

and the decryption method is defined by $$x=(\delta D-\beta E)/\Delta$$

where $$\Delta=\alpha\delta-\gamma\beta.$$

13. The system of claim 12 where those encryption and decryption methods form the basis of algorithms, described in this paper, that can be used to perform general numerical and statistical calculations on the server, or on the server and client, using data encrypted via those encryption methods.

14. The system of claim 13 wherein the general numerical and statistical calculations are done using an algorithm that protects against losses of significant digits in computations due to rounding, truncation and inadequate binary data presentation.

15. The system of claim 12 whereby the database is anonymized by adding specially-generated random numbers to encode each numeric value within numeric columns.

16. The system of claim 15 whereby encrypted numerical data is arithmetically combined using addition, subtraction, multiplication, and division, or combinations thereof, either on the server, or on the server and client, but in all cases without decryption.

* * * * *